(12) United States Patent
Hasegawa et al.

(10) Patent No.: US 7,639,880 B2
(45) Date of Patent: Dec. 29, 2009

(54) COMPRESSING A MULTIVALUE IMAGE WITH CONTROL OF MEMORY SPACE REQUIREMENT

(75) Inventors: Fumihiro Hasegawa, Tokyo (JP); Hitoshi Itoh, Kanagawa (JP); Shinji Aoki, Saitama (JP)

(73) Assignee: Ricoh Company, Ltd., Tokyo (JP)

( * ) Notice: Subject to any disclaimer, the term of this patent is extended or adjusted under 35 U.S.C. 154(b) by 663 days.

(21) Appl. No.: 11/298,976

(22) Filed: Dec. 12, 2005

(65) Prior Publication Data

US 2006/0171595 A1    Aug. 3, 2006

(30) Foreign Application Priority Data

| Dec. 10, 2004 | (JP) | 2004-358532 |
|---|---|---|
| Jan. 31, 2005 | (JP) | 2005-024188 |
| May 31, 2005 | (JP) | 2005-160025 |

(51) Int. Cl.
*G06K 9/62* (2006.01)
*G06F 15/00* (2006.01)

(52) U.S. Cl. ...... 382/224; 358/1.9

(58) Field of Classification Search ........ 382/173, 382/224, 232, 262, 274, 305, 312; 358/1.9, 358/2.1, 2.99, 3.01, 3.21; 375/286
See application file for complete search history.

(56) References Cited

U.S. PATENT DOCUMENTS

| 5,949,555 | A | * | 9/1999 | Sakai et al. | 358/462 |
|---|---|---|---|---|---|
| 6,072,941 | A | * | 6/2000 | Suzuki et al. | 358/1.9 |
| 6,226,596 | B1 | * | 5/2001 | Gao | 702/16 |
| 6,256,093 | B1 | * | 7/2001 | Ravid et al. | 356/237.2 |
| 6,731,800 | B1 | | 5/2004 | Barthel et al. | |
| 7,145,693 | B2 | * | 12/2006 | Kagawa | 358/1.9 |
| 7,315,400 | B2 | * | 1/2008 | Kagawa et al. | 358/2.1 |
| 2005/0180645 | A1 | | 8/2005 | Hasegawa et al. | |
| 2005/0201624 | A1 | | 9/2005 | Hara et al. | |

FOREIGN PATENT DOCUMENTS

| CN | 1387722 A | 12/2002 |
|---|---|---|
| EP | 1 251 686 A1 | 10/2002 |
| JP | 7-236062 | 9/1995 |
| JP | 9-238256 | 9/1997 |
| JP | 11-261833 | 9/1999 |
| JP | 2001-245179 | 9/2001 |
| JP | 2002-368986 | 12/2002 |
| JP | 2003-058878 | 2/2003 |
| JP | 2003-087570 | 3/2003 |
| JP | 2003-143426 | 5/2003 |
| JP | 2004-032554 | 1/2004 |

* cited by examiner

*Primary Examiner*—Kanji Patel
(74) *Attorney, Agent, or Firm*—Oblon, Spivak, McClelland, Maier & Neustadt, L.L.P.

(57) ABSTRACT

An apparatus, method, system, computer program and product, each capable of compressing a multivalue image with control of memory space requirement.

20 Claims, 36 Drawing Sheets

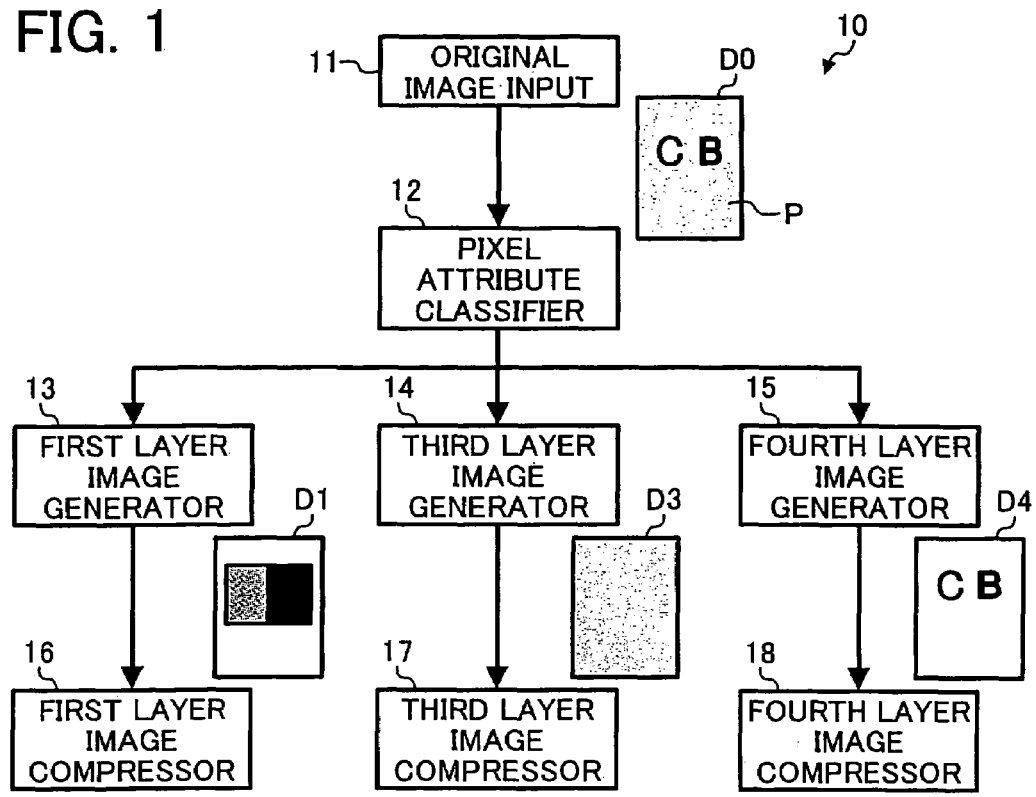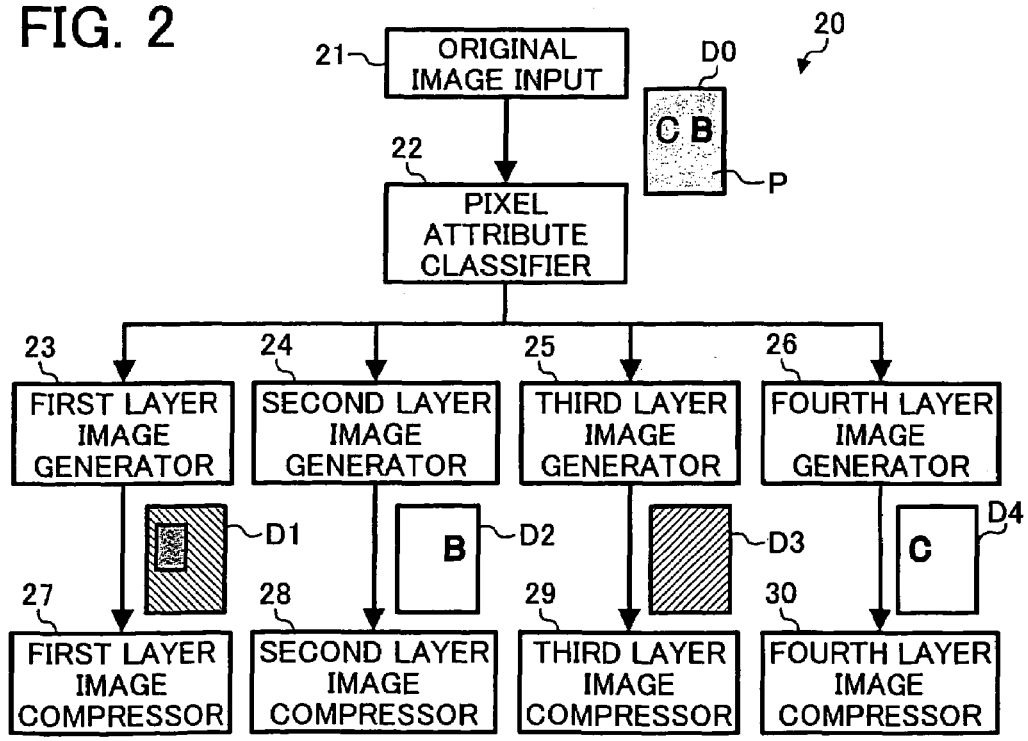

COMPRESSING A MULTIVALUE IMAGE WITH CONTROL OF MEMORY SPACE REQUIREMENT

BACKGROUND OF THE INVENTION

1. Field of the Invention

The field of invention relates generally to an apparatus, method, system, computer program and product, each capable of compressing a multivalue image with control of memory space requirement.

2. Description of the Related Art

In image processing systems, multivalue images, such as color images, are often compressed to save memory space or to reduce transmission time. For example, a lossy compression method such as JPEG may be applied to a multivalue image. However, when the multivalue image contains a high contrast edge, such as a character or a line, image quality may be degraded during the compression process.

One solution to this problem is to apply different compression methods to different sections of the multivalue image. For example, the multivalue image may be segmented into a foreground section and a background section. A first compression method, such as a lossless compression method, may be applied to the foreground section. A second compression method, such as a lossy method, may be applied to the background section.

However, in order to compress the multivalue image with high compression rate without suppressing image quality, the above-described method often requires highly accurate image segmentation. This often leads to increased computation load, thus requiring greater memory space.

SUMMARY OF THE INVENTION

In light of the above-discussed and other problems, this specification describes in one embodiment an apparatus, method, system, computer program and product, capable of compressing a multivalue image with control of memory space requirement.

Further, this specification describes in another embodiment an apparatus, method, system, computer program and product, capable of segmenting a multivalue image for compression with relatively high accuracy while conserving memory space.

Further, this specification describes in another embodiment an apparatus, method, system, computer program and product, capable of compressing a multivalue image with high compression rate without suppressing image quality.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

FIG. 1 is a schematic block diagram illustrating the functional structure of an image processing apparatus according to an exemplary embodiment of the present invention;

FIG. 2 is a schematic block diagram illustrating the functional structure of an image processing apparatus according to an exemplary embodiment of the present invention;

FIG. 13A is an exemplary illustration for explaining the operation shown in FIG. 11;

FIG. 13B is an exemplary illustration for explaining the operation shown in FIG. 11;

FIG. 13C is an exemplary illustration for explaining the operation shown in FIG. 11;

FIG. 13D is an exemplary illustration for explaining the operation shown in FIG. 11;

DETAILED DESCRIPTION OF THE EXEMPLARY EMBODIMENTS

Figure 3:
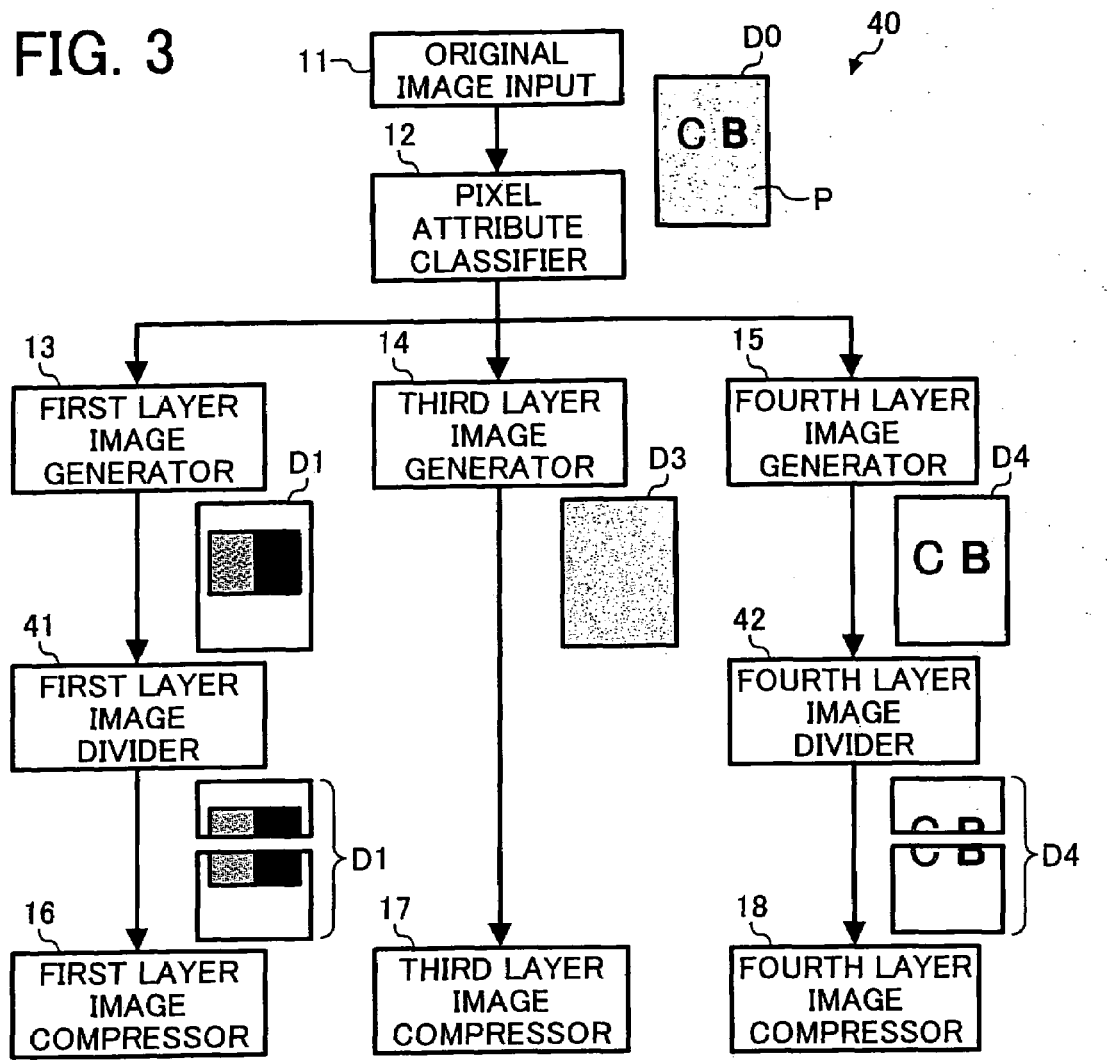
FIG. 3 is a schematic block diagram illustrating the functional structure of an image processing apparatus according to an exemplary embodiment of the present invention.

In describing the preferred embodiments illustrated in the drawings, specific terminology is employed for clarity. However, the disclosure of this patent specification is not intended to be limited to the specific terminology selected and it is to be understood that each specific element includes all technical equivalents that operate in a similar manner. Referring now to the drawings, wherein like reference numerals designate identical or corresponding parts throughout the several views, FIG. 1 illustrates an image processing apparatus 10 according to an exemplary embodiment of the present invention.

The image processing apparatus 10 segments an original multivalue image into a plurality of layer images, and compresses the plurality of layer images to generate a compressed image. The image processing apparatus 10 can compress each of the plurality of layer images. As shown in FIG. 1, the image processing apparatus 10 includes an original image input 11, a pixel attribute classifier 12, a first layer image generator 13, a third layer image generator 14, a fourth layer image generator 15, a first layer image compressor 16, a third layer image compressor 17, and a fourth layer image compressor 18. The original image input 11 inputs an original multivalue image to be processed, such as an original multivalue image D0 shown in FIG. 1. The original multivalue image D0 is a compound image having a foreground section including a non-black character "C" and a black character "B", and a background section including a picture P indicated by a gray area.

The pixel attribute classifier 12 classifies a pixel attribute of the original multivalue image D0. The pixel attribute corresponds to any kind of characteristics inherent to each pixel of the original multivalue image D0, such as its value, lightness, brightness, color, location, transparency, etc. The pixel attribute may be used to segment the original multivalue image D0 into a plurality of layer images.

In this example, the pixel attributes of the pixels in the original multivalue image D0 are classified into a first pixel attribute class representing a first layer image, and a third pixel attribute class representing a third layer image. Further, in this example, the first layer image corresponds to the foreground section of the original multivalue image D0 including the characters C and B. The third layer image corresponds to the background section of the original multivalue image D0 including the picture P.

The fourth layer image generator 15 generates a fourth layer image D4, which indicates whether the pixel attribute of a target pixel in the compressed image belongs to the first pixel attribute class or to the third pixel attribute class. For example, the fourth layer image D4 may be formed as a binary image having two types of pixels. The first type pixel has a pixel attribute indicating that the pixel attribute of the target pixel belongs to the first pixel attribute class, while the second type pixel has a pixel value indicating that the pixel attribute of the target pixel belongs to the third pixel attribute class.

The first or second type pixel may be expressed in various ways, as long as it has a pixel attribute indicating whether the pixel attribute of the target pixel belongs to the first or third pixel attribute class. In one example, the first type pixel may be expressed as a black pixel, while the second type pixel may be expressed as a white pixel. In another example, the first type pixel may be expressed as a white pixel, while the second type pixel may be expressed as a black pixel. In another example, the first type pixel may be expressed as an "ON" pixel, while the second type pixel may be expressed as an "OFF" pixel. In another example, the first type pixel may be expressed as an "OFF" pixel, while the second type pixel may be expressed as an "ON" pixel. In another example, the first type pixel may be expressed as a "1" pixel, while the second type pixel may be expressed as a "0" pixel. In another example, the first type pixel may be expressed as a "0" pixel, while the second type pixel may be expressed as a "1" pixel.

The first layer image generator 13 generates a first layer image D1 having a plurality of first pixels having a pixel attribute belonging to the first pixel attribute class. Each of the plurality of first pixels can have a pixel attribute belonging to the first pixel attribute class. Further, the plurality of first pixels in the first layer image D1 can be classified into a set of first defined pixels and a set of first undefined pixels.

In this example, the first defined pixel corresponds to any first pixel located at a specific location of the first layer image D1, which corresponds to a specific location of the fourth layer image D4 having the first type pixel. The first defined pixel is assigned with a pixel value calculated based on a pixel value extracted from a specific location of the original multivalue image D0, which corresponds to the specific location of the fourth layer image D4.

Further, the pixel value assigned to the first defined pixel may be adjusted. In one example, the set of first defined pixels may be further classified into a set of boundary first defined pixels and a set of non-boundary first defined pixels. The pixel value of a target boundary first defined pixel may be adjusted using the pixel values of the non-boundary first defined pixels located closely to (i.e., in a vicinity of) the target boundary first defined pixel. In another example, the pixel value of a target first defined pixel may be adjusted using the values of the pixels located closely to the target first defined pixel.

The pixel value of the first defined pixel may be used to determine a pixel value of the first undefined pixel. In this example, the first undefined pixel corresponds to any first pixel other than the first defined pixel in the first layer image D1. The pixel value of a target first undefined pixel may be calculated based on the pixel values of the first defined pixels located closely to the target first defined pixel. If the first defined pixel is not available, the pixel value of the target first undefined pixel may be set to a predetermined value belonging to the first pixel attribute class.

The third layer image generator 14 generates a third layer image D3 having a plurality of third pixels having a pixel attribute belonging to the third pixel attribute class. Each of the plurality of third pixels can have a pixel attribute belonging to the third pixel attribute class. Further, the plurality of third pixels in the third layer image D3 can be classified into a set of third defined pixels and a set of third undefined pixels.

In this example, the third defined pixel corresponds to any third pixel extracted from a specific location of the third layer image D3, which corresponds to a specific location of the fourth layer image D4 having the second type pixel. The third defined pixel is assigned with a pixel value calculated based on a pixel value extracted from a specific location of the original multivalue image D0, which corresponds to the specific location of the fourth layer image D4. Further, the pixel value assigned to the third defined pixel may be adjusted in a substantially similar manner as described above for the first defined pixel.

The pixel value of the third defined pixel may be used to determine a pixel value of the third undefined pixel. In this example, the third undefined pixel corresponds to any third pixel other than the third defined pixel in the third layer image D3. The pixel value of a target third undefined pixel may be calculated based on the pixel values of the third defined pixels located closely to the target third defined pixel. Alternatively, when the third defined pixel is not available, the pixel value of the target third undefined pixel may be set to a predetermined value belonging to the third pixel attribute class.

The first layer image compressor 16 compresses the first layer image D1 using a compression method suitable to the first layer image D1.

The third layer image compressor 17 compresses the third layer image D3 using a compression method suitable to the third layer image D3.

The fourth layer image compressor 18 compresses the fourth layer image D4 using a compression method suitable to the fourth layer image D4.

The image processing apparatus 10 of FIG. 1 may be implemented in various other ways. For example, any one of the elements or features described in FIG. 1 may be combined with one another. Alternatively, any one of the elements or features described in FIG. 1 may be further broken down into a plurality of elements or features.

Further, the image processing apparatus 10 of FIG. 1 may be provided with any other element or feature. In one example, the image processing apparatus 10 may be provided with an image combiner capable of combining the layer images into a compressed image. In another example, the image processing apparatus 10 may be provided with an image expander capable of expanding the compressed image into an expanded image. In another example, the image processing apparatus 10 may be provided with an output device capable of outputting the expanded image.

Referring now to FIG. 2, an image processing apparatus 20 is explained according to an exemplary embodiment of the present invention. The image processing apparatus 20 segments an original multivalue image into a plurality of layer images, and compresses the plurality of layer images to generate a compressed image. The image processing apparatus 23 can compress each of the plurality of layer images to generate a compressed image. As shown in FIG. 2, the image processing apparatus 20 includes an original image input 21, a pixel attribute classifier 22, a first layer image generator 23, a second layer image generator 24, a third layer image generator 25, a fourth layer image generator 26, a first layer image compressor 27, a second layer image compressor 28, a third layer image compressor 29, and a fourth layer image compressor 30.

The original image input 21 inputs an original multivalue image to be processed, such as an original multivalue image D0 shown in FIG. 2. The original multivalue image D0 is a compound image having a foreground section including a non-black character "C" and a black character "B", and a background section including a picture P indicated by a gray area.

The pixel attribute classifier 22 classifies a pixel attribute of the original multivalue image D0. The pixel attribute corresponds to any kind of characteristics inherent to pixels of the original multivalue image D0, such as its value, lightness, brightness, color, location, transparency, etc. The pixel attribute may be used to segment the original multivalue image D0 into a plurality of layer images.

In this example, the pixel attributes of the pixels in the original multivalue image D0 are classified into a first pixel attribute class representing a first layer image, a second pixel attribute class representing a second layer image, and a third pixel attribute class representing a third layer image. Further, in this example, the first layer image corresponds to a non-black color portion of the foreground section of the original multivalue image D0 including the character C. The second layer image corresponds to a black color portion of the foreground section of the original multivalue image D0 including the character B. The third layer image corresponds to the background section of the original multivalue image D0 including the picture P.

The second layer image generator 24 generates a second layer image D2, which indicates whether the pixel attribute of a target pixel in the compressed image belongs to the second pixel attribute class or to the other pixel attribute class. For example, the second layer image D2 may be formed as a binary image having two types of pixels. The third type pixel has a pixel attribute indicating that the pixel attribute of the target pixel belongs to the second pixel attribute class, while the fourth type pixel has a pixel attribute indicating that the pixel attribute of the target pixel belongs to the first or third pixel attribute class.

The third or fourth type pixel may be expressed in various ways, as long as it has a pixel attribute indicating whether the pixel attribute of the target pixel belongs to the second pixel attribute class or to the other pixel attribute class. In one example, the third type pixel may be expressed as a black pixel, while the fourth type pixel may be expressed as a white pixel. As a result, the binary image having a plurality of black pixels, which represents the black portion of the foreground section of the original multivalue image D0 may be generated as illustrated in FIG. 2.

The fourth layer image generator 26 generates a fourth layer image D4, which indicates whether the pixel attribute of a target pixel in the compressed image belongs to one of the first and third pixel attribute classes. For example, the fourth layer image D4 may be formed as a binary image having two types of pixels.

In one example, the first type pixel may have a pixel attribute indicating that the pixel attribute of the target pixel belongs to the first pixel attribute class, while the second type pixel may have a pixel attribute indicating that the pixel attribute of the target pixel belongs to the second or third pixel attribute class. In another example, the first type pixel may have a pixel attribute indicating that the pixel attribute of the target pixel belongs to the third pixel attribute class, while the second type pixel may have a pixel attribute indicating that the pixel attribute of the target pixel belongs to the first or second pixel attribute class.

The first or second type pixel may be expressed in various ways, as long as it has a pixel attribute indicating whether the pixel attribute of the target pixel belongs to one of the first and third pixel attribute classes. In one example, the first type pixel may be expressed as a black pixel, while the second type pixel may be expressed as a white pixel. In another example, the first type pixel may be expressed as a white pixel, while the second type pixel may be expressed as a black pixel. In another example, the first type pixel may be expressed as an "ON" pixel, while the second type pixel may be expressed as an "OFF" pixel. In another example, the first type pixel may be expressed as an "OFF" pixel, while the second type pixel may be expressed as an "ON" pixel. In another example, the first type pixel may be expressed as a "1" pixel, while the second type pixel may be expressed as a "0" pixel. In another example, the first type pixel may be expressed as a "0" pixel, while the second type pixel may be expressed as a "1" pixel.

The first layer image generator 23 generates a first layer image D1 having a plurality of first pixels having a pixel attribute belonging to the first pixel attribute class. Each of the plurality of first pixels can have a pixel attribute belonging to the first pixel attribute class. Further, the plurality of first pixels in the first layer image D1 can be classified into a set of first defined pixels and a set of first undefined pixels.

In one example, when the fourth layer image D4 has the first type pixel indicating that the pixel attribute of the target pixel belongs to the first pixel attribute class, the first defined pixel corresponds to any first pixel located at a specific location of the first layer image D1, which corresponds to a specific location of the fourth layer image D4 having the first type pixel. The pixel value of the first defined pixel may be calculated using a pixel value extracted from a specific location of the original multivalue image D0, which corresponds to the specific location of the fourth layer image D4.

In another example, when the fourth layer image D4 has the first type pixel indicating that the pixel attribute of the target pixel belongs to one of the second pixel attribute class and the third pixel attribute class, a specific location of the first defined pixel may be determined using the second layer image D2 in addition to the fourth layer image D4.

Further, the pixel value assigned to the first defined pixel may be adjusted. In one example, the set of first defined pixels may be further classified into a set of boundary first defined pixels and a set of non-boundary first defined pixels. The pixel value of a target boundary first defined pixel may be adjusted using the pixel values of the non-boundary first defined pixels located closely to the target boundary first defined pixel. In another example, the pixel value of a target first defined pixel may be adjusted using the values of the pixels located closely to the target first defined pixel.

The pixel value of the first defined pixel may be used to determine a pixel value of the first undefined pixel. In this example, the first undefined pixel corresponds to any first pixel other than the first defined pixel in the first layer image D1. In one example, the pixel value of a target first undefined pixel may be calculated based on the pixel values of the first defined pixels located closely to the target first defined pixel. In another example, the pixel value of a target first undefined pixel may be set to a predetermined value belonging to the first pixel attribute class. In another example, a predetermined value may be set so as to make a target first defined pixel into a transparent pixel.

The third layer image generator 25 generates a third layer image D3 having a plurality of third pixels having a pixel attribute belonging to the third pixel attribute class. Further, the plurality of third pixels in the third layer image D3 can be classified into a set of third defined pixels and a set of third undefined pixels.

In one example, when the fourth layer image D4 has the first type pixel indicating that the pixel attribute of the target pixel belongs to the third pixel attribute class, the third defined pixel corresponds to any third pixel located at a specific location of the third layer image D3, which corresponds to a specific location of the fourth layer image D4 having the first type pixel. The pixel value of the third defined pixel may be calculated based on a pixel value extracted from a specific location of the original multivalue image D0, which corresponds to the specific location of the fourth layer image D4. Further, the pixel value assigned to the third defined pixel may be adjusted in a substantially similar manner as described above for the first defined pixel.

In another example, when the fourth layer image D4 has the first type pixel indicating that the pixel attribute of the target pixel belongs to one of the second pixel attribute class and the third pixel attribute class, a specific location of the third defined pixel may be determined using the second layer image D2 in addition to the fourth layer image D4.

The pixel value of the third defined pixel may be used to determine a pixel value of the third undefined pixel. In this example, the third undefined pixel corresponds to any third pixel other than the third defined pixel in the third layer image D3. In one example, the pixel value of a target third undefined pixel may be calculated based on the pixel values of the third defined pixels located closely to the target third defined pixel. In another example, the pixel value of a target third undefined pixel may be set to a predetermined value belonging to the third pixel attribute class. In another example, a predetermined value may be set so as to make a target third defined pixel into a transparent pixel.

The first layer image compressor 27 compresses the first layer image D1 using a compression method suitable to the first layer image D1.

The second layer image compressor 28 compresses the second layer image D2 using a compression method suitable to the fourth layer image D2.

The third layer image compressor 29 compresses the third layer image D3 using a compression method suitable to the third layer image D3.

The fourth layer image compressor 30 compresses the fourth layer image D4 using a compression method suitable to the fourth layer image D4.

The image processing apparatus 20 of FIG. 2 may be implemented in various other ways. For example, any one of the elements or features described in FIG. 2 may be combined with one another. Alternatively, any one of the elements or features described in FIG. 2 may be further broken down into a plurality of elements or features.

Further, the image processing apparatus 20 of FIG. 2 may be provided with any other element or feature. In one example, the image processing apparatus 20 may be provided with an image combiner capable of combining the layer images into a compressed image. In another example, the image processing apparatus 20 may be provided with an image expander capable of expanding the compressed image into an expanded image. In another example, the image processing apparatus 20 may be provided with an output device capable of outputting the expanded image.

Referring now to FIG. 3, an image processing apparatus 40 is explained according to an exemplary embodiment of the present invention.

The image processing apparatus 40 segments an original multivalue image into a plurality of layer images, divides at least one of the plurality of layer images into a plurality of sections, and compresses the plurality of layer images to generate a compressed image. Each of the plurality of layer images can be compressed to generate a compressed image. As shown in FIG. 3, the image processing apparatus 40 is substantially similar in structure to the image processing apparatus 10 of FIG. 1. The differences include the addition of a first layer image divider 41 and a fourth layer image divider 42.

The first layer image divider 41 divides the first layer image D1 into a plurality of sections. The fourth layer image divider 42 divides the fourth layer image D4 into a plurality of sections.

The image processing apparatus 40 of FIG. 3 may be implemented in various other ways. For example, any one of the elements or features described in FIG. 3 may be combined with one another. Alternatively, any one of the elements or features described in FIG. 3 may be further broken down into a plurality of elements or features.

Further, the image processing apparatus 40 of FIG. 3 may be provided with any other element or feature. In one example, the image processing apparatus 40 may be provided with a second layer image generator and a second layer image compressor, for example, when the pixel attribute of the original multivalue image D0 is classified into three pixel attribute classes. In another example, the image processing apparatus 40 may be provided with an image combiner capable of combining the layer images into a compressed image. In another example, the image processing apparatus 40 may be provided with an image expander capable of expanding the compressed image into an expanded image. In another example, the image processing apparatus 40 may be provided with an output device capable of outputting the expanded image.

Figure 4:
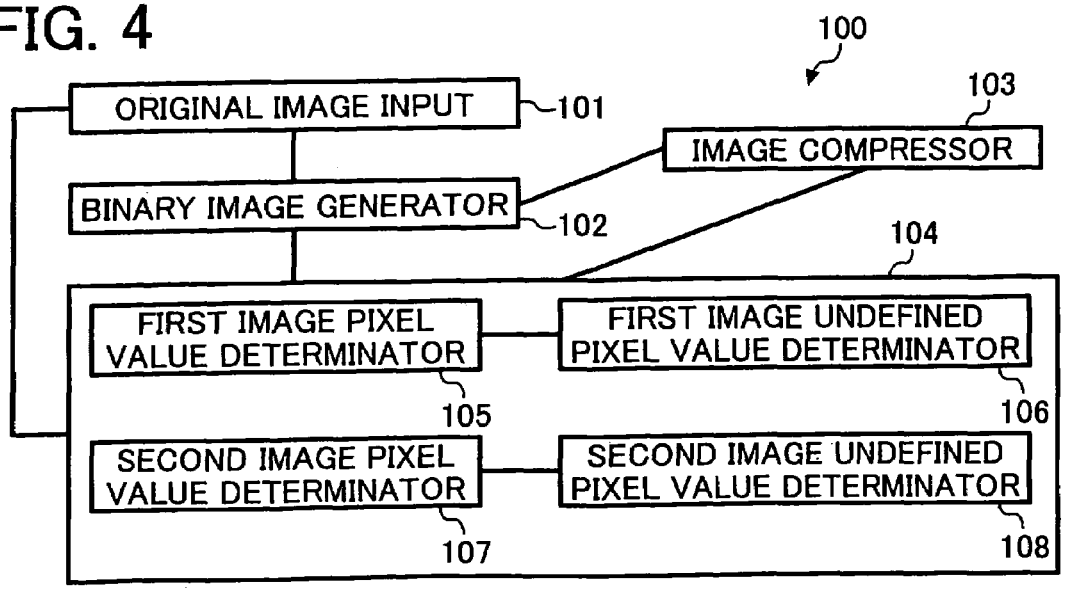
FIG. 4 is a schematic block diagram illustrating the functional structure of an image compressing apparatus according to an exemplary embodiment of the present invention.

Referring now to FIG. 4, an image compressing apparatus 100 is explained according to an exemplary embodiment of the present invention. The image compressing apparatus 100 segments an original multivalue image into a plurality of images, and compresses the plurality of images. Each of the plurality of images can be compressed.

As shown in FIG. 4, the image compressing apparatus 100 includes an original image input 101, a binary image generator 102, an image compressor 103, and a multivalue image generator 104. The multivalue image generator 104 includes a first image pixel value determinator 105, a first image undefined pixel value determinator 106, a second image pixel value determinator 107, and a second image undefined pixel value determinator 108.

The original image input 101 inputs an original multivalue image to be processed. The binary image generator 102 generates a binary image from the original multivalue image using any kind of binarization method. The multivalue image generator 104 generates a first multivalue image and a second multivalue image, respectively, using information obtained from the original multivalue image and information obtained from the binary image. The image compressor compresses the first multivalue image, the second multivalue image, and the binary image, respectively.

Figure 5:
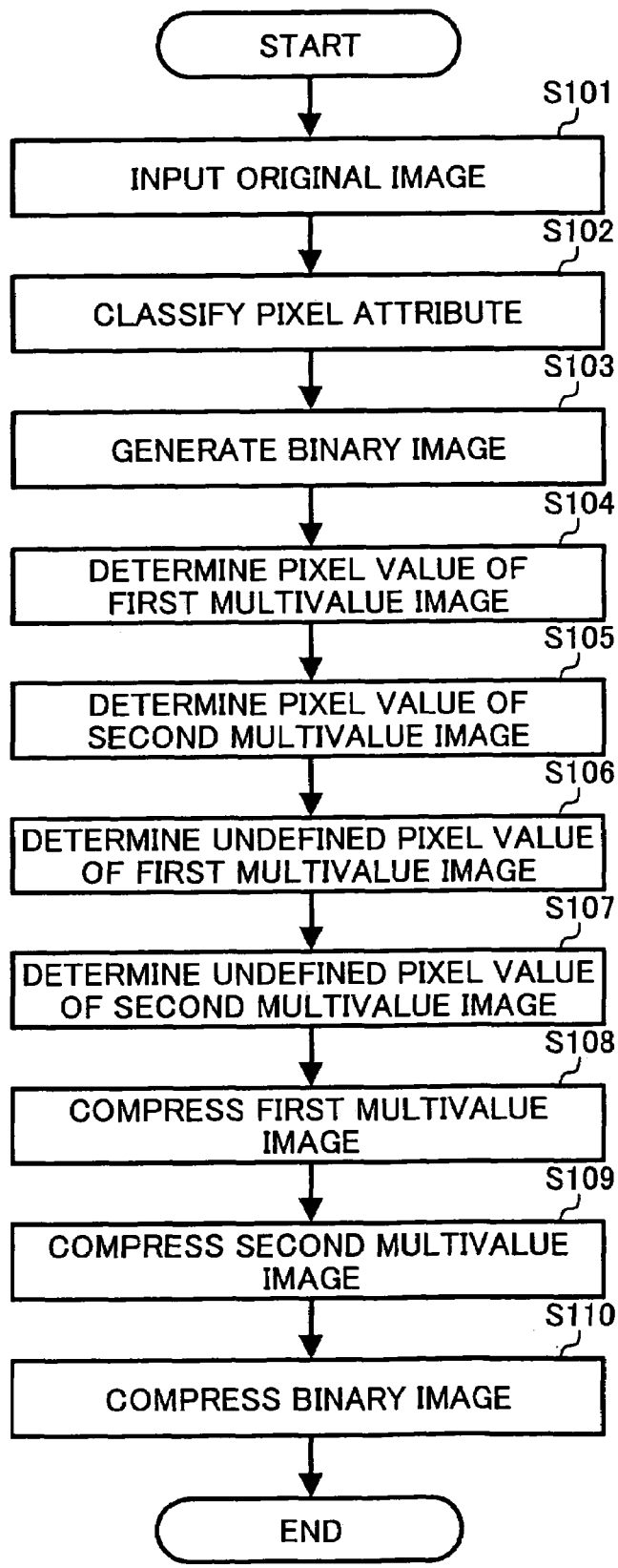
FIG. 5 is a flowchart illustrating operation of compressing a multivalue image, performed by the image compressing apparatus shown in FIG. 4, according to an exemplary embodiment of the present invention.
Figure 6:
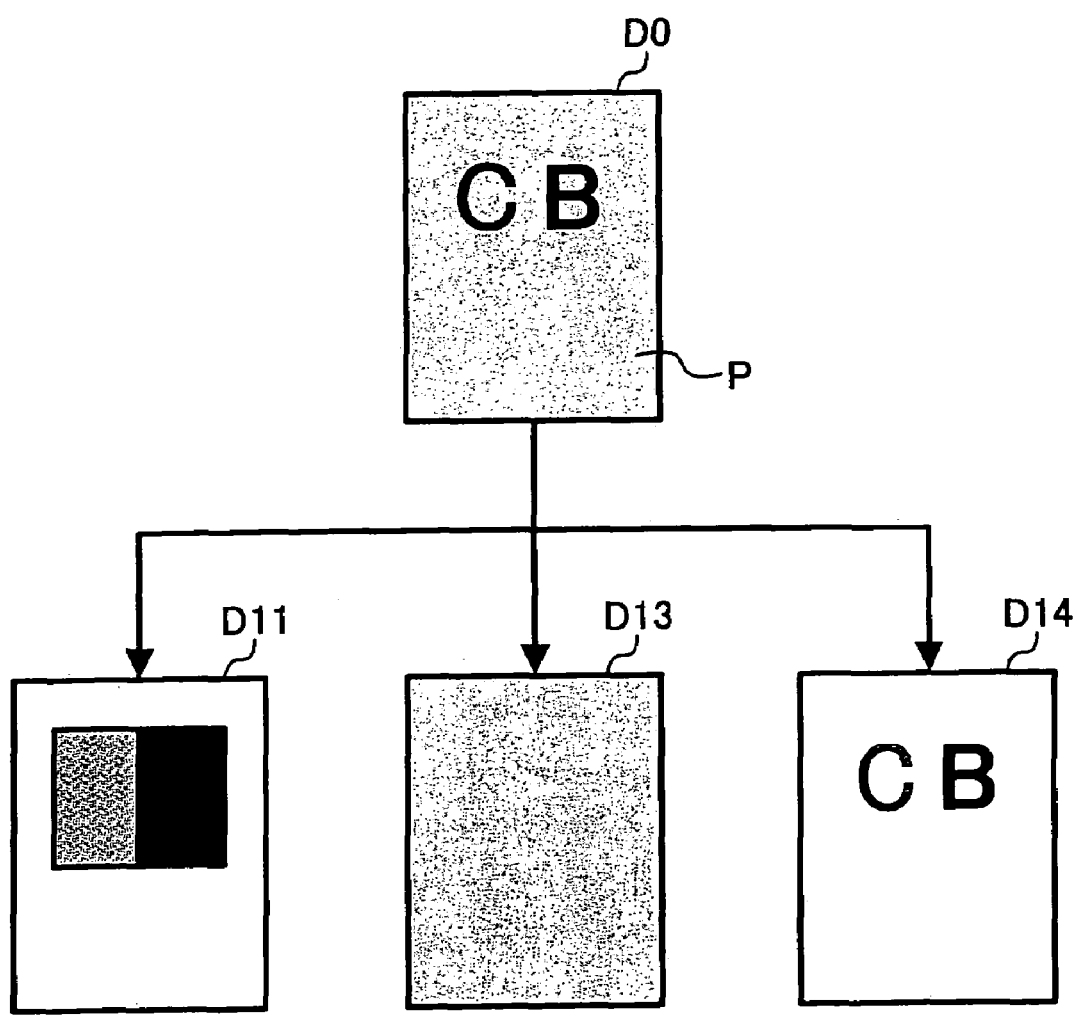
FIG. 6 is an illustration for explaining the operation shown in FIG. 5.

Referring to FIGS. 5 and 6, operation of compressing a multivalue image, performed by the image compressing apparatus 100, is explained according to an exemplary embodiment of the present invention.

In Step S101, the original image input 101 inputs an original multivalue image to be processed, such as an original multivalue image D0 shown in FIG. 6. The original multivalue image D0 in this example is a compound image having a foreground section including a non-black character "C" and a black character "B", and a background section including a picture P indicated by a gray area.

In Step S102 of FIG. 5, the binary image generator 102 classifies a pixel attribute of the original multivalue image D0. In this example, the pixel attributes of the pixels in the original multivalue image D0 are classified into a first pixel attribute class corresponding to the foreground section of the original multivalue image D0, and a second pixel attribute class corresponding to the background section of the original multivalue image D0.

In one example, the binary image generator 102 may obtain the lightness value of pixels in the original multivalue image D0. If the lightness value of a target pixel is equal to or greater than a predetermined threshold, the lightness value of the target pixel belongs to the second pixel attribute class. If the lightness value of a target pixel is less than the predetermined threshold, the lightness value of the target pixel belongs to the first pixel attribute class.

Alternatively, the binary image generator 102 may obtain the G value of pixels in the original multivalue image D0 to classify the pixel attributes. Further, the binary image generator 102 may classify the pixel attributes of the original multivalue image D0 using any kind of image segmentation method, as long as the original multivalue image D0 can be classified into the foreground section and the background section.

In Step S103, the binary image generator 102 generates a binary image D14 (FIG. 6) from the original multivalue image D0, using the classification result obtained in Step S102. Referring to the binary image D14 of FIG. 6, the pixel having a pixel attribute belonging to the second pixel attribute class is expressed in white. The pixel having a pixel attribute belonging to the first pixel attribute class is expressed in black. More specifically, the binary image D14 has a black pixel corresponding to the first attribute class representing the foreground section, and a white pixel corresponding to the second pixel attribute class representing the background section.

In Steps 104 to 107 of FIG. 5, the multivalue image generator 104 generates a first multivalue image D11 (FIG. 6) and a second multivalue image D13 (FIG. 6), using information obtained from the original multivalue image D0 and information obtained from the binary image D14.

In this example, the first multivalue image D11 of FIG. 6 has a plurality of first pixels having a pixel attribute belonging to the first pixel attribute class. Further, the plurality of first pixels in the first multivalue image D11 can be classified into a set of first defined pixels and a set of first undefined pixels. The second multivalue image D13 of FIG. 6 has a plurality of second pixels having a pixel attribute belonging to the second pixel attribute class. Further, the plurality of second pixels in the second multivalue image D13 can be classified into a set of second defined pixels and a set of second undefined pixels.

Figure 7:
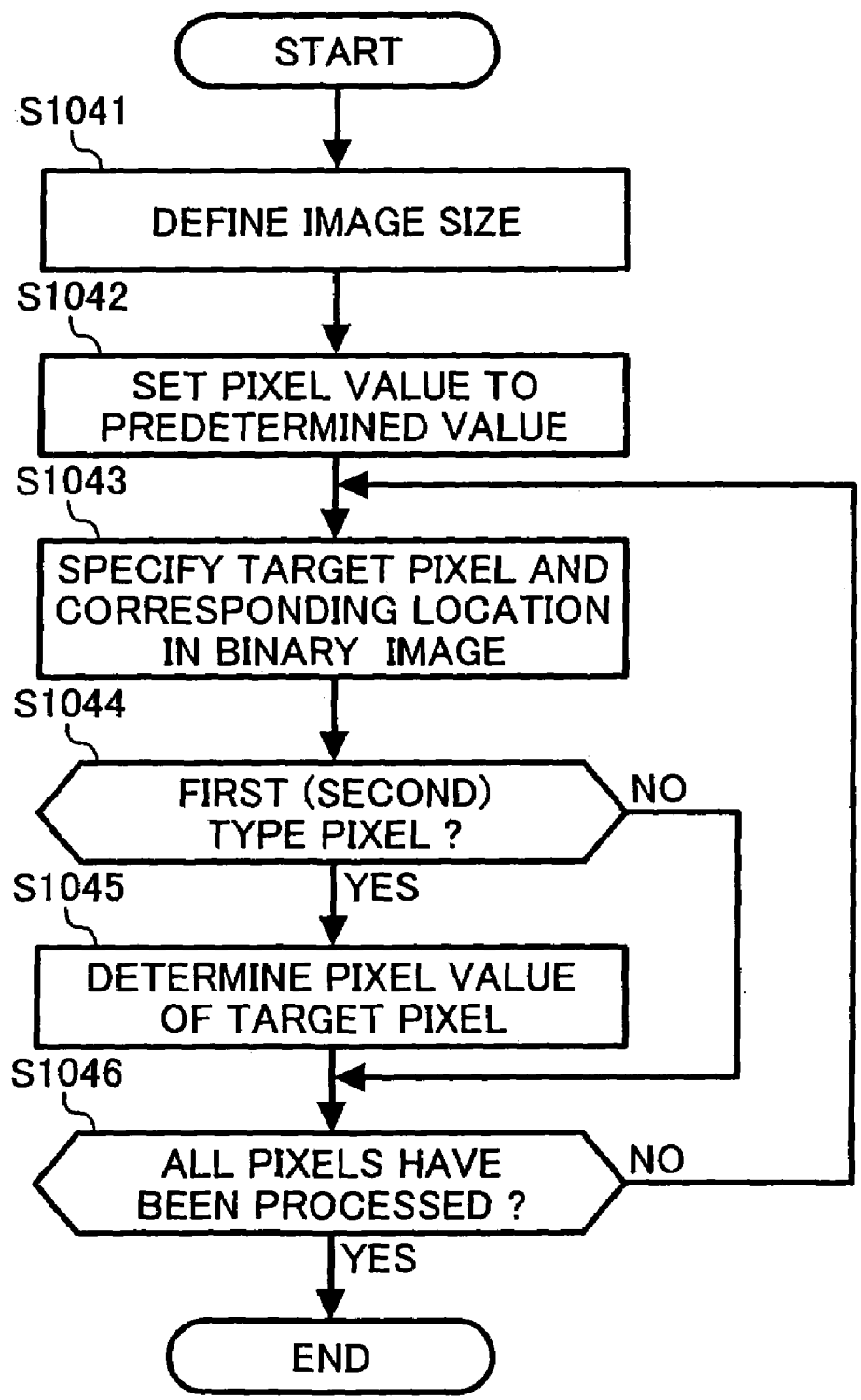
FIG. 7 is a flowchart illustrating operation of determining a pixel value of a defined pixel in a multivalue image according to an exemplary embodiment of the present invention.

More specifically, in Step S104 of FIG. 5, the first image pixel value determinator 105 determines a pixel value of the first defined pixel based on a pixel value extracted from the original multivalue image D0. Similarly, in Step S105, the second image pixel value determinator 107 determines a pixel value of the second defined pixel based on a pixel value extracted from the original multivalue image D0. Step S104 or S105 may be performed in a plurality of steps as illustrated in FIG. 7, which will be described below.

In Step S106 of FIG. 5, the first image undefined pixel value determinator 106 determines a pixel value of the first undefined pixel based on the pixel value of the first defined pixel. Similarly, in Step S107, the second image undefined pixel value determinator 108 determines a pixel value of the second undefined pixel based on the pixel value of the second defined pixel. Step S106 or S107 may be performed in a plurality of steps illustrated in FIG. 11, for example, which will be described below.

In Step S108 of FIG. 5, the image compressor 103 compresses the first multivalue image D11 into a first compressed multivalue image using a compression method suitable to the first multivalue image D11. In this example, JPEG or JPEG 2000 may be used.

In Step S109, the image compressor 103 compresses the second multivalue image D13 into a second compressed multivalue image using a compression method suitable to the second multivalue image D13. In this example, JPEG or JPEG 2000 may be used.

In Step S110, the image compressor 103 compresses the binary image D14 into a compressed binary image using a compression method suitable to the binary image D14. In this example, MMR, JBIC; or JBIG2 may be used.

Referring now to FIGS. 7 to 10, operation of determining the pixel value of the defined pixel is explained according to an exemplary embodiment of the present invention. The steps illustrated in FIG. 7 may be performed by the first image pixel value determinator 105 or the second image pixel value determinator 107. For the illustrative purpose, the following describes the exemplary case of determining the pixel value of the first defined pixel, performed by the first image pixel value determinator 105.

Step S1041 of FIG. 7 defines a size of the first multivalue image D11. For example, the size of the first multivalue image D11 may be set equal to the size of the original multivalue image D0. In another example, the size of the first multivalue image D11 may be made half of the size of the original multivalue image D0, as illustrated in any one of FIGS. 8, 9 and 10. By reducing the size of the first multivalue image D11 relative to the size of the original multivalue image. D0, higher compression may be achieved. Alternatively, in this step, the first image pixel value determinator 105 may define a resolution of the first multivalue image D11.

Step S1042 of FIG. 7 sets the pixel value of pixels in the first multivalue image D11 to a predetermined value belonging to the first pixel attribute class. In this example, the pixels are made into black pixels having the pixel value corresponding to the black color.

Step S1043 specifies a target pixel in the first multivalue image D11, and further specifies a location in the binary image D14 that corresponds to the location of the target pixel in the first multivalue image D11. For example, as illustrated in any one of FIGS. 8, 9, and 10, when a target pixel P11 located at a location L11 is selected from the first multivalue image D11, the first image pixel value determinator 105 specifies a location L14 in the binary image D14 that corresponds to the location L11.

Step S1044 of FIG. 7 determines whether the corresponding location in the binary image D14 contains a first type pixel, i.e., a black pixel, indicating that the pixel attribute of the target pixel belongs to the first pixel attribute class. If the corresponding location contains one or more black pixels ("YES" in Step S1044), the operation proceeds to Step S1045. If the corresponding location has no black pixels ("NO" in Step S1044), the operation proceeds to Step S1046.

Figure 8:
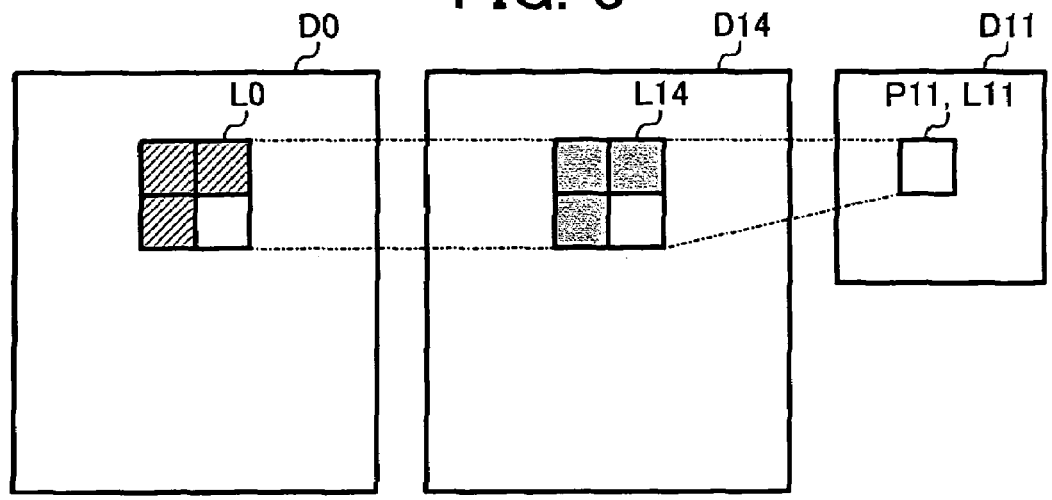
FIG. 8 is an exemplary illustration for explaining the operation shown in FIG. 7.

In the exemplary case shown in FIG. 8, since the corresponding location L14 contains three black pixels (indicated by black color), the operation proceeds to Step S1045. In the exemplary case shown in FIG. 9, since the corresponding location L14 contains one black pixel, the operation proceeds to Step S1045.

Figure 10:
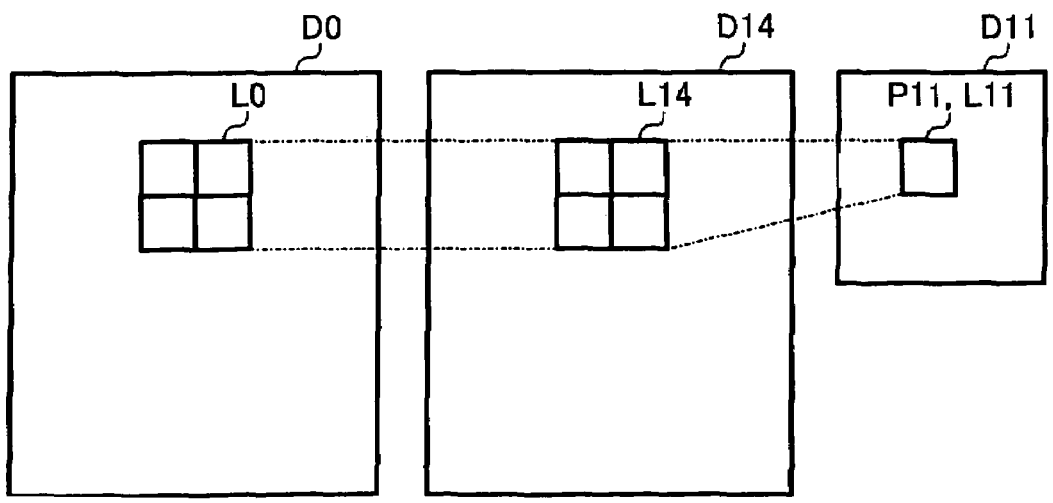
FIG. 10 is an exemplary illustration for explaining the operation shown in FIG. 7.

In the exemplary case shown in FIG. 10, since the corresponding location L14 contains no black pixels, the operation proceeds to Step S1046 without determining the pixel value of the target pixel P11. The target pixel P11, which belongs to the undefined pixel, will be processed in Step S107.

Step S1045 of FIG. 7 determines the pixel value of the target pixel based on a pixel value obtained from the original multivalue image D0. In this example, the first image pixel value determinator 105 specifies a location in the original multivalue image D0, which corresponds to the corresponding location in the binary image D14 specified in Step S1043. The first image pixel value determinator 105 obtains the pixel value of a pixel at the specified location in the original multivalue image D0, and determines the pixel value of the target pixel in the first multivalue image D11 using the obtained pixel value.

In the exemplary case shown in FIG. 8, the location L0 of the original multivalue image D0 corresponds to the location L14 of the binary image D14. The first image pixel value determinator 105 obtains the pixel values of the black pixels contained in the location L0, and calculates their average. The calculated average value is assigned to the target pixel P11 in the first multivalue image D11.

Figure 9:
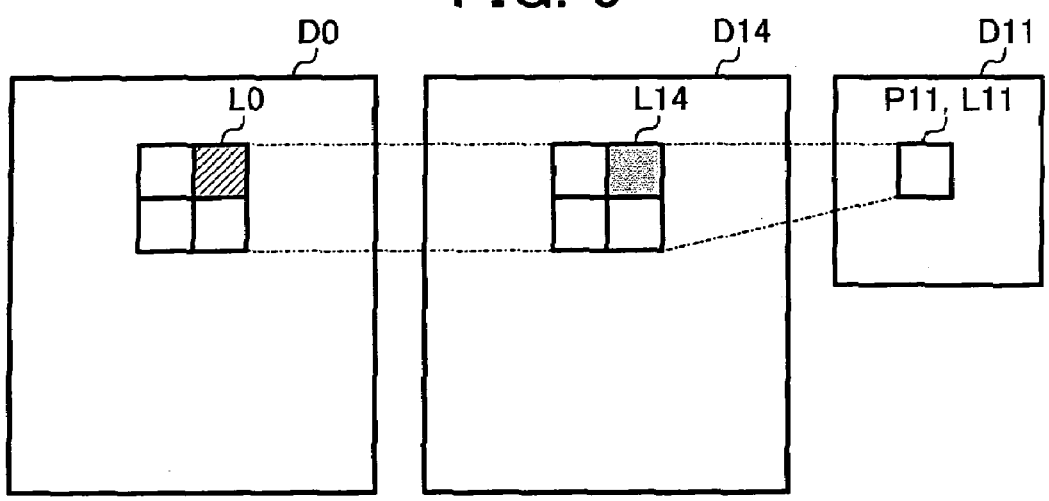
FIG. 9 is an exemplary illustration for explaining the operation shown in FIG. 7.

In the exemplary case shown in FIG. 9, the location L0 contains one black pixel. The first image pixel value determinator 105 obtains the pixel value of the black pixel contained in the location L0, and assigns the obtained pixel value to the target pixel P11 in the first multivalue image D11.

Step S1046 of FIG. 7 determines whether all pixels in the first multivalue image D11 have been processed. If all pixels have been processed ("YES" in Step S1046), the operation of FIG. 7 ends. Otherwise ("NO" in Step S1046), the operation returns to Step S1043 to process a next target pixel.

As described above, the pixel value of the second defined pixel in the second multivalue image D13 may be determined in a substantially similar manner as described referring to the operation shown in FIG. 7. To determine the pixel value of the second multivalue image D13, the second type pixel, i.e., the white pixel, in the binary image D14 is used to specify a pixel value in the original multivalue image D0. Further, the size of the second multivalue image D13 may be preferably made equal to the size of the first multivalue image D11.

Referring now to FIGS. 11, 12, and 13A to 13D, operation of determining the pixel value of the undefined pixel is explained according to an exemplary embodiment of the present invention. The steps illustrated in FIG. 11 may be performed by the first image undefined pixel value determinator 106 or the second image undefined pixel value determinator 108. For the illustrative purpose, the following describes the exemplary case of determining the pixel value of the first undefined pixel, performed by the first image undefined pixel value determinator 106.

Figure 12:
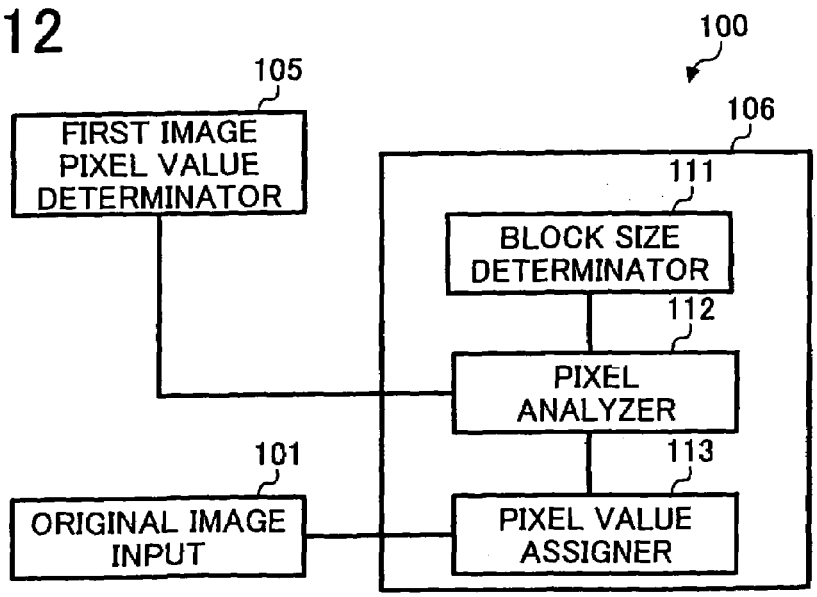
FIG. 12 is a schematic block diagram illustrating the functional structure of an undefined pixel value determinator shown in FIG. 4.

As shown in FIG. 12, the first image undefined pixel value determinator 106 may include a block size determinator 111, a pixel analyzer 112, and a pixel value assigner 113. The block size determinator 111 determines a size of a processed block, such as its initial size and reference size. The pixel analyzer 112 analyzes the pixels contained in the processed block. The pixel value assigner 113 determines the pixel value of the undefined pixel in the processed block using the pixel value of the defined pixel in the processed block, if the undefined pixel and the defined pixel are contained in the processed block. This may increase smoothness of the multivalue image.

Figure 11:
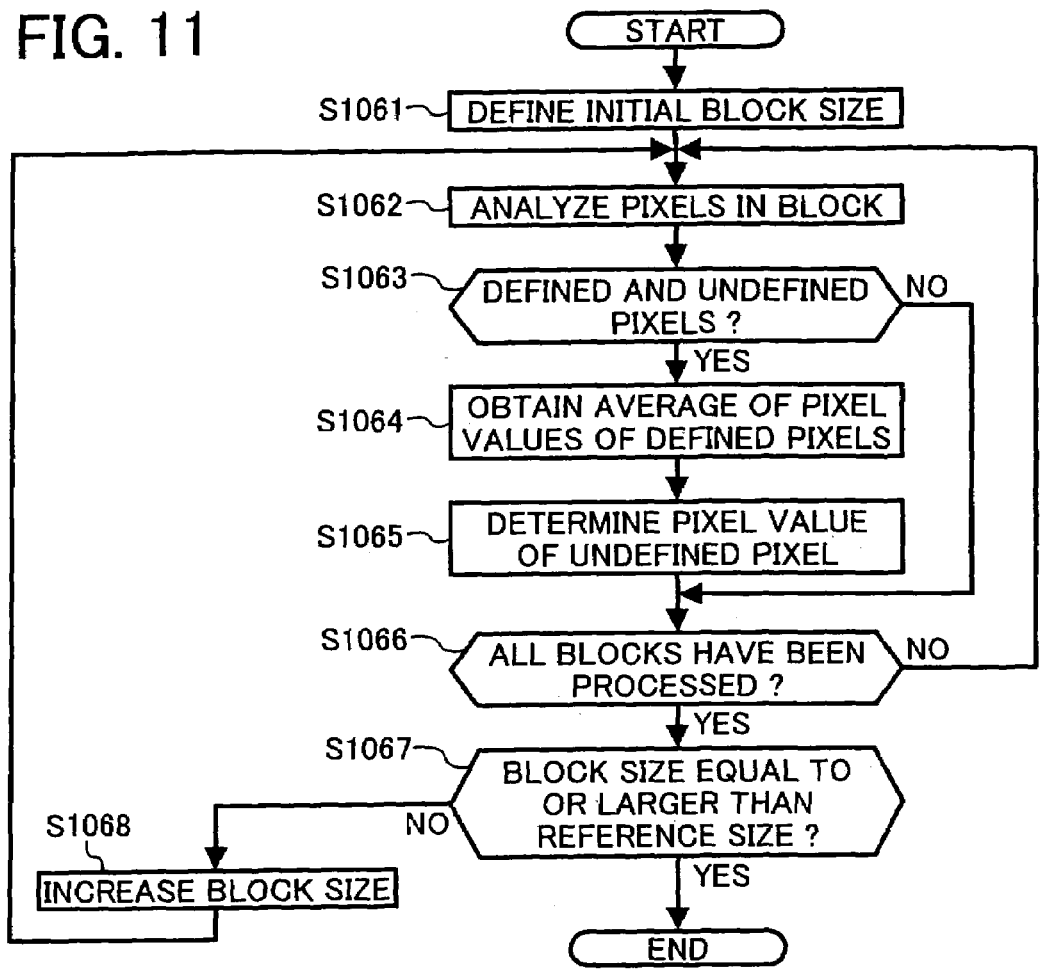
FIG. 11 is a flowchart illustrating operation of determining a pixel value of an undefined pixel in a multivalue image according to an exemplary embodiment of the present invention.
Figures 13A, 13B, 13C, 13D:
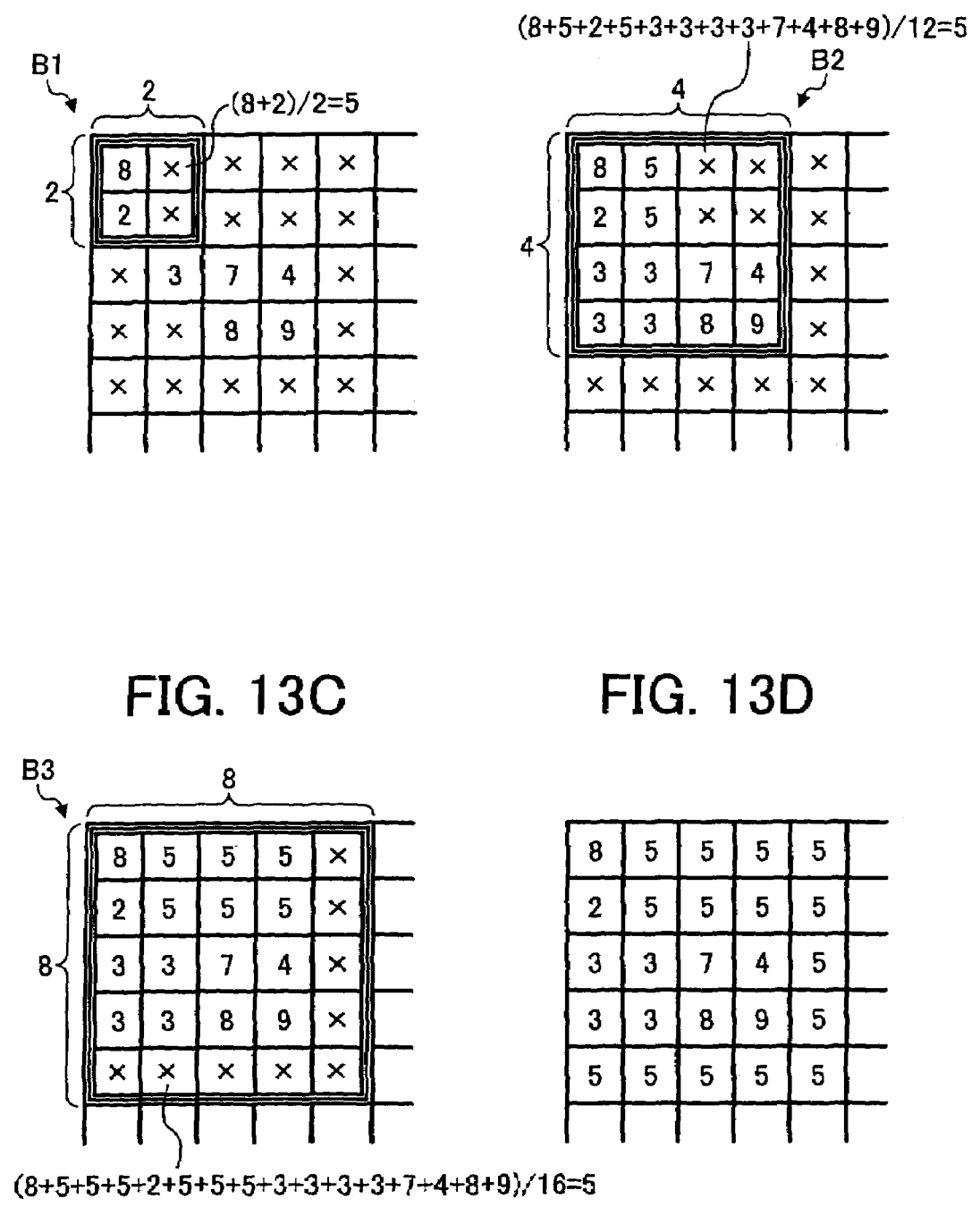

More specifically, in Step S1061 of FIG. 11, the block size determinator 111 defines an initial block size to be processed. For example, the initial block size may be set to 2 pixels by 2 pixels as illustrated in FIG. 13A. At the same time, the first multivalue image D11 may be divided into a plurality of blocks, each block having the defined block size.

In Step S11062 of FIG. 11, the pixel analyzer 112 selects a target block in the first multivalue image D11, and analyzes the pixels contained in the target block. In this example, the pixel analyzer 112 counts the number of defined pixels as well as the number of undefined pixels in the target block. In the exemplary case shown in FIG. 13A, the target block B1 has two defined pixels indicated respectively by the numbers "8" and "2", and two undefined pixels each indicated by the symbol "x".

In Step S1063, the pixel analyzer 112 determines whether the target block includes at least one defined pixel and at least one undefined pixel, using the counted result obtained in Step S1062. If the defined pixel and the undefined pixel are both included ("YES" in Step S1063), the operation proceeds to Step S1064. Otherwise ("NO" in Step S1063), the operation proceeds to Step S1066. In the exemplary case shown in FIG. 13A, since the target block B1 includes both of the defined and undefined pixels, the operation proceeds to Step S1064.

In Step S1064, the pixel analyzer 112 obtains the pixel values of the defined pixels, and calculates the average of the obtained pixel values. In the exemplary case shown in FIG. 13A, the pixel analyzer 112 calculates the average of the pixel values "8" and "2" to obtain the average value "5". Alternatively, if only one defined pixel is contained in the target block, the pixel analyzer 112 obtains the pixel value of the defined pixel as the average value.

In Step S1065, the pixel value assigner 113 determines the pixel value of the undefined pixel in the target block. In this example, the pixel value assigner 113 assigns the average value obtained in Step S1064. In the exemplary case shown in FIG. 13A, the pixel value assigner 113 assigns the average value "5" to each of the undefined pixels in the target block B1.

Step S1066 determines whether all blocks in the first multivalue image D11 have been processed. If all blocks have been processed ("YES" in Step S1066), the operation proceeds to Step S1067. Otherwise ("NO" in Step S0166), the operation returns to Step S1062 to process a next target block.

In Step S1067, the block size determinator 1111 determines whether the size of the target block being processed is equal to or larger than the reference size. If the size of the processed block is equal to or larger than the reference size ("YES" in Step S1067), the operation ends. If the size of the processed block is smaller than the reference size ("NO" in Step S1067), the operation proceeds to Step S1068. In this example, the reference size is previously set to 8 pixels by 8 pixels.

In Step S1068, the block size determinator 111 increases the block size to be processed by a predetermined amount. For example, as illustrated in FIGS. 13A and 13B, the initial block size of 2 pixels by 2 pixels shown in FIG. 13A is increased to the block size of 4 pixels by 4 pixels shown in FIG. 13B. The first image undefined pixel value determinator 106 then repeats Steps 1062 to S1067 for a target block B2 having the increased block size.

For example, the target block B2 of FIG. 13B includes four undefined pixels each indicated by the symbol "x", and twelve defined pixels each indicated by the number. The average value "5" of the pixel values of the defined pixels is assigned to each of the undefined pixels.

Further, as illustrated in FIGS. 13B and 13C, the block size of 4 pixels by 4 pixels shown in FIG. 13B is increased to the block size of 8 pixels by 8 pixels shown in FIG. 13C. The target block B3 of FIG. 13C includes nine undefined pixels each indicated by the symbol "x", and sixteen defined pixels each indicated by the number. The average value "5" of the pixel values of the defined pixels is assigned to each of the undefined pixels. Since the block size of the target block B3 reaches the reference size, which is 8 pixels by 8 pixels, the operation ends. As a result, the pixel values of the undefined pixels are determined as illustrated in FIG. 13D.

In this example, the initial block size is made smaller than the reference size. Alternatively, the initial block size may be set equal to the reference size, thus increasing the processing speed. Further, the predetermined amount for increasing the block size may be changed.

The operation illustrated in FIG. 5 may be performed in various other ways. For example, the steps illustrated in FIG. 5 may be performed in different orders. Further, Steps S102 and S103 may be combined into one step of generating a binary image, as long as the binary image indicates the foreground section and the background section of the original multivalue image.

Further, the components of the image compressing apparatus 100 of FIG. 4 may be combined with each other, or each of the components may be further broken down into smaller components. In one example, a pixel attribute classifier may be provided to perform a part of the functions of the binary image generator 102. In another example, the image compressor 103 may be further broken down into a first image compressor for compressing the first multivalue image, a second image compressor for compressing the second multivalue image, and a binary image compressor for compressing the binary image.

Furthermore, the image compressing apparatus 100 may be provided with any other component, device, or apparatus. In one example, the image compressing apparatus 100 may be provided with a pixel value adjusting device 130 illustrated in FIG. 14. In another example, the image compressing apparatus 100 may be provided with an image combiner 150 illustrated in FIG. 19. In another example, the image compressing apparatus 100 may be provided with an image expander 140 illustrated in FIG. 20.

Figure 14:
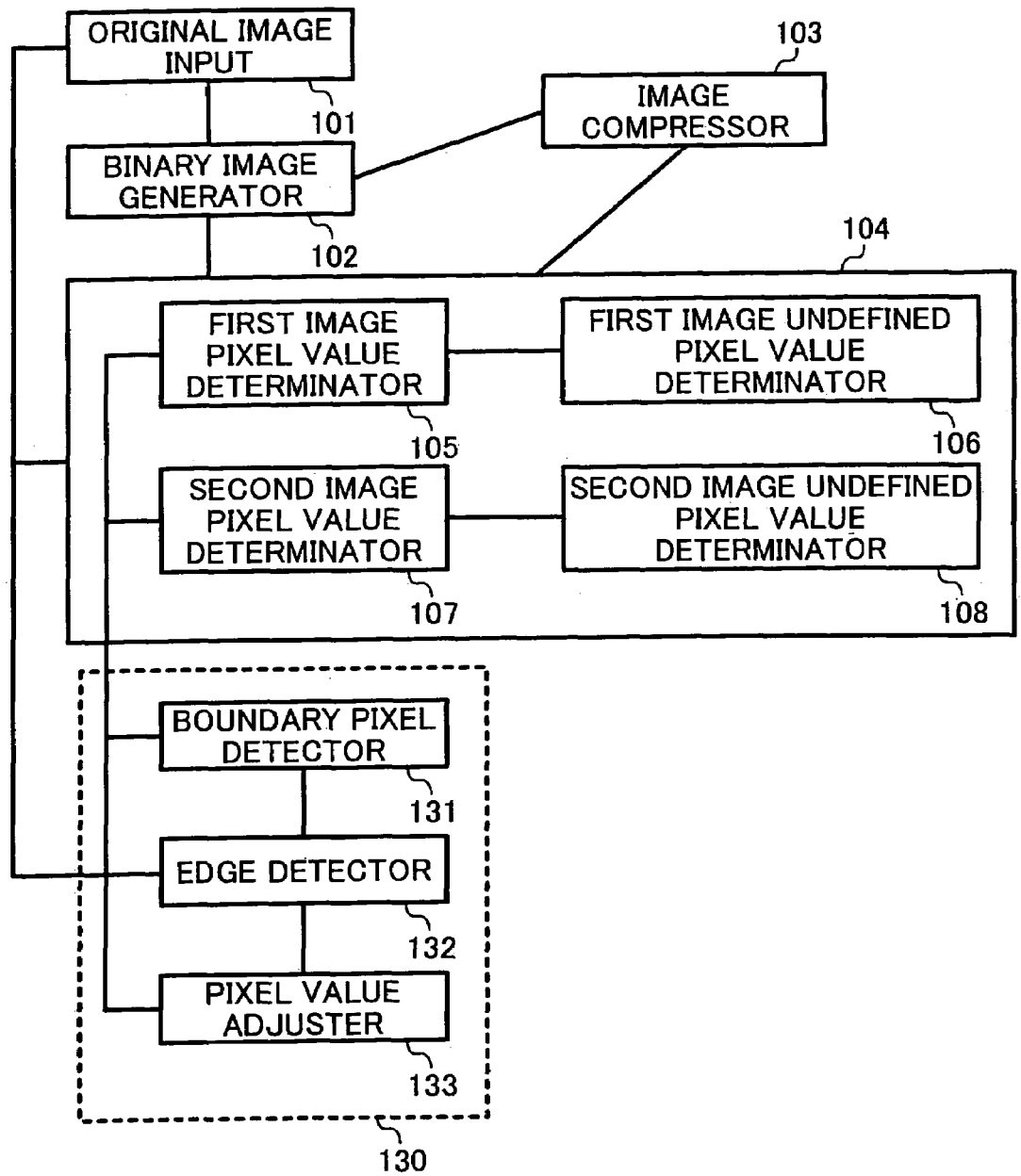
FIG. 14 is a schematic block diagram illustrating the functional structure of an image compressing apparatus according to an exemplary embodiment of the present invention.

Referring now to FIG. 14, the structure of the pixel value adjusting device 130 is explained according to an exemplary embodiment of the present invention. The pixel value adjusting device 130 is capable of adjusting a pixel value of the first or second defined pixel (collectively referred to as the "defined pixel") in the first or second multivalue image (collectively referred to as the "multivalue image"). As shown in FIG. 14, the pixel value adjusting device 130 includes a boundary pixel detector 131, an edge detector 132, and a pixel value adjuster 133.

The boundary pixel detector 131 classifies the defined pixels in the multivalue image into a set of boundary defined pixels and a set of non-boundary defined pixels. The edge detector 132 determines whether a target boundary defined pixel belongs to an edge portion of the multivalue image to generate a detection result. Based on the detection result, the pixel value adjuster 133 adjusts the pixel value of the target boundary defined pixel using the pixel value of the non-boundary defined pixel located closely to the target boundary defined pixel. This may increase sharpness of the multivalue image.

Figure 15:
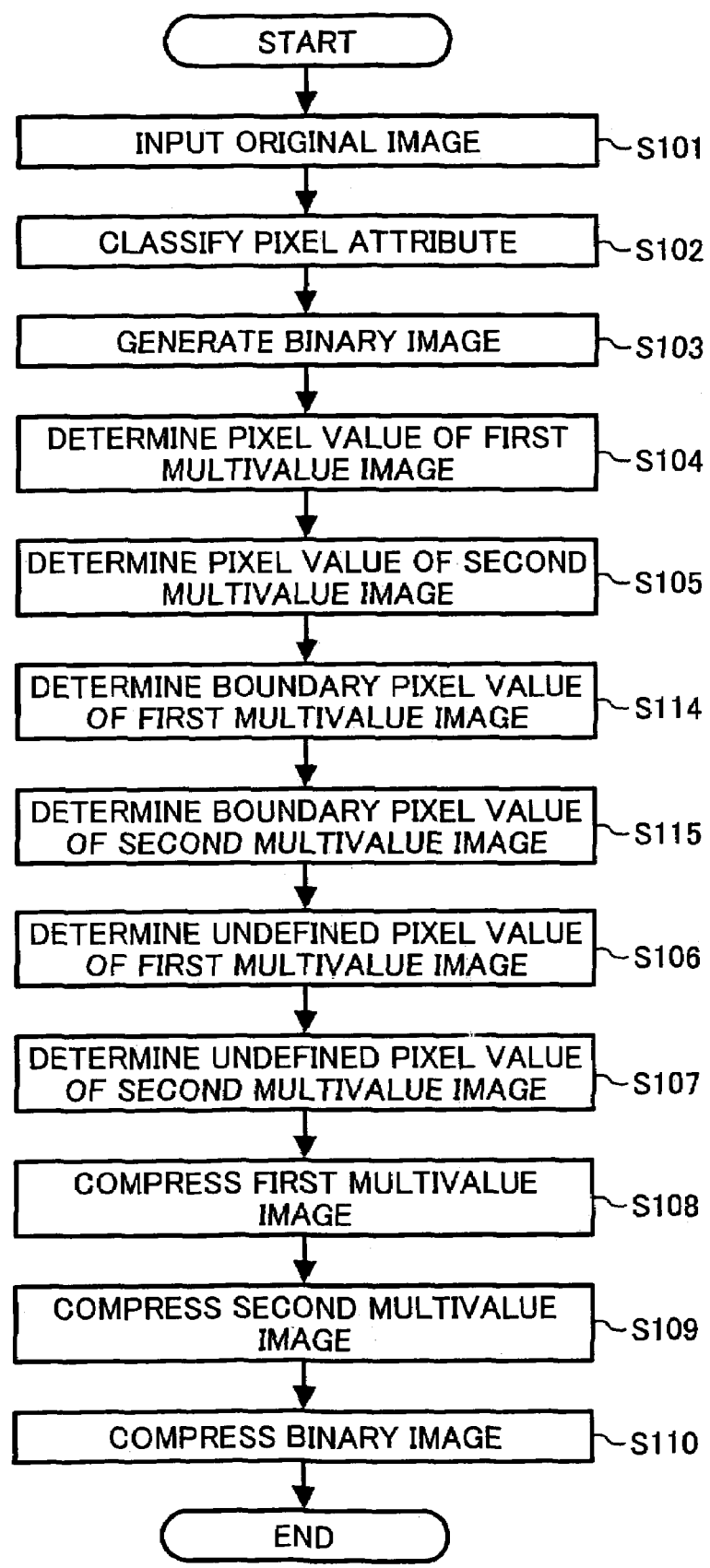
FIG. 15 is a flowchart illustrating operation of compressing a multivalue image, performed by the image compressing apparatus shown in FIG. 14, according to an exemplary embodiment of the present invention.

Referring to FIG. 15, operation of compressing a multivalue image, performed by the image processing apparatus of FIG. 14, is explained according to an exemplary embodiment of the present invention. The operation illustrated in FIG. 15 is substantially similar to the operation illustrated in FIG. 5. The differences include the addition of Steps S114 and S115.

In Step S114, the first defined pixel located near (i.e., in a vicinity of) the first undefined pixel is extracted from the first multivalue image as a boundary first defined pixel. The pixel value of the boundary first defined pixel may be adjusted. Similarly, in Step S115, the second defined pixel located near the second undefined pixel is extracted from the second multivalue image as a boundary second defined pixel. The pixel value of the boundary second defined pixel may be adjusted. Step S114 or S115 may be performed in a plurality of steps illustrated in FIG. 16, for example, which will be described below.

Figure 16:
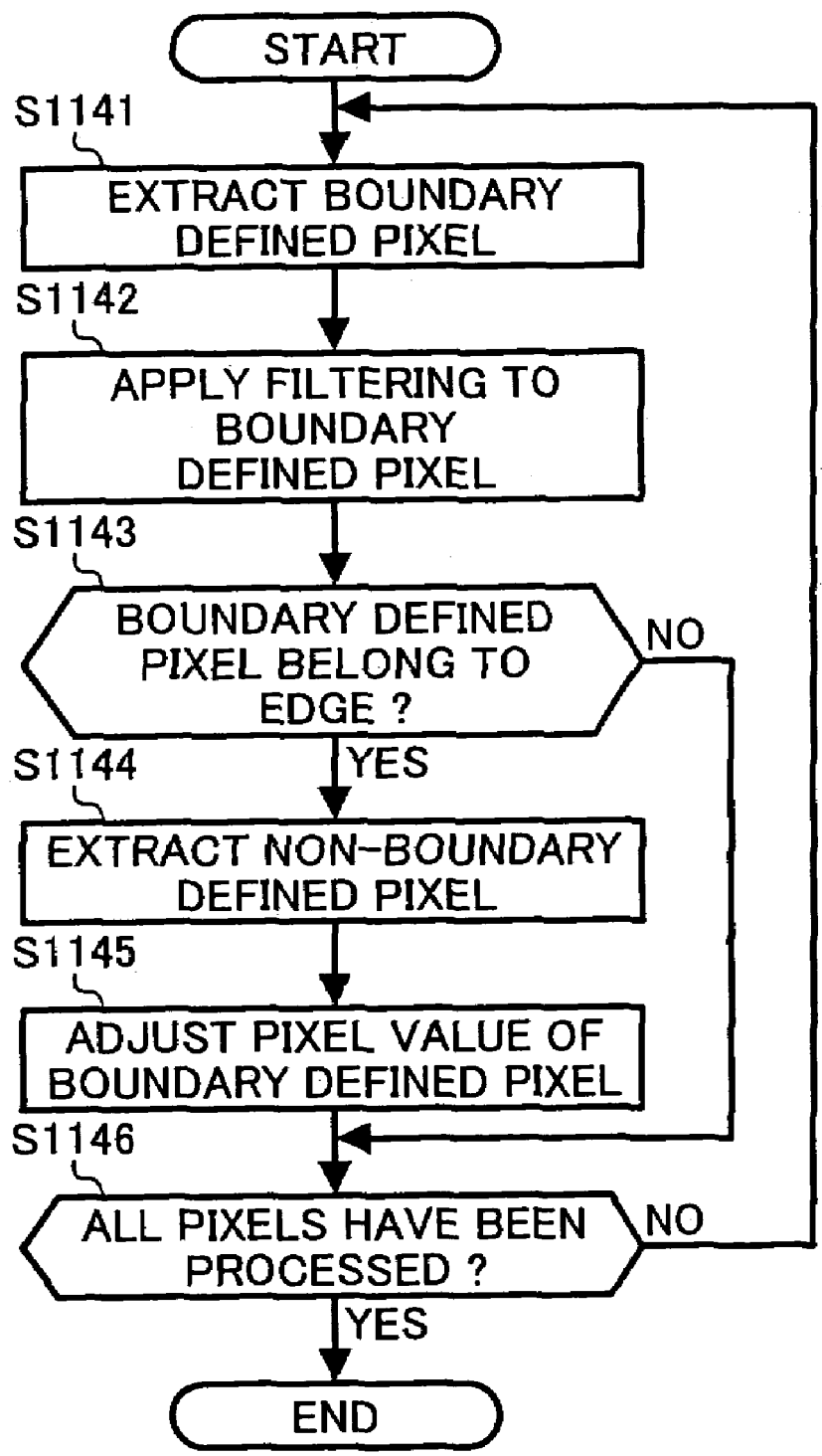
FIG. 16 is a flowchart illustrating operation of determining a pixel value of a boundary defined pixel according to an exemplary embodiment of the present invention.

Referring now to FIG. 16, operation of determining the pixel value of the boundary defined pixel is explained according to an exemplary embodiment of the present invention. The steps illustrated in FIG. 16 may be performed by the pixel value adjusting device 130 for the first multivalue image and/or the second multivalue image.

In Step S141 of FIG. 16, the boundary pixel detector 131 extracts the defined pixel located near the undefined pixel as a boundary defined pixel. For example, the boundary pixel detector 131 may select a target undefined pixel in the multivalue image, and extracts any defined pixel, which is located within a predetermined distance from the target undefined pixel, as a boundary defined pixel for the target undefined pixel.

The predetermined distance may be previously set to one pixel, for example.

In Step S1142, the edge detector 132 applies filtering to the boundary defined pixel in the multivalue image to detect whether the boundary defied pixel belongs to an edge portion of the multivalue image.

Figure 17A:
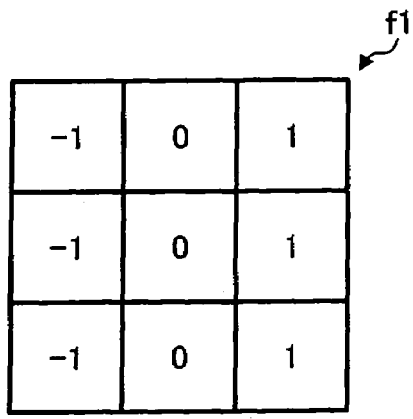
FIG. 17A is an exemplary illustration for explaining the operation shown in FIG. 16.
Figure 17B:
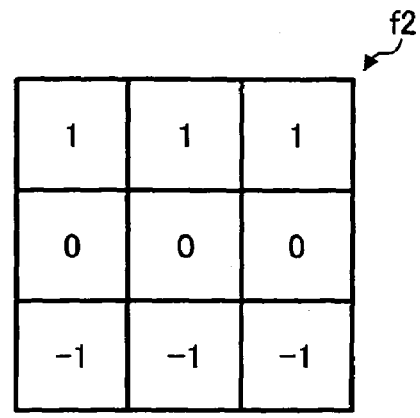
FIG. 17B is an exemplary illustration for explaining the operation shown in FIG. 16.
Figure 17C:
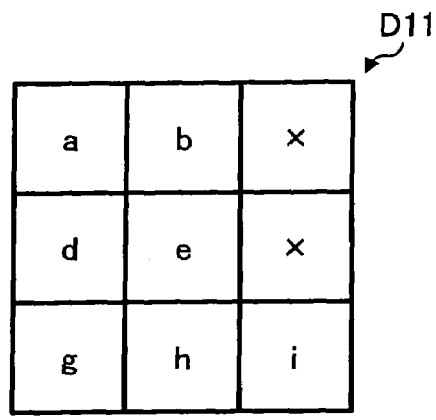
FIG. 17C is an exemplary illustration for explaining the operation shown in FIG. 16.
Figure 17D:
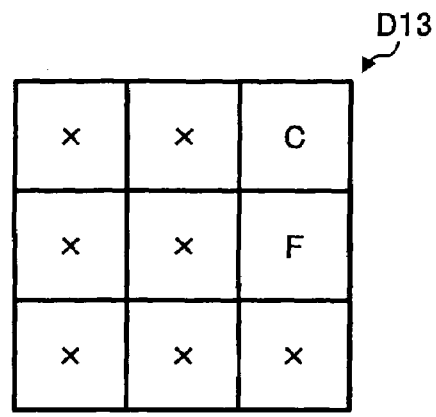
FIG. 17D is an exemplary illustration for explaining the operation shown in FIG. 16.

In one example, spatial filtering f1 shown in FIG. 17A may be applied to a target boundary defined pixel "e" of the first multivalue image D11 shown in FIG. 17C to obtain a filtered value. As shown in FIG. 17C, the filtered value may be calculated based on the pixel values of eight pixels surrounding the target boundary defined pixel "e" as well as the pixel value of the target boundary defined pixel "e". Further, in this example, when the undefined first pixel (indicated by "x" in FIG. 17C) is located near the target boundary defined pixel "e", the edge detector 132 specifies the second defined pixel of the second multivalue image D13 (FIG. 17D), which is located at a location corresponding the location of the undefined first pixel. The edge detector 132 then obtains the pixel value of the specified second defined pixel, and uses the obtained value as the pixel value of the undefined first pixel. In the exemplary case shown in FIGS. 17A, 17C, and 17D, the filtered value "−a+C−d+F−g+i" is obtained for the target boundary defined pixel "e".

Further, in this example, the edge detector 132 applied spatial filtering f2 shown in FIG. 17B to the target boundary defined pixel "e" to obtain the filtered value "a+b+C−g−h−i).

In Step S1143 of FIG. 16, the edge detector 132 determines whether the target boundary defined pixel belongs to the edge portion using the filtered values obtained in Step S1142. In this example, the edge detector 132 calculates the square sum of the filtered values "−a+C−d+F−g+i"and "a+b+C−g−h−i". If the square sum of the filtered values is greater than a predetermined value, the edge detector 132 determines that the target boundary defined pixel belongs to the edge portion ("YES" in Step S1143) and the operation proceeds to Step S1144. If the square sum of the filtered values is equal to or less than the predetermined value, the edge detector 132 determines that the target boundary defined pixel does not belong to the edge portion ("NO" in Step S1143) and the operation proceeds to Step S1146.

Figure 18A:
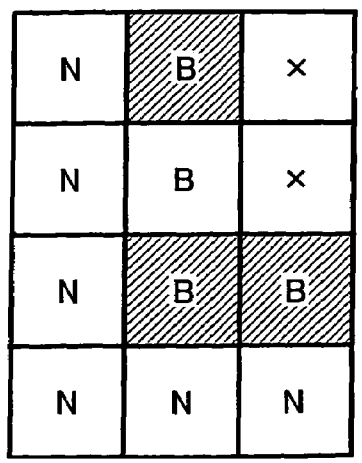
FIG. 18A is an exemplary illustration for explaining the operation shown in FIG. 16.

In Step S1144, the pixel value adjuster 133 extracts the defined pixel other than the boundary defined pixel, i.e., the non-boundary defined pixel, in the multivalue image. For example, as illustrated in FIG. 18A, non-boundary defined pixels each indicated by "N" may be detected. In FIG. 18A, boundary defined pixels are each indicated by "B", while the undefined pixels are each indicated by "x". Further, the boundary defined pixels belonging to the edge portion are shaded.

In Step S1145 of FIG. 16, the pixel value adjuster 133 adjusts the pixel value of the boundary defined pixel, using the pixel value of the non-boundary defined pixel extracted in Step S1144. However, in this example, the pixel value of the boundary defined pixel, which belongs to the edge portion, is only adjusted.

Figure 18B:
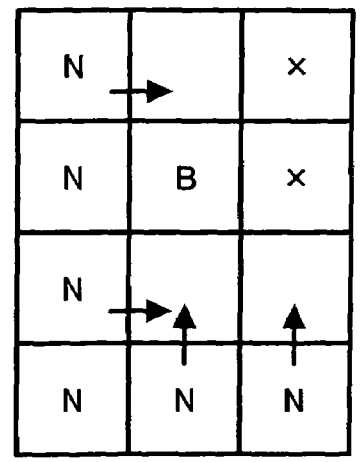
FIG. 18B is an exemplary illustration for explaining the operation shown in FIG. 16.

In one example, as illustrated in FIGS. 18A and 18B, the pixel value of a target boundary defined pixel B belonging to the edge portion may be replaced with the pixel value of the non-boundary defined pixel N, which is located closest to the target boundary defined pixel B.

In another example, the pixel value of a target boundary defined pixel belonging to the edge portion may be replaced with the average of the pixel values of the non-boundary defined pixels located closely to the target boundary defined pixel.

Step S1146 of FIG. 16 determines whether all boundary defined pixels in the multivalue image have been processed. If all pixels have been processed ("YES" in Step S1146), the operation ends. Otherwise ("NO" in Step S1146), the operation returns to Sep S1161 to select a next target undefined pixel.

The operation shown in FIG. 16 may be performed in various other ways. For example, Step S1143 of determining whether the boundary defined pixel belongs to the edge portion may not be performed. As a result, the pixel value of the boundary defined pixel is adjusted using the non-boundary defined pixel, whether or not it belongs to the edge portion. Further, the method of determining whether the boundary defined pixel belongs to the edge portion is not limited to the above-described example. Furthermore, the edge detector 132 of FIG. 14 may not be provided, if Step S1143 of FIG. 16 is not performed.

Figure 19:
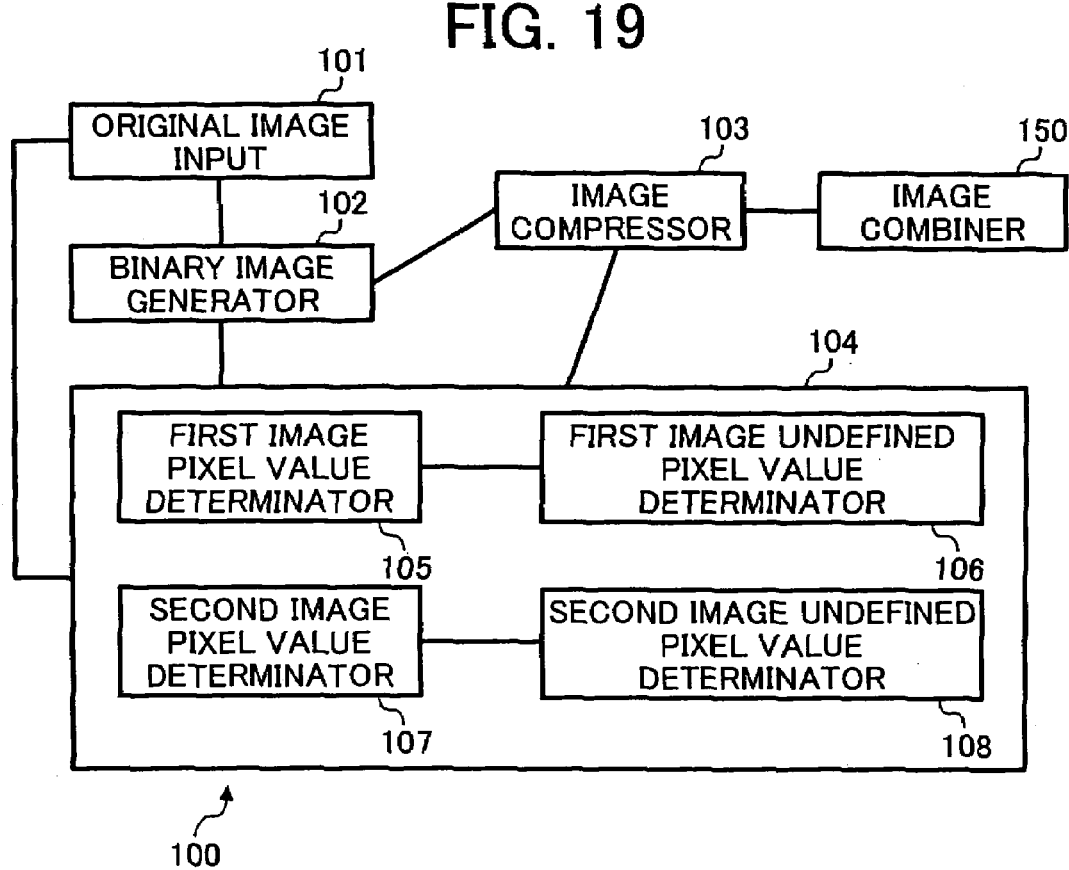
FIG. 19 is a schematic block diagram illustrating the functional structure of an image compressing apparatus according to an exemplary embodiment of the present invention.

Referring now to FIG. 19, the function of the image combiner 150 is briefly explained according to an exemplary embodiment of the present invention.

The image combiner 150 combines the first compressed multivalue image, the second compressed multivalue image, and the compressed binary image into a compressed image. More specifically, the image combiner 150 may determine how the compressed images are superimposed one above the other when they are expanded. For example, the image combiner 150 may assign a sequential number to the compressed images. A sequential number can be assigned to each of the compressed images. When the compressed images are expanded, the compressed images are superimposed one above the other in the order determined by the sequential numbers.

Figure 20:
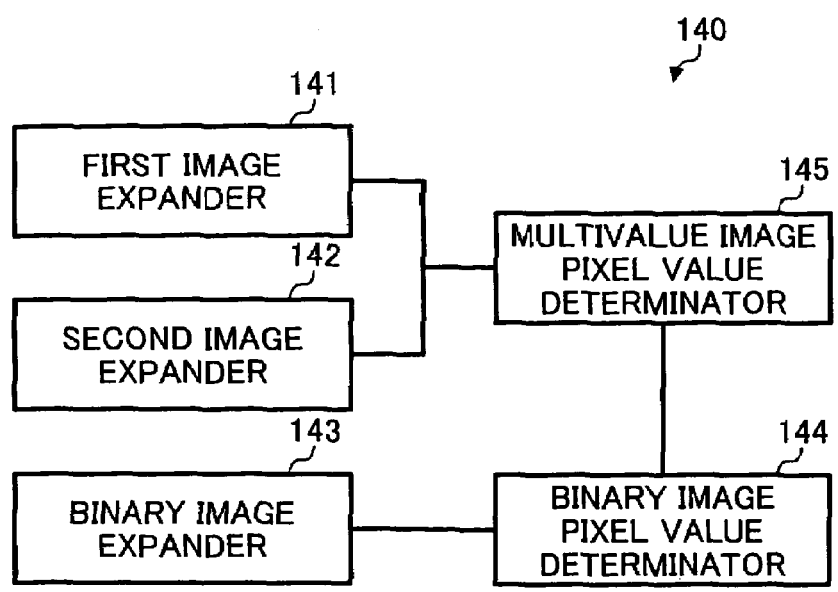
FIG. 20 is a schematic block diagram illustrating the functional structure of an image expanding apparatus according to an exemplary embodiment of the present invention.

Referring now to FIG. 20, the structure of the image expander 140 is explained according to an exemplary embodiment of the present invention. The image expander 140 is capable of expanding an image, which has been compressed by the image compressing apparatus 100 of FIG. 4, into an expanded image. As shown in FIG. 20, the image expander 140 includes a first image expander 141, a second image expander 142, a binary image expander 143, a binary image pixel value determinator 144, and a multivalue image pixel value determinator 145.

The first image expander 141 expands the first compressed multivalue image into the first multivalue image. The second image expander 142 expands the second compressed multivalue image into the second multivalue image. The binary image expander 143 expands the compressed binary image into the binary image.

The binary image pixel value determinator 144 determines whether a target pixel in the expanded image belongs to the first pixel attribute class or to the second pixel attribute class, using the binary image.

The multivalue image pixel value determinator 145 determines the pixel value of a target pixel in the expanded image based on a pixel value extracted from either one of the first multivalue image and the second multivalue image.

In an exemplary operation, a target pixel and its location in the expanded image may be specified. Further, a location corresponding to the location of the expanded image is specified in the binary image. If the location of the binary image contains the first type pixel corresponding to the first pixel attribute class, the value of the target pixel is determined based on a pixel value extracted from the first multivalue image. If the location of the binary image contains the second type pixel corresponding to the second pixel attribute class, the value of the target pixel is determined based on a pixel value extracted from the second multivalue image.

The image expander 140 may be provided with the image compressing apparatus 100 of FIG. 5 as illustrated above. However, the image expander 140 may be provided alone.

Figure 21:
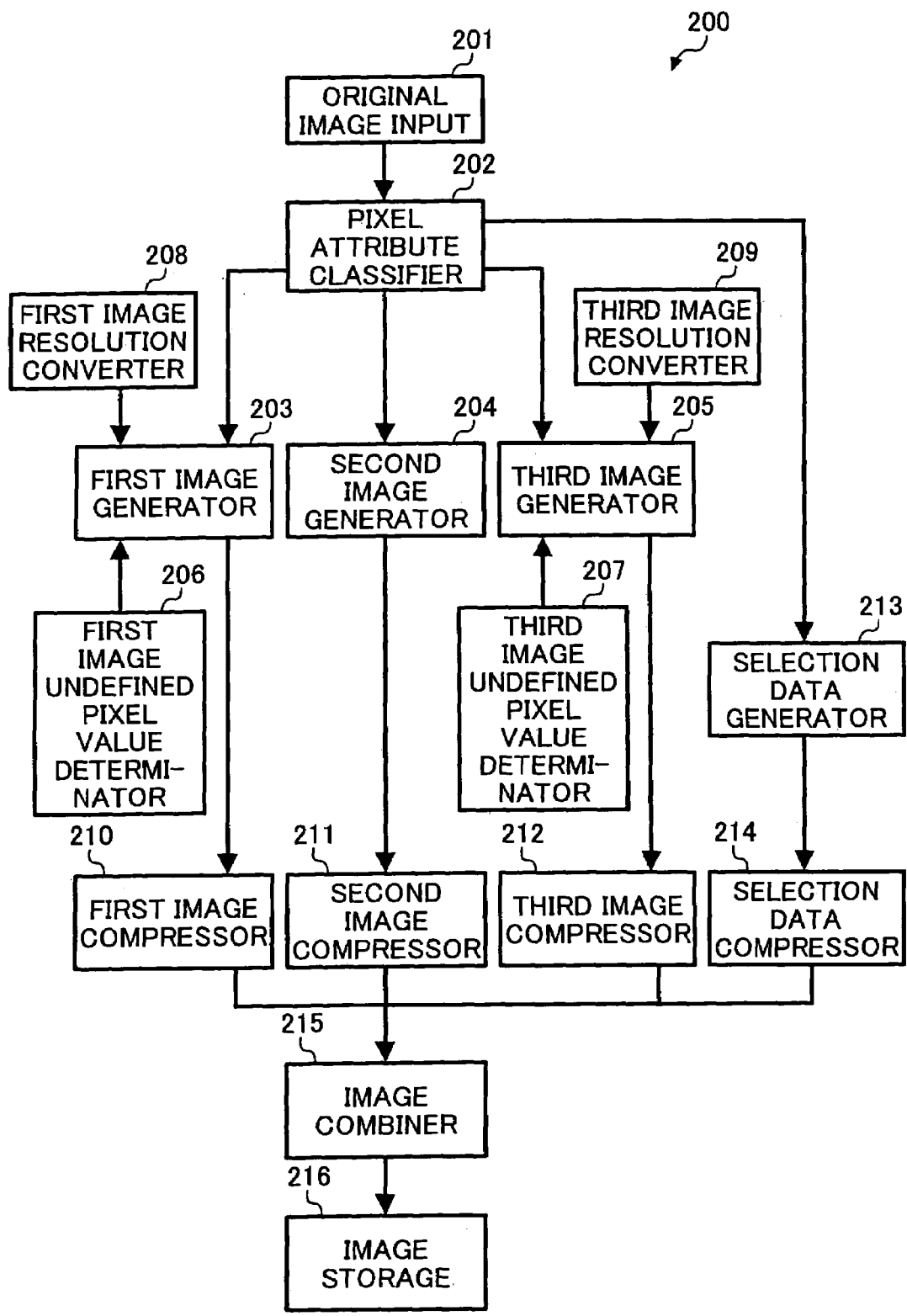
FIG. 21 is a schematic block diagram illustrating the functional structure of an image compressing apparatus according to an exemplary embodiment of the present invention.

Referring to FIG. 21, an image compressing apparatus 200 is explained according to an exemplary embodiment of the present invention. The image compressing apparatus 200 segments an original multivalue image into a plurality of images, and compresses the plurality of images. Each of the plurality of images can be compressed.

As shown in FIG. 21, the image compressing apparatus 200 includes an original image input 201, a pixel attribute classifier 202, a first image generator 203, a second image generator 204, a third image generator 205, a first image undefined pixel value determinator 206, a third image undefined pixel value determinator 207, a first image resolution converter 208, a third image resolution converter 209, a first image compressor 210, a second image compressor 211, a third image compressor 212, a selection data generator 213, a selection data compressor 214, an image combiner 215, and an image storage 216.

The original image input 201 inputs an original multivalue image to be processed. The pixel attribute classifier 202 classifies a pixel attribute of the original multivalue image into a plurality of pixel attribute classes including a first pixel attribute class, a second pixel attribute class, and a third pixel attribute class.

The first image generator 203 generates a first image having a plurality of pixels having a pixel attribute belonging to the first pixel attribute class. Each of the plurality of pixels can have a pixel attribute belonging to the first pixel attribute class. The second image generator 204 generates a second image including a third type pixel having a pixel attribute corresponding to the second pixel attribute class. The third image generator 205 generates a third image having a plurality of pixels having a pixel attribute belonging to the third pixel attribute class. Each of the plurality of pixels can have a pixel attribute belonging to the third pixel attribute class. The first image undefined pixel value determinator 206 determines a pixel value of an undefined pixel in the first image. The third image undefined pixel value determinator 207 determines a pixel value of an undefined pixel in the third image. The first image resolution converter 208 changes a resolution of the first image. The third image resolution converter 209 changes a resolution of the third image. The selection data generator 213 generates selection data including a first type pixel having a pixel attribute corresponding to one of the first pixel attribute class and the third pixel attribute class.

The first image compressor 210 compresses the first image into a first compressed image. The second image compressor 211 compresses the second image into a second compressed image. The third image compressor 212 compresses the third image into a third compressed image. The selection data compressor 214 compresses the selection data into compressed selection data. The image combiner 215 combines the first compressed image, the second compressed image, the third compressed image, and the compressed selection data into a compressed image. The image storage 216 stores the compressed image.

Referring to FIGS. 22 to 26, operation of compressing a multivalue image, performed by the image compressing apparatus 200, is explained according to an exemplary embodiment of the present invention.

In Step S201, the original image input 201 inputs an original multivalue image to be processed, such as an original multivalue image D0 shown in any one of FIGS. 23 to 26. The original multivalue image D0 is a compound image having a foreground section including a non-black character "C" and a black character "B", and a background section including a picture P indicated by a gray area.

Figure 22:
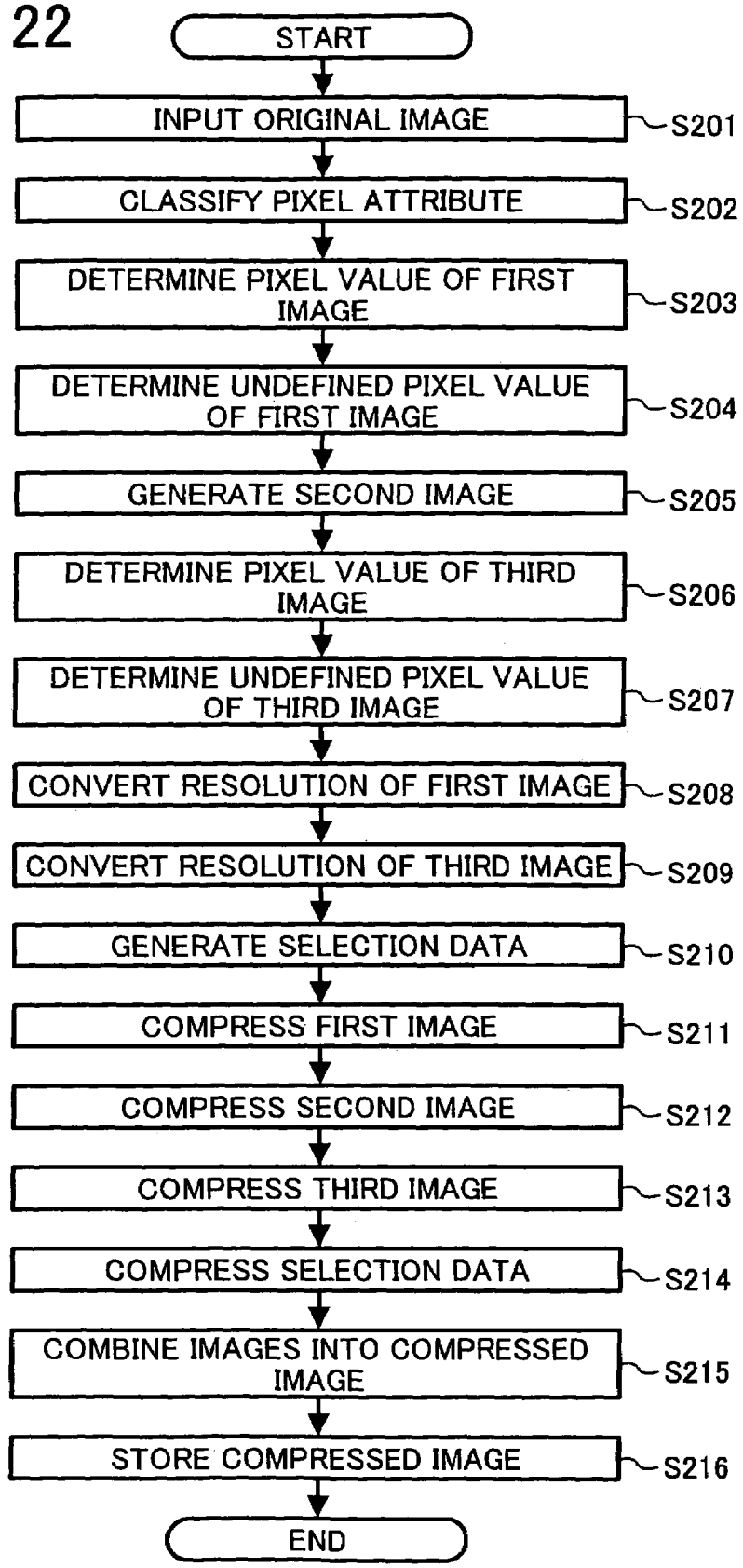
FIG. 22 is a flowchart illustrating operation of compressing a multivalue image, performed by the image compressing apparatus shown in FIG. 21, according to an exemplary embodiment of the present invention.

In Step S202 of FIG. 22, the pixel attribute classifier 202 classifies a pixel attribute of the original multivalue image D0. In this example, the pixel attributes of the pixels in the original multivalue image D0 are classified into the first pixel attribute class corresponding to a non-black color portion of the foreground section of the original multivalue image D0 including the character C, the second pixel attribute class corresponding to a black color portion of the foreground section of the original multivalue image D0 including the character B, and the third pixel attribute class corresponding to the background section of the original multivalue image D0 including the picture P.

In one example, the pixel attribute classifier 202 may obtain the lightness value of pixels in the original multivalue image D0. If the lightness value of a target pixel is equal to or greater than a predetermined threshold, the lightness value of the target pixel belongs to the pixel attribute class representing the background section, i.e., the third pixel attribute class. If the lightness value of a target pixel is less than the predetermined threshold, the lightness value of the target pixel belongs to the pixel attribute class representing the foreground section, i.e, the first pixel attribute class or the second pixel attribute class.

Further, the pixel attribute classifier 202 obtains the color of a target pixel having the lightness value belonging to the first attribute class or the second attribute class. If the color of the target pixel is substantially black, the color of the target pixel belongs to the second pixel attribute class. If the color of the target pixel is not substantially black, the color of the target pixel belongs to the first pixel attribute class.

In this example, the color may be determined by comparing the pixel value of the target pixel with a predetermined threshold.

In another example, the pixel attribute classifier 202 may obtain the G value of each pixel in the original multivalue image D0 to classify the pixel attributes.

In another example, the pixel attribute classifier 202 may classify the pixel attributes of the original multivalue image D0 using any kind of image segmentation method.

In Steps S203 and S204 of FIG. 22, the first image generator 203 generates a first image having a plurality of first pixels having a pixel attribute belonging to the first pixel attribute class, such as a first image D21 shown in any one of FIGS. 23 to 26. Each of the plurality of pixels can have a pixel attribute belonging to the first pixel attribute class. In this example, the plurality of first pixels in the first image D21 can be classified into a set of first defined pixels and a set of first undefined pixels.

More specifically, in Step S203 of FIG. 22, the first image generator 203 determines a pixel value of the first defined pixel based on a pixel value extracted from the original multivalue image D0, in a substantially similar manner as described referring to FIG. 7, for example.

In Step S204 of FIG. 22, the first image undefined pixel value determinator 206 determines a pixel value of the first undefined pixel based on the pixel value of the first defined pixel. In one example, the pixel value of the first undefined pixel may be set to a predetermined value belonging to the first pixel attribute class. In another example, the first undefined pixel may be made into a transparent pixel. In another example, the pixel value of the first undefined pixel may be determined in a substantially similar manner as described referring to FIG. 11.

In Step S205, the second image generator 204 generates a second image D22 including a third type pixel having a pixel attribute corresponding to the second pixel attribute class, such as a second image D22 shown in any one of FIGS. 23 to 26. In this example, the second image D22 further includes a fourth type pixel having a pixel attribute corresponding to one of the first and third pixel attribute classes. For example, as illustrated in any one of FIGS. 23 to 26, the second image D22 may be generated as a binary image having a plurality of black pixels representing the second pixel attribute class. Each of the plurality of black pixels can represent the second pixel attribute class. The plurality of white pixels in the binary image represents the first or third pixel attribute class.

In Step S206 and S207 of FIG. 22, the third image generator 205 generates a third image having a plurality of third pixels having a pixel attribute belonging to the third pixel attribute class, such as a third image D23 shown in any one of FIGS. 23 to 26. Each of the plurality of third pixels can have a pixel attribute belonging to the third pixel attribute class. In this example, the plurality of third pixels in the third image D23 can be classified into a set of third defined pixels and a set of third undefined pixels.

More specifically, in Step S206 of FIG. 22, the third image generator 205 determines a pixel value of the third defined pixel based on a pixel value extracted from the original multivalue image D0, in a substantially similar manner as described referring to FIG. 7, for example.

In Step S207 of FIG. 22, the third image undefined pixel value determinator 207 determines a pixel value of the third undefined pixel based on the pixel value of the first defined pixel. In one example, the pixel value of the third undefined pixel may be set to a predetermined value belonging to the third pixel attribute class. In another example, the third undefined pixel may be made into a transparent pixel. In another example, the pixel value of the third undefined pixel may be determined in a substantially similar manner as described referring to FIG. 11.

In Step S208, the first image resolution converter 208 lowers the resolution of the first image. In this manner, the size of the first image can be made smaller.

In Step S209, the third image resolution converter 209 lowers the resolution of the third image. In this manner, the size of the third image can be made smaller.

In Step S210, the selection data generator 213 generates selection data including a first type pixel having a pixel attribute corresponding to one of the first pixel attribute class and the third pixel attribute class, such as selection data D24 shown in any one of FIGS. 23 to 26. The selection data further includes a second type pixel having a pixel attribute corresponding to the second pixel attribute class or either one of the first pixel attribute class and the third pixel attribute class.

Figure 23:
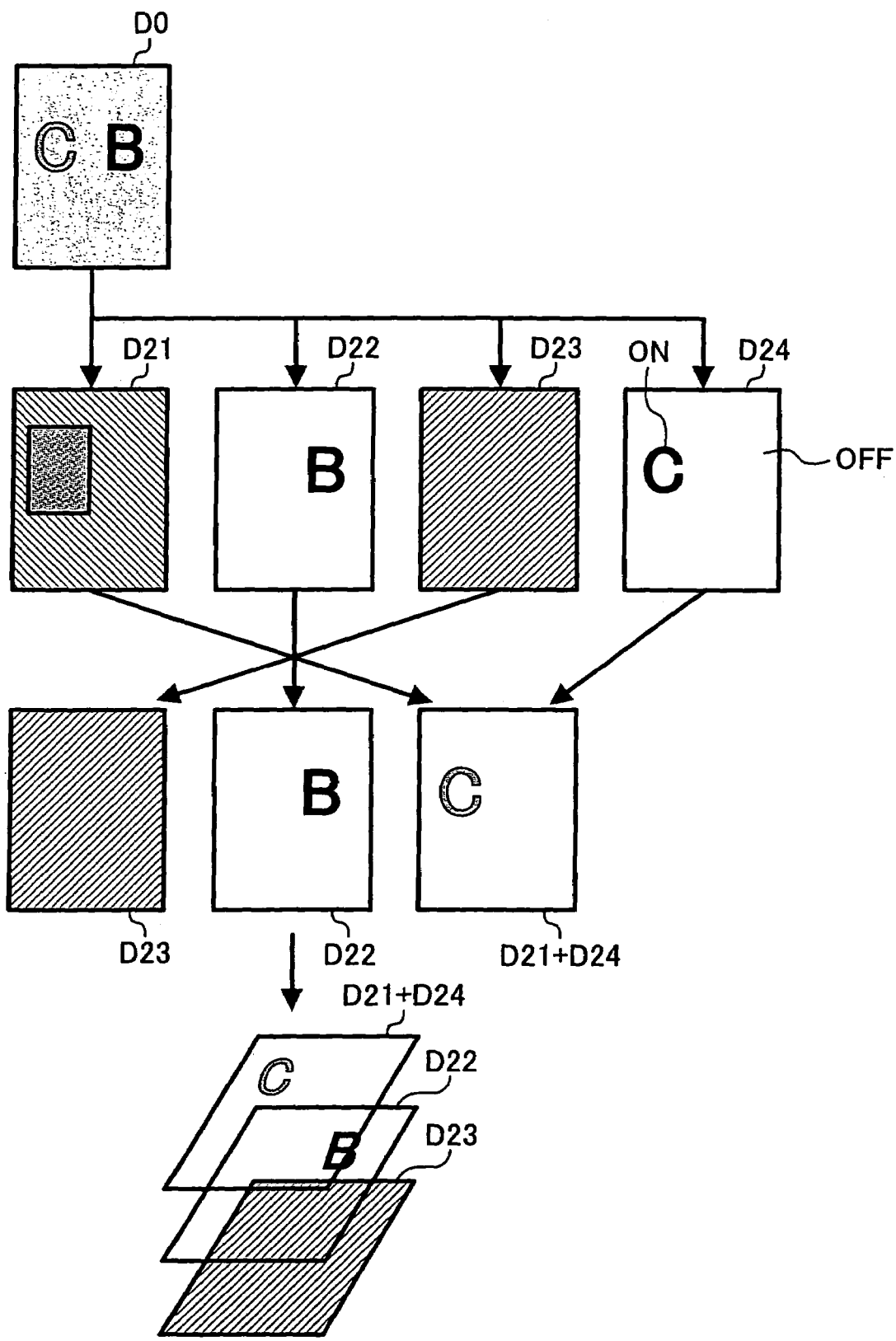
FIG. 23 is an exemplary illustration for explaining the operation shown in FIG. 22.

In one example, referring to FIG. 23, the selection data D24 may be generated, which is a binary image having a plurality of "ON" pixels corresponding to the first pixel attribute class, and a plurality of "OFF" pixels corresponding to the second or third pixel attribute class.

Figure 24:
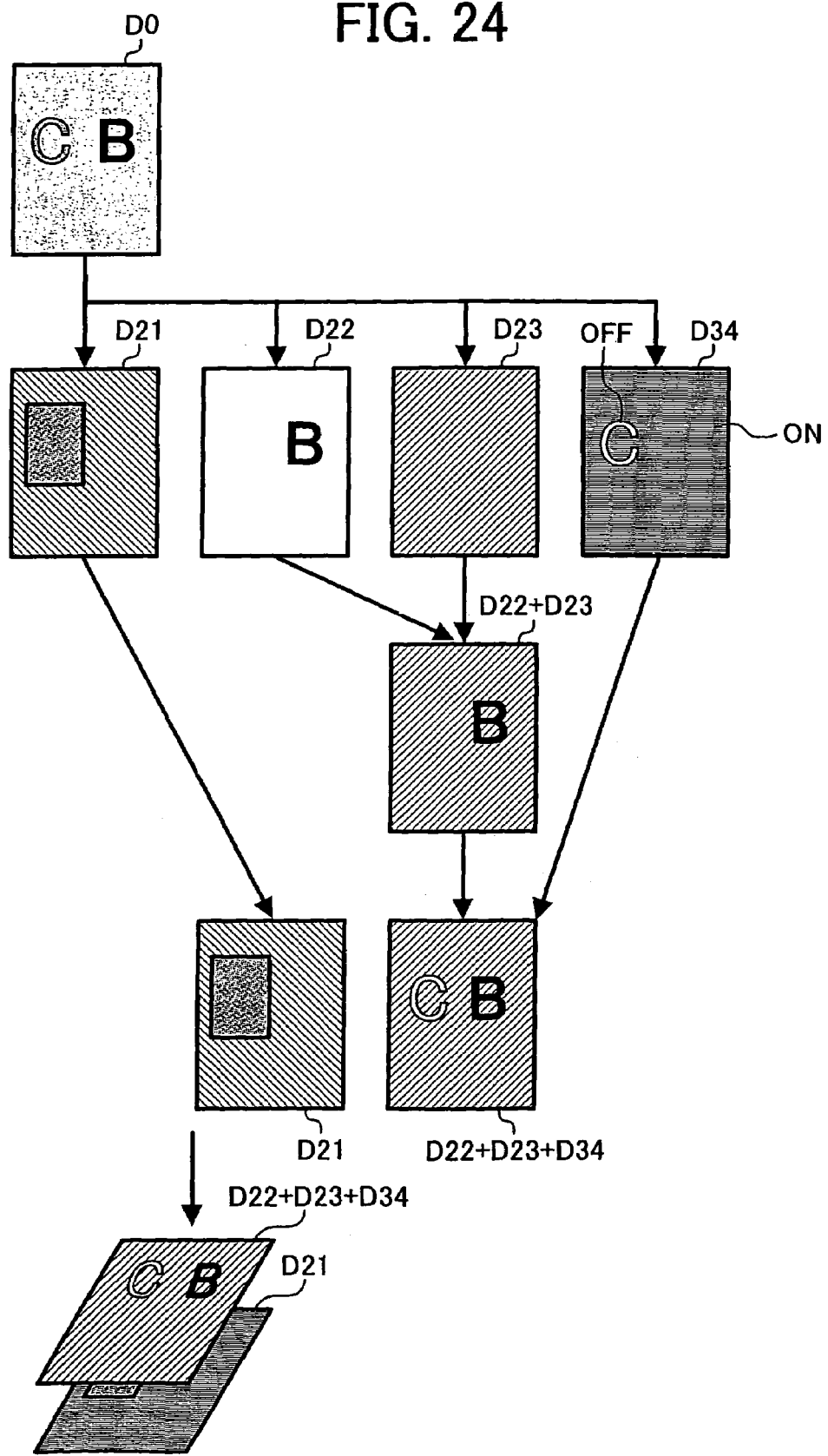
FIG. 24 is an exemplary illustration for explaining the operation shown in FIG. 22.

In another example, the selection data D34 of FIG. 24 may be generated, which is a binary image having a plurality of "ON" pixels corresponding to the second or third pixel attribute class, and a plurality of "OFF" pixels corresponding to the first pixel attribute class.

Figure 25:
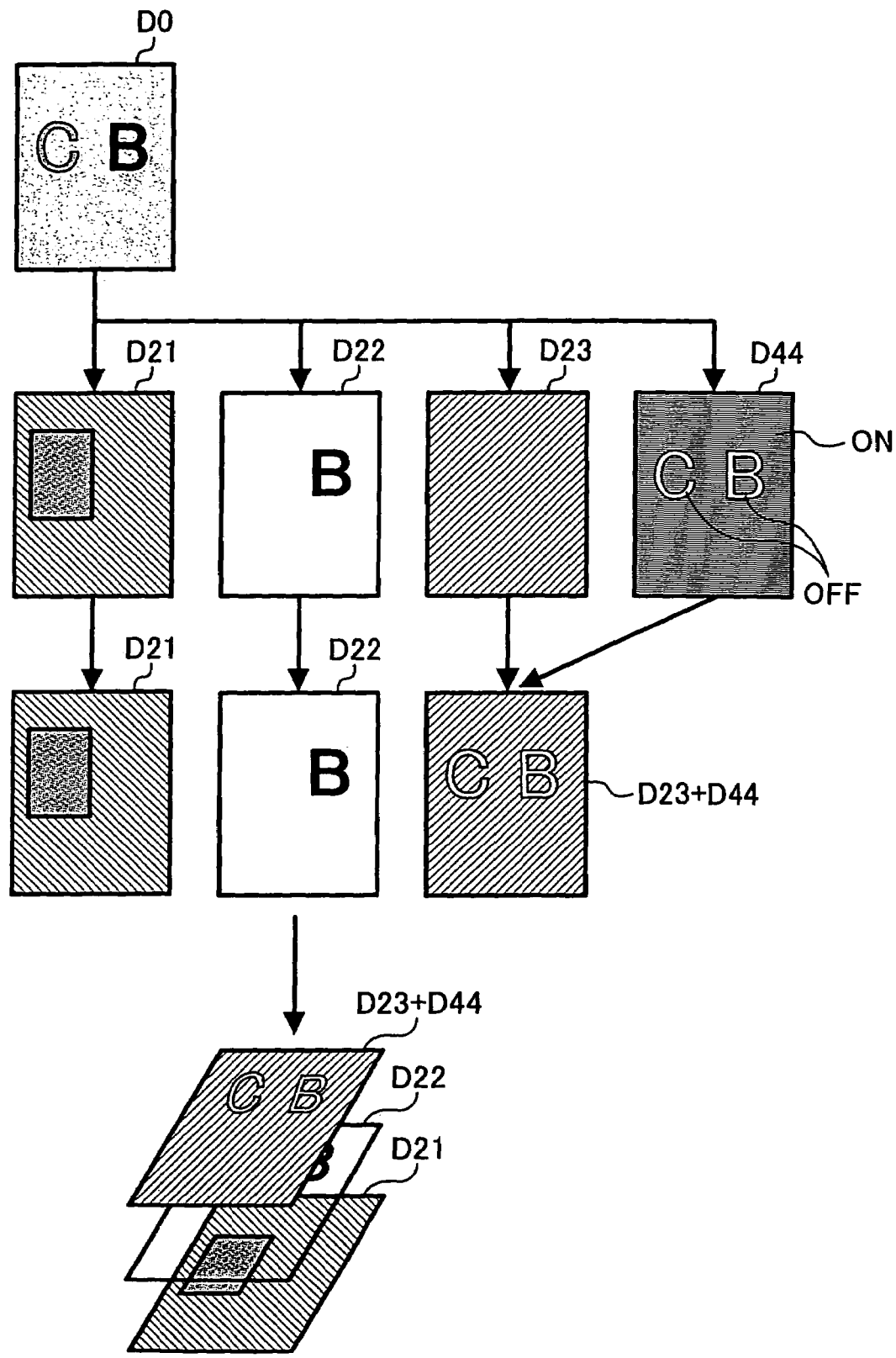
FIG. 25 is an exemplary illustration for explaining the operation shown in FIG. 22.

In another example, the selection data D44 of FIG. 25 may be generated, which is a binary image having a plurality of "ON" pixels corresponding to the first or second pixel attribute class, and a plurality of "OFF" pixels corresponding to the third pixel attribute class.

Figure 26:
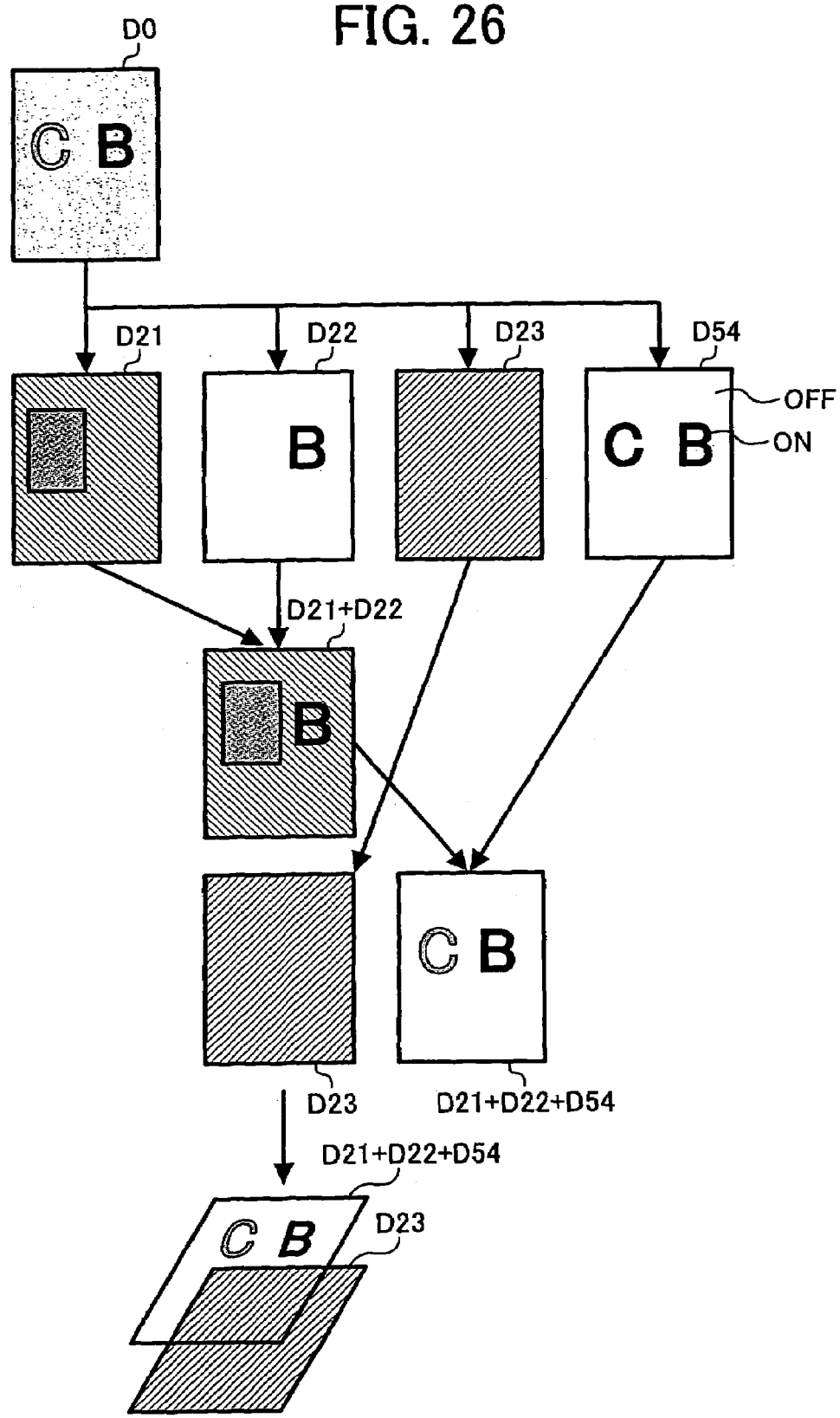
FIG. 26 is an exemplary illustration for explaining the operation shown in FIG. 22.

In another example, the selection data D54 of FIG. 26 may be generated, which is a binary image having a plurality of "ON" pixels corresponding to the third pixel attribute class, and a plurality of "OFF" pixels corresponding to the first or second pixel attribute class.

In Step S211 of FIG. 22, the first image compressor 210 compresses the first image into a first compressed image using any kind of compression method suitable to the first image D21. In this example, JPEG or JPEG 2000 may be used. In Step S212, the second image compressor 211 compresses the second image into a second compressed image using any kind of compression method suitable to the second image D22. In this example, MMR, JBIG, or JBIG 2 may be used.

In Step S213, the third image compressor 212 compresses the third image into a third compressed image using any kind of compression method suitable to the third image D23. In this example, JPEG or JPEG 2000 may be used.

In Step S214, the selection data compressor 214 compresses the selection data into compressed selection data using any kind of compression method suitable to the selection data D24. In this example, MMR, JBIG, or JBIG 2 may be used.

In Step S215, the image combiner 215 combines the first compressed image, the second compressed image, the third compressed image, and the compressed selection data into a compressed image. In this example, the compressed image indicates how the compressed images are superimposed one above the other when the images are expanded. For example, in one embodiment, the image combiner 215 may assign a sequence number to of the compressed images. The compressed images are superimposed in the order determined by the sequence numbers when the images are expanded.

In the exemplary case illustrated in FIG. 23, the image combiner 215 may determine that the third image D23 will be placed in the lower layer, the second image D22 will be placed in the middle layer, and the combined image of the first image D21 and the selection data D24 will be placed in the upper layer. Alternatively, the image combiner 215 may determine that the third image D23 will be placed in the lower layer, the combined image of the first image D21 and the selection data D24 will be placed in the middle layer, and the second image D22 will be placed in the upper layer.

In the exemplary case illustrated in FIG. 24, the image combiner 215 may determine that the first image D21 will be placed in the lower layer, and the combined image of the second image D22, the third image D23, and the selection data D34 will be placed in the upper layer.

In the exemplary case illustrated in FIG. 25, the image combiner 215 may determine that the first image D21 will be placed in the lower layer, the second image D22 will be placed in the middle layer, and the combined image of the third image D23 and the selection data D44 will be placed in the upper layer.

In the exemplary case illustrated in FIG. 26, the image combiner 215 may determine that the third image D23 will be placed in the lower layer, and the combined image of the first image D21, the second image D22, and the third image D54 will be placed in the upper layer.

In Step S216, the image storage 216 stores the compressed image including the first compressed image, the second compressed image, the third compressed image, and the compressed selection data.

The operation illustrated in FIG. 22 may be performed in various other ways. For example, the steps illustrated in FIG. 22 may be performed in different orders. In another example, Step S208 or S209 may not be performed.

Further, the components of the image compressing apparatus 200 of FIG. 21 may be combined with each other, or each of the components may be further broken down into smaller components. In one example, the first image resolution converter 208, the first image generator 203, and the first image undefined pixel value determinator 206 may be integrated into one component. In another example, the first image compressor 210 and the third image compressor 212 may be integrated into one component. In another example, the second image compressor 211 and the selection data compressor 214 may be integrated into one component.

Furthermore, the image compressing apparatus 200 may be provided with any other component, device, or apparatus. In one example, the image compressing apparatus 200 may be provided with a pixel value adjusting device, such as the pixel value adjusting device 130 of FIG. 14. In another example, the image compressing apparatus 200 may be provided with an image expanding apparatus, such as an image expanding apparatus 300 illustrated in FIG. 27 or an image expanding apparatus 320 illustrated in FIG. 31.

Figure 27:
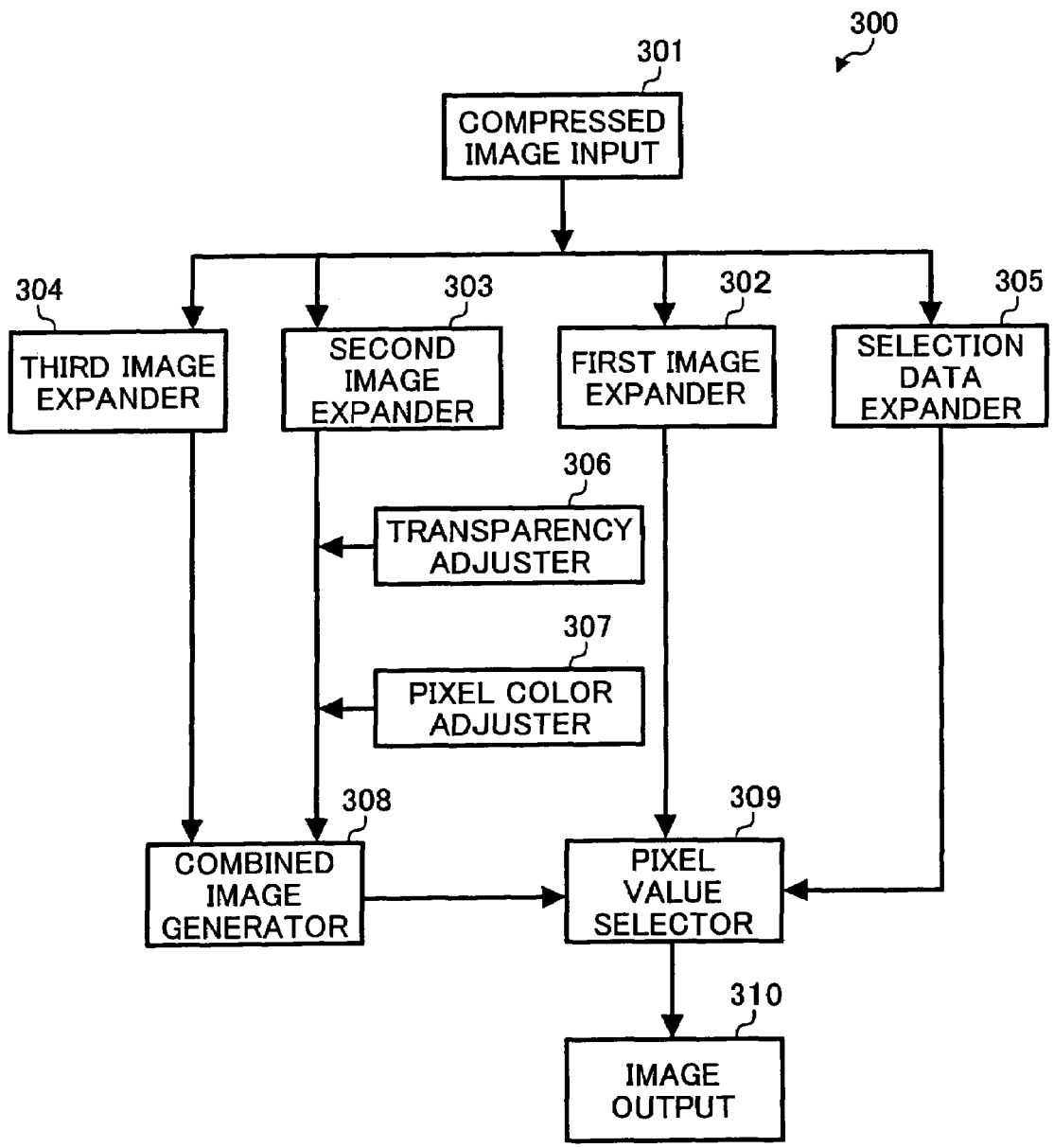
FIG. 27 is a schematic block diagram illustrating the functional structure of an image expanding apparatus according to an exemplary embodiment of the present invention.

Referring now to FIG. 27, the image expanding apparatus 300 is explained according to an exemplary embodiment of the present invention. The image expanding apparatus 300 expands a compressed image into an expanded image, and outputs the expanded image. The image expanding apparatus 300 may be provided in combination with the image compressing apparatus 200, or may be provided alone, as long as the image expanding apparatus 300 processes a compressed image generated by the image compressing apparatus 200.

As shown in FIG. 27, the image expanding apparatus 300 includes a compressed image input 301, a first image expander 302, a second image expander 303, a third image expander 304, a selection data expander 305, a transparency adjuster 306, a pixel color adjuster 307, a combined image generator 308, a pixel value selector 309, and an image output 310.

The compressed image input 301 inputs a compressed image, which has been generated by the image compressing apparatus 200. For example, the compressed image input 301 may obtain the compressed image from the image storage 216 of FIG. 21. As described above, the compressed image includes the first compressed image, the second compressed image, the third compressed image, and the compressed selection data.

The first image expander 302 expands the first compressed image into the first image. The second image expander 303 expands the second compressed image into the second image. The third image expander 304 expands the third compressed image into the third image. The selection data expander 305 expands the compressed selection data into the selection data.

The transparency adjuster 306 extracts a plurality of pixels ("non-second attribute pixels") having a pixel attribute corresponding to the first or third pixel attribute class from the second image. Each of the plurality of pixels can have a pixel attribute corresponding to the first or third pixel attribute class from the second image. The transparency adjuster 306 makes the non-second attribute pixels into a transparent pixel. The pixel color adjuster 307 extracts a plurality of pixels ("second attribute pixels") having a pixel attribute corresponding to the second pixel attribute class from the second image. Each of the plurality of pixels can have a pixel attribute corresponding to the second pixel attribute class from the second image. The pixel color adjuster 307 assigns a single color to the second attribute pixels.

The combined image generator 308 combines the processed second image and the third image into a combined image. The pixel value selector 309 determines a pixel value of the expanded image using the selection data, based on a pixel value extracted from either one of the first image and the combined image. The image output 310 outputs the expanded image.

Figure 28:
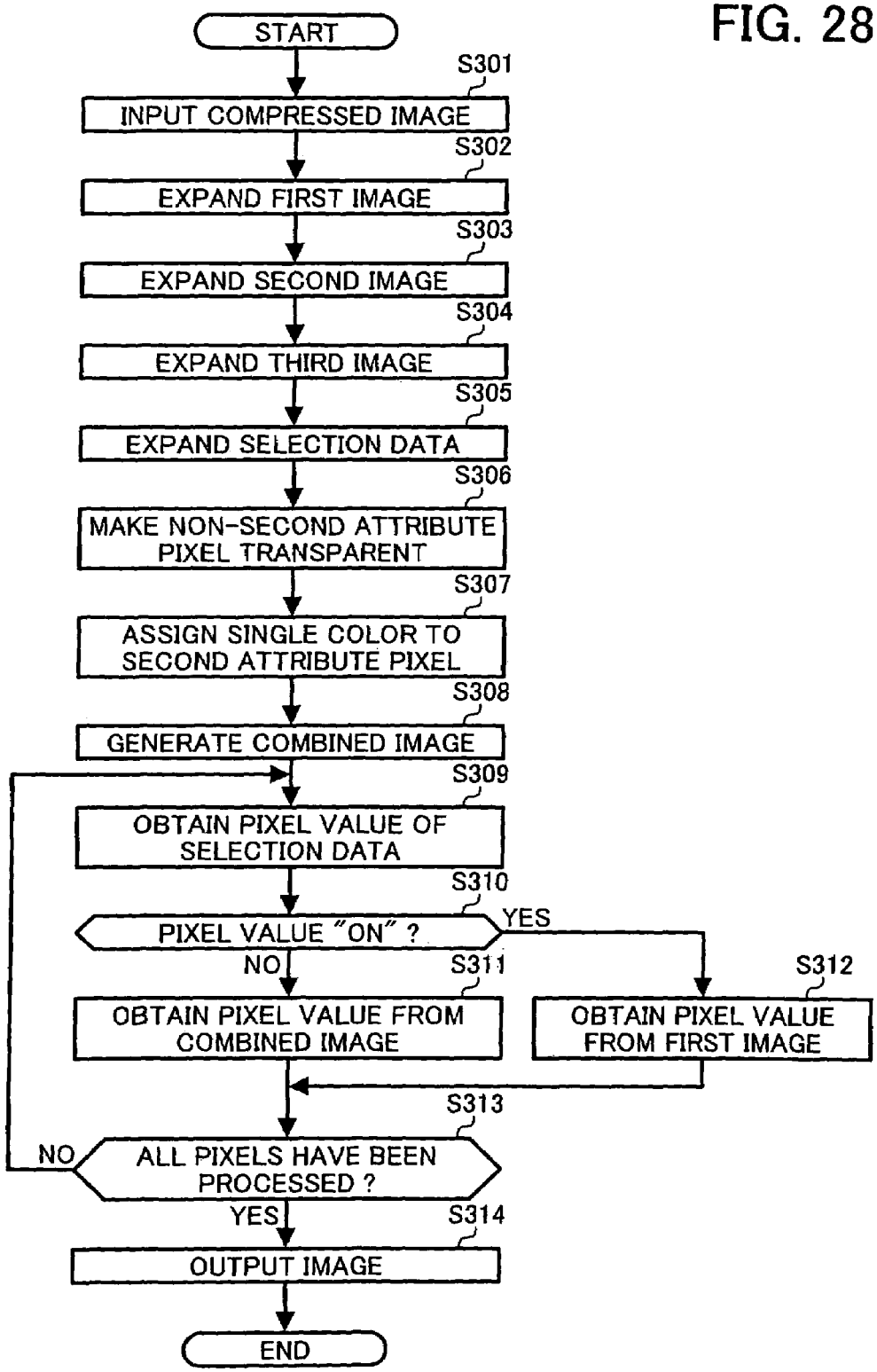
FIG. 28 is a flowchart illustrating operation of expanding a compressed image, performed by the image expanding apparatus shown in FIG. 27, according to an exemplary embodiment of the present invention.

Referring now to FIG. 28, operation of expanding a compressed image, performed by the image expanding apparatus 300 of FIG. 27, is explained according to an exemplary embodiment of the present invention.

In Step S301, the compressed image input 301 inputs a compressed image, which has been generated by the image compressing apparatus 200. For example, the compressed image that has been generated in a manner described referring to FIG. 23 or 24 may be obtained. The compressed image of FIG. 23 or 24 includes the first compressed image, the second compressed image, the third compressed image, and the compressed selection data.

Figure 29:
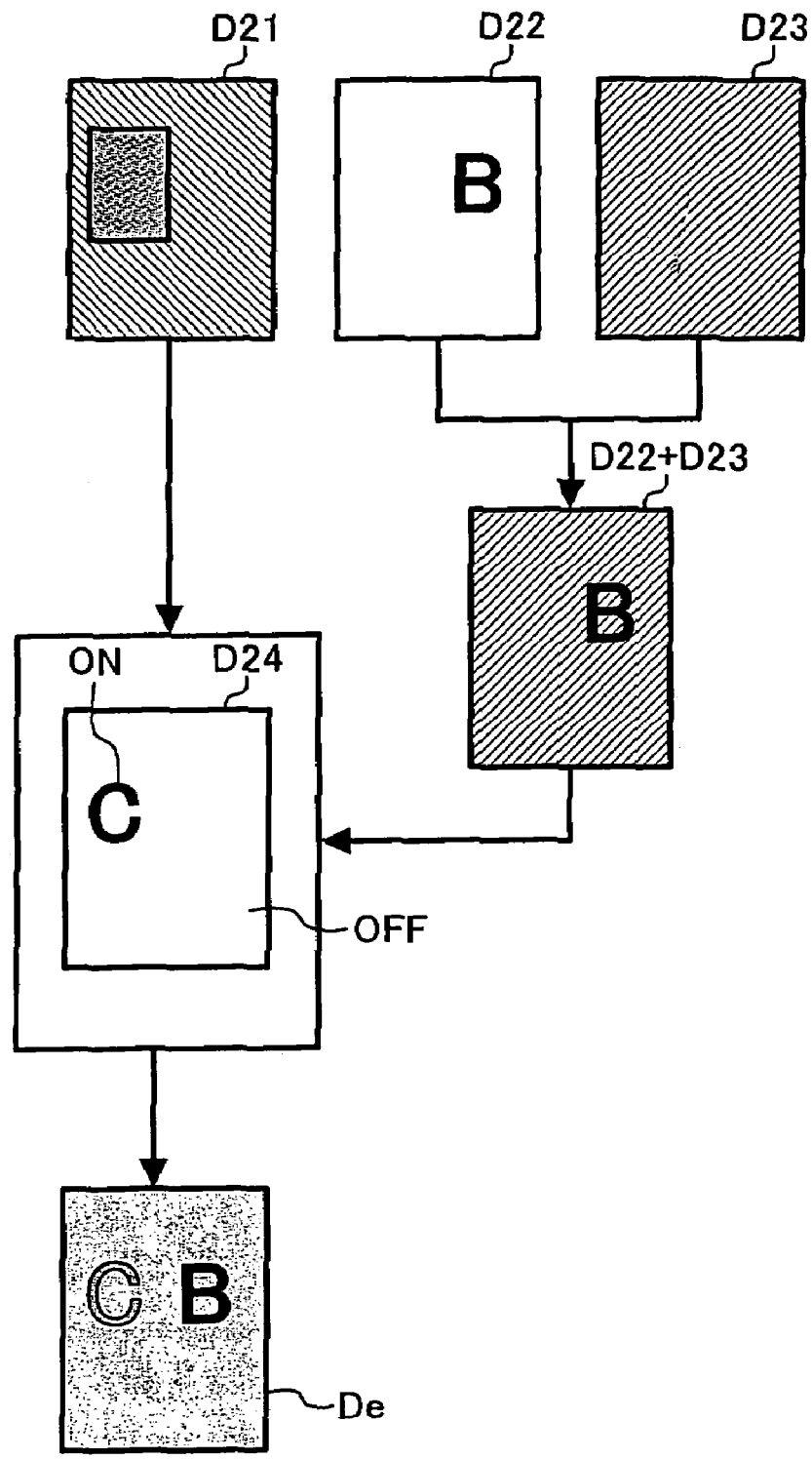
FIG. 29 is an exemplary illustration for explaining the operation shown in FIG. 28.
Figure 30:
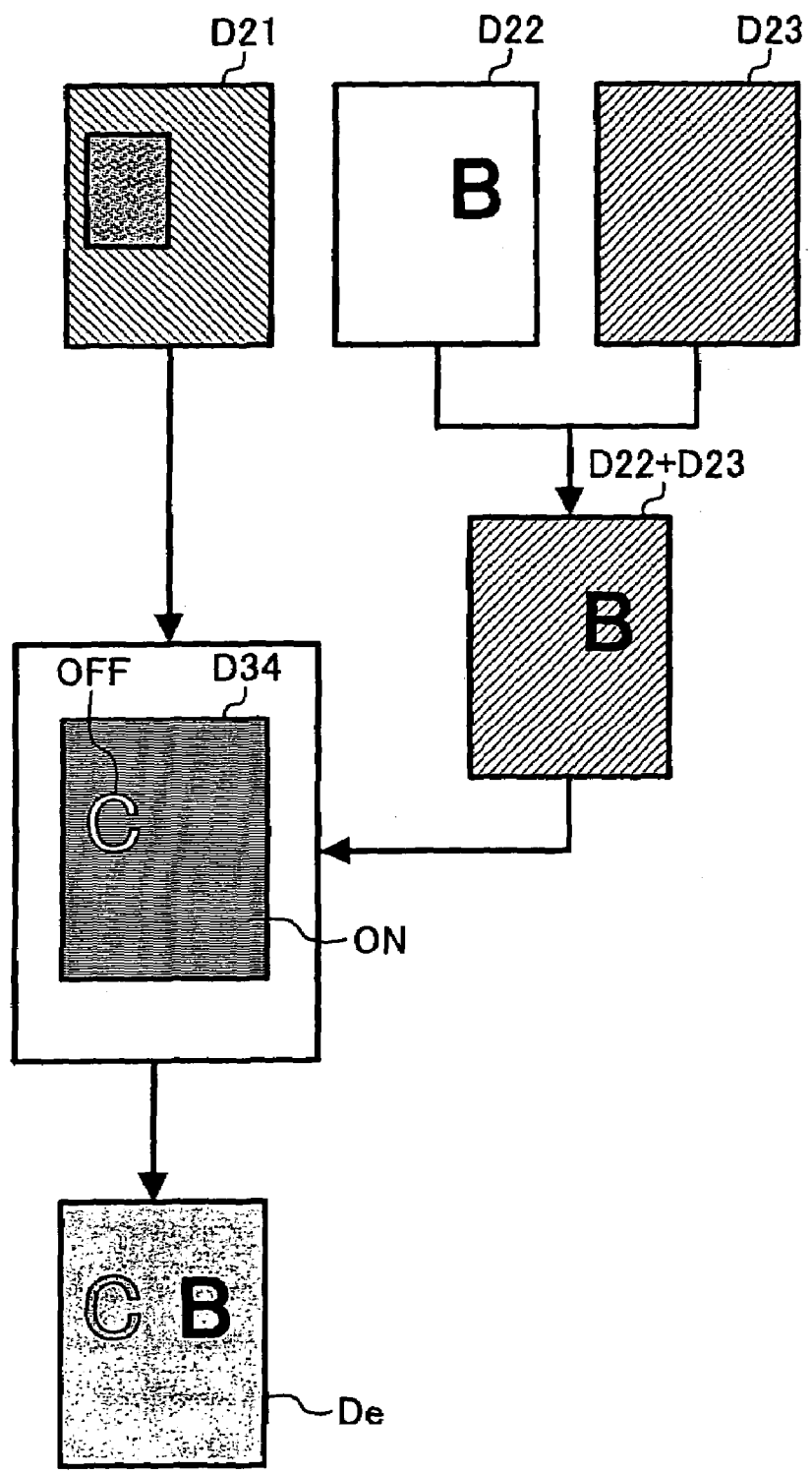
FIG. 30 is an exemplary illustration for explaining the operation shown in FIG. 28.

In Step S302, the first image expander 302 expands the first compressed image into the first image. In one example, the first compressed image of FIG. 23 is expanded into the first image D21 as illustrated in FIG. 29. In another example, the first compressed image of FIG. 24 is expanded into the first image D21 as illustrated in FIG. 30.

In Step S303, the second image expander 303 expands the second compressed image into the second image. In one example, the second compressed image of FIG. 23 is expanded into the second image D22 as illustrated in FIG. 29. In another example, the second compressed image of FIG. 24 is expanded into the second image D22 as illustrated in FIG. 30.

In Step S304, the third image expander 304 expands the third compressed image into the third image. In one example, the third compressed image of FIG. 23 is expanded into the third image D23 as illustrated in FIG. 29. In another example, the third compressed image of FIG. 24 is expanded into the third image D23 as illustrated in FIG. 30.

In Step S305, the selection data expander 305 expands the compressed selection data into the selection data. In one example, the compressed selection data of FIG. 23 is expanded into the selection data D24 as illustrated in FIG. 29. In another example, the compressed selection data of FIG. 24 is expanded into the selection data D34 as illustrated in FIG. 30.

In Step S306, the transparency adjuster 306 extracts a plurality of non-second attribute pixels from the second image. The transparency adjuster 306 makes some or all the non-second attribute pixels into a transparent pixel.

In Step S307, the pixel color adjuster 307 extracts a plurality of second attribute pixels from the second image. The pixel color adjuster 307 assigns a single color to some or all the second attribute pixels. In this example, the black color is assigned to some or all the second attribute pixels.

In Step S308, the combined image generator 308 combines the processed second image and the third image into a combine image. For example, as illustrated in FIG. 29 or 30, the second image D22 and the third image D23 are combined into a combined image D22+D23.

In Step S309, the pixel value selector 309 selects a target pixel in the expanded image, and obtains the value of a pixel in the selection data, which corresponds to the target pixel.

In Step S310, the pixel value selector 309 determines whether the pixel value obtained in the previous step corresponds to the first pixel attribute class. If the pixel value corresponds to the first pixel attribute class ("YES" in Step S310), the operation proceeds to Step S312. Otherwise ("NO" in Step S311), the operation proceeds to Step S311.

For example, in the exemplary case illustrated in FIG. 29, the pixel value selector 309 selects a target pixel in the expanded image De. The pixel value selector 309 further obtains the value of a pixel in the selection data D24, which is located in the location corresponding to the location of the target pixel. If the obtained pixel value indicates "ON", the pixel value selector 309 determines that the target pixel has a pixel value belonging to the first pixel attribute class, and the operation proceeds to Step S312. If the obtained pixel value indicates "OFF", the pixel value selector 309 determines that the target pixel has a pixel value belonging to the second or third pixel attribute class, and the operation proceeds to Step S311.

In another example, in the exemplary case illustrated in FIG. 30, the pixel value selector 309 selects a target pixel in the expanded image De. The pixel value selector 309 further obtains the value of a pixel in the selection data D34, which is located in the location corresponding to the location of the target pixel. If the obtained pixel value indicates "ON", the pixel value selector 309 determines that the target pixel has a pixel value belonging to the second or third attribute class, and the operation proceeds to Step S311. If the obtained pixel value indicates "OFF", the pixel value selector 309 determines that the target pixel has a pixel value belonging to the first pixel attribute class, and the operation proceeds to Step S312.

In Step S311, the pixel value selector 309 obtains a pixel value from the combined image, and assigns the obtained pixel value to the target pixel in the expanded image. For example, as illustrated in FIG. 29 or 30, the pixel value selector 309 may obtain the value of a pixel in the combined image D22+D23, which is located in the location corresponding to the location of the target pixel.

In Step S312, the pixel value selector 309 obtains a pixel value from the first image, and assigns the obtained pixel value to the target pixel in the expanded image. For example, as illustrated in FIG. 29 or 30, the pixel value selector 309 may obtain the value of a pixel in the first image D21; which is located in the location corresponding to the location of the target pixel.

In Step S313, the image expanding apparatus 300 determines whether all pixels in the expanded image have been processed. If all pixels in the expanded image have been processed, the operation proceeds to Step S314. If all pixels in the expanded image have not been processed ("NO" in Step S313), the operation returns to Step S309 to process a next target pixel in the expanded image.

In Step S314, the image output 310 outputs the expanded image, and the operation ends. In one example, the image output 310 may display the expanded image using any kind of display device. In another example, the image output 310 may print out the expanded image using any kind of printer.

The operation illustrated in FIG. 28 may be performed in various other ways. For example, the steps illustrated in FIG. 28 may be performed in different orders.

Figure 31:
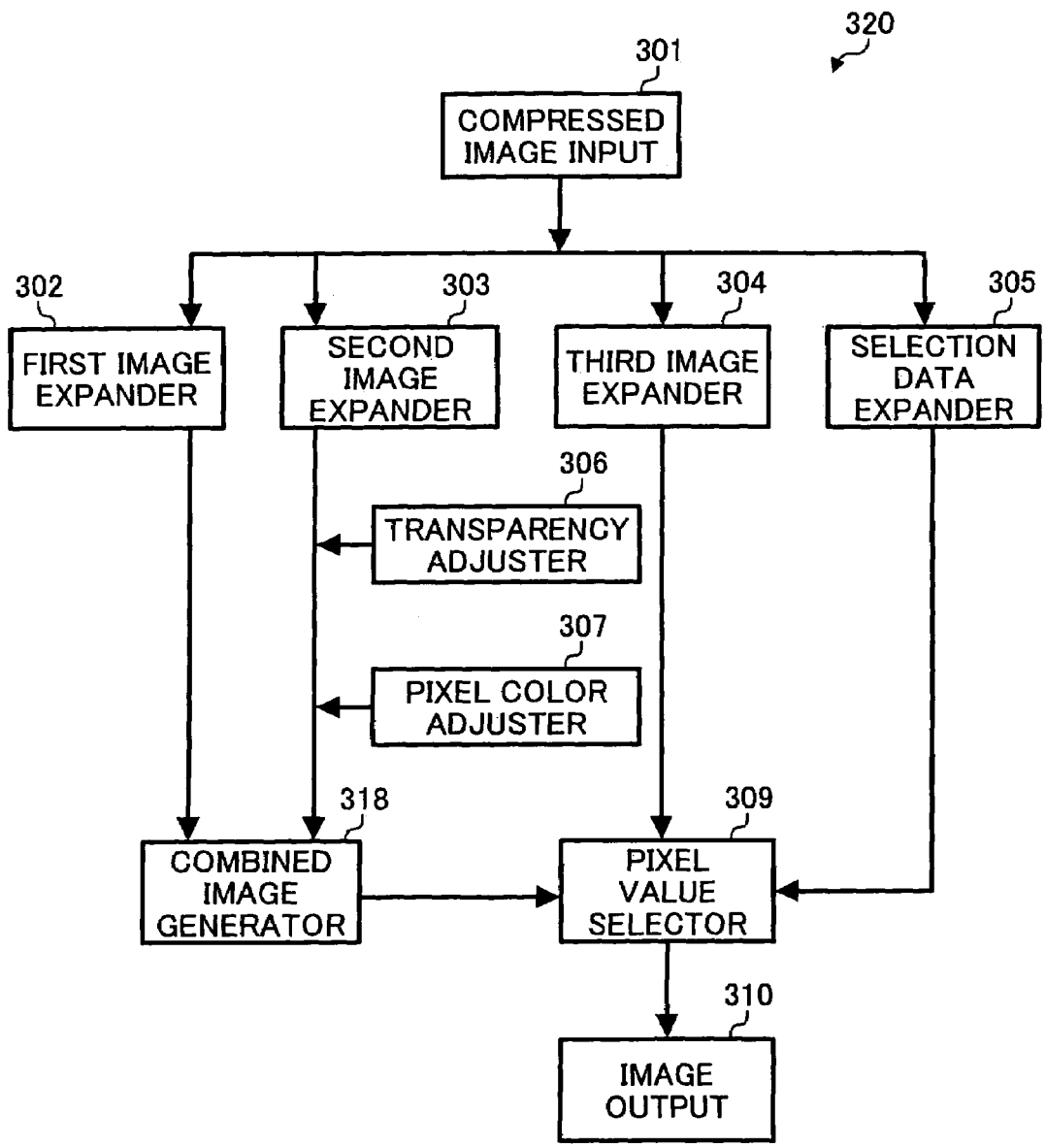
FIG. 31 is a schematic block diagram illustrating the functional structure of an image expanding apparatus according to an exemplary embodiment of the present invention.

Referring now to FIG. 31, the image expanding apparatus 320 is explained according to an exemplary embodiment of the present invention. The image expanding apparatus 320 expands the compressed image into an expanded image, and outputs the expanded image. The image expanding apparatus 320 may be provided in combination with the image processing apparatus 200, or may be provided alone, as long as the image expanding apparatus 320 processes a compressed image generated by the image processing apparatus 200. Further, the image expanding apparatus shown in FIG. 31 is substantially similar in structure to the image expanding apparatus shown in FIG. 27. The differences include a combined image generator 318.

The combined image generator 318 combines the processed second image and the first image into a combined image, which is different from the combined image generated by the combined image generator 308 of FIG. 27.

The image expanding apparatus 320 expands a compressed image in a substantially similar manner as described referring to the operation shown in FIG. 28, except that Step S310 determines whether the pixel value corresponds to the third pixel attribute class. Referring back to FIG. 28, example operation of expanding a compressed image, performed by the image expanding apparatus 320 of FIG. 31, is explained.

In Step S301, the compressed image input 301 inputs a compressed image, which has been generated by the image compressing apparatus 200. For example, the compressed image that has been generated in a manner described referring to FIG. 25 or 26 may be obtained. The compressed image of FIG. 25 or 26 includes the first compressed image, the second compressed image, the third compressed image, and the compressed selection data.

Figure 32:
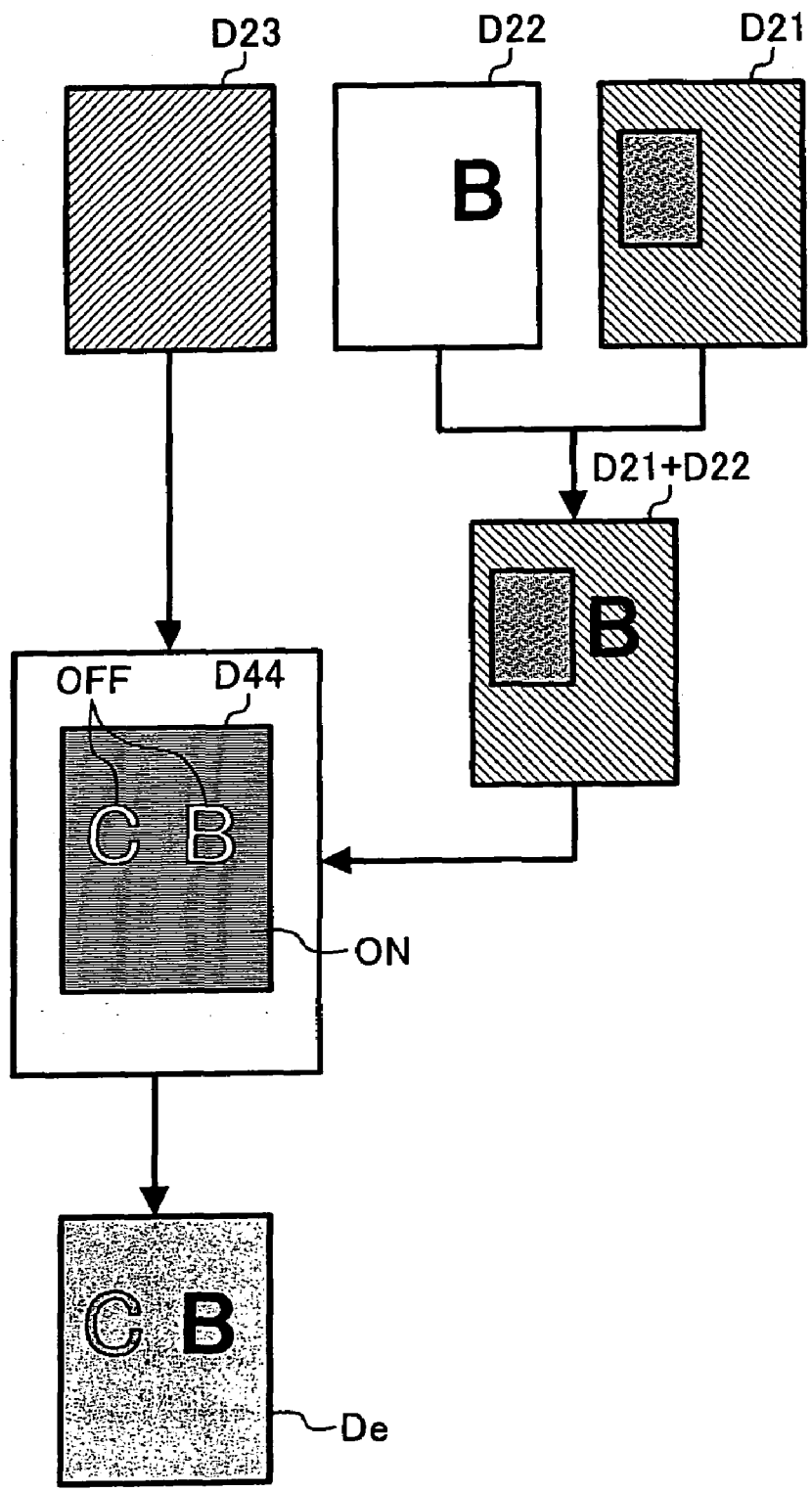
FIG. 32 is an exemplary illustration for explaining operation performed by the image processing apparatus shown in FIG. 31.
Figure 33:
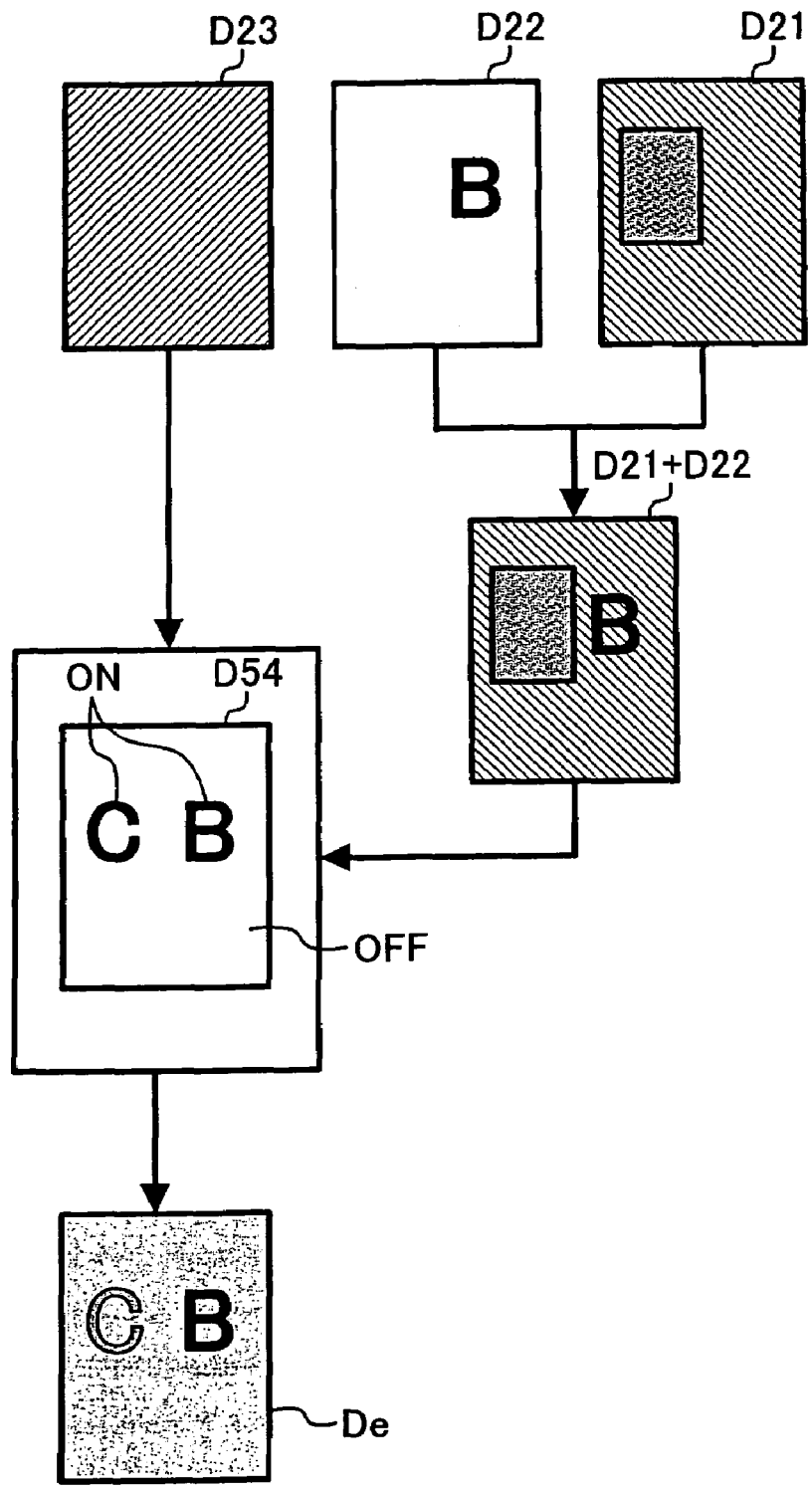
FIG. 33 is an exemplary illustration for explaining operation performed by the image processing apparatus shown in FIG. 31.

In Step S302, the first image expander 302 expands the first compressed image into the first image. In one example, the first compressed image of FIG. 25 is expanded into the first image D21 as illustrated in FIG. 32. In another example, the first compressed image of FIG. 26 is expanded into the first image D21 as illustrated in FIG. 33.

In Step S303, the second image expander 303 expands the second compressed image into the second image. In one example, the second compressed image of FIG. 25 is expanded into the second image D22 as illustrated in FIG. 32. In another example, the second compressed image of FIG. 26 is expanded into the second image D22 as illustrated in FIG. 33.

In Step S304, the third image expander 304 expands the third compressed image into the third image. In one example, the third compressed image of FIG. 25 is expanded into the third image D23 as illustrated in FIG. 32. In another example, the third compressed image of FIG. 26 is expanded into the third image D23 as illustrated in FIG. 33.

In Step S305, the selection data expander 305 expands the compressed selection data into the selection data. In one example, the compressed selection data of FIG. 25 is expanded into the selection data D44 as illustrated in FIG. 32. In another example, the compressed selection data of FIG. 26 is expanded into the selection data D54 as illustrated in FIG. 33.

In Step S306, the transparency adjuster 306 extracts a plurality of non-second attribute pixels from the second image. The transparency adjuster 306 makes some or all the non-second attribute pixels into a transparent pixel.

In Step S307, the pixel color adjuster 307 extracts a plurality of second attribute pixels from the second image. The pixel color adjuster 307 assigns a single color to some or all the second attribute pixels. In this example, the black color is assigned to some or all the second attribute pixels.

In Step S308, the combined image generator 318 combines the processed second image and the first image into a combine image. For example, as illustrated in FIG. 32 or 33, the first image D21 and the second image D22 are combined into a combined image D21+D22.

In Step S309, the pixel value selector 309 selects a target pixel in the expanded image, and obtains the value of a pixel in the selection data, which corresponds to the target pixel.

In Step S310, the pixel value selector 309 determines whether the pixel value obtained in the previous step corresponds to the first pixel attribute class. If the pixel value corresponds to the first pixel attribute class ("YES" in Step S310), the operation proceeds to Step S312. Otherwise ("NO" in Step S311), the operation proceeds to Step S311.

For example, in the exemplary case illustrated in FIG. 32, the pixel value selector 309 selects a target pixel in the expanded image De. The pixel value selector 309 further obtains the value of a pixel in the selection data D44, which is located in the location corresponding to the location of the target pixel. If the obtained pixel value indicates "ON", the pixel value selector 309 determines that the target pixel has a pixel value belonging to the third pixel attribute class, and the operation proceeds to Step S312. If the obtained pixel value indicates "OFF", the pixel value selector 309 determines that the target pixel has a pixel value belonging to the first or second pixel attribute class, and the operation proceeds to Step S311.

In another example, in the exemplary case illustrated in FIG. 33, the pixel value selector 309 selects a target pixel in the expanded image De. The pixel value selector 309 further obtains the value of a pixel in the selection data D54, which is located in the location corresponding to the location of the target pixel. If the obtained pixel value indicates "ON", the pixel value selector 309 determines that the target pixel has a pixel value belonging to the first or second attribute class, and the operation proceeds to Step S311. If the obtained pixel value indicates "OFF", the pixel value selector 309 determines that the target pixel has a pixel value belonging to the third pixel attribute class, and the operation proceeds to Step S312.

In Step S311, the pixel value selector 309 obtains a pixel value from the combined image, and assigns the obtained pixel value to the target pixel in the expanded image. For example, as illustrated in any one of FIG. 32 or 33, the pixel value selector 309 may obtain the value of a pixel in the combined image D21+D22, which is located in the location corresponding to the location of the target pixel.

In Step S312, the pixel value selector 309 obtains a pixel value from the first image, and assigns the obtained pixel value to the target pixel in the expanded image. For example, as illustrated in FIG. 32 or 33, the pixel value selector 309 may obtain the value of a pixel in the first image D21, which is located in the location corresponding to the location of the target pixel.

In Step S313, the image expanding apparatus 300 determines whether all pixels in the expanded image have been processed. If all pixels in the expanded image have been processed, the operation proceeds to Step S314. If all pixels in the expanded image have not been processed ("NO" in Step S313), the operation returns to Step S309 to process a next target pixel in the expanded image.

In Step S314, the image output 310 outputs the expanded image, and the operation ends. In one example, the image output 310 may display the expanded image using any kind of display device. In another example, the image output 310 may print out the expanded image using any kind of printer.

Figure 34:
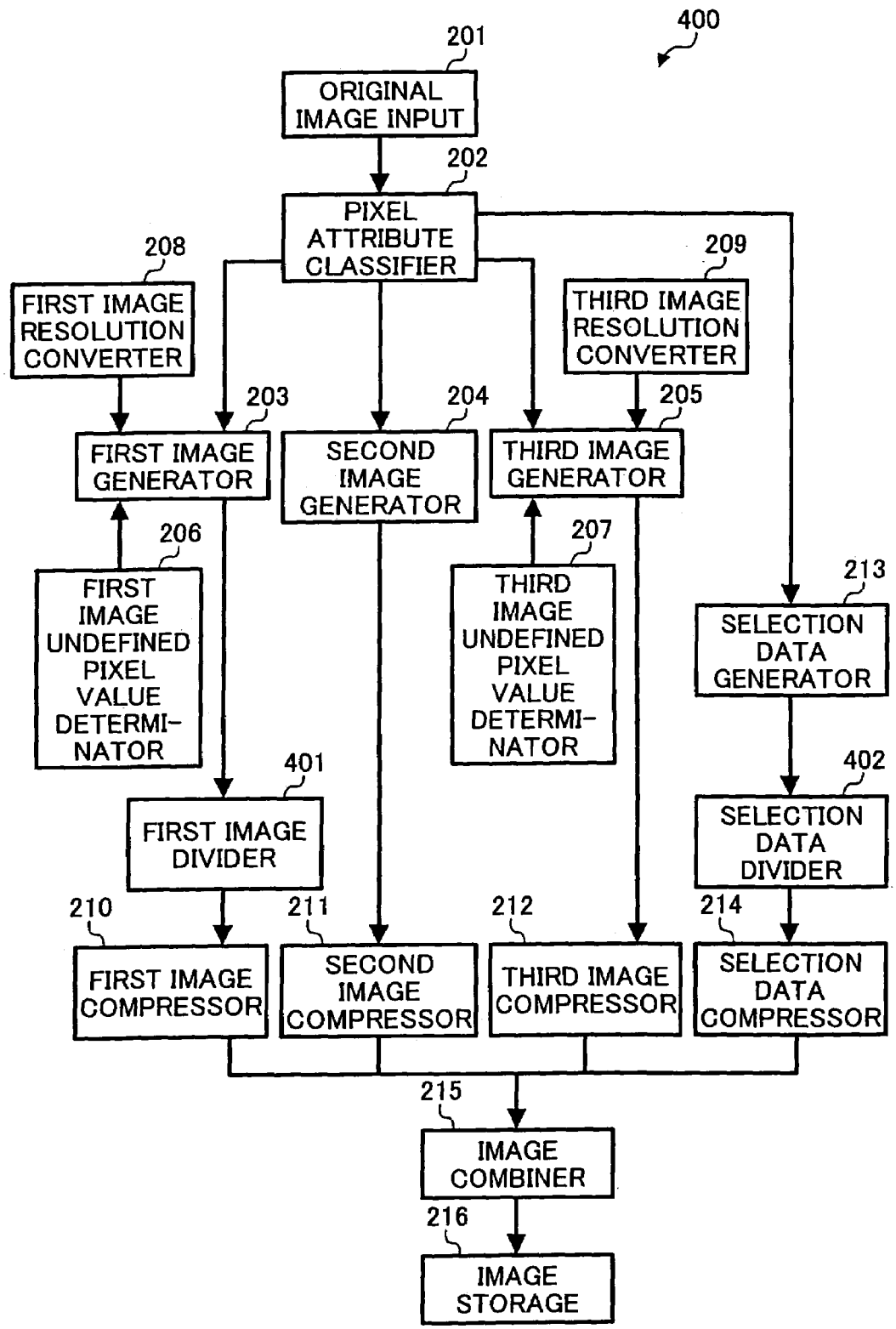
FIG. 34 is a schematic block diagram illustrating the functional structure of an image compressing apparatus according to an exemplary embodiment of the present invention.

Referring now to FIG. 34, an image compressing apparatus 400 is explained according to an exemplary embodiment of the present invention. The image compressing apparatus 400 segments an original multivalue image into a plurality of images, divides at least one of the plurality of images into a plurality of sections, and compresses the plurality of images. Each of the plurality of images can be compressed. Further, the image compressing apparatus 400 of FIG. 34 is substantially similar to the image compressing apparatus 200 of FIG. 21. The differences include the addition of a first image divider 401 and a selection data divider 402.

The first image divider 401 divides the first image into a plurality of sections. The selection data divider 402 divides the selection data into a plurality of sections.

Figure 35:
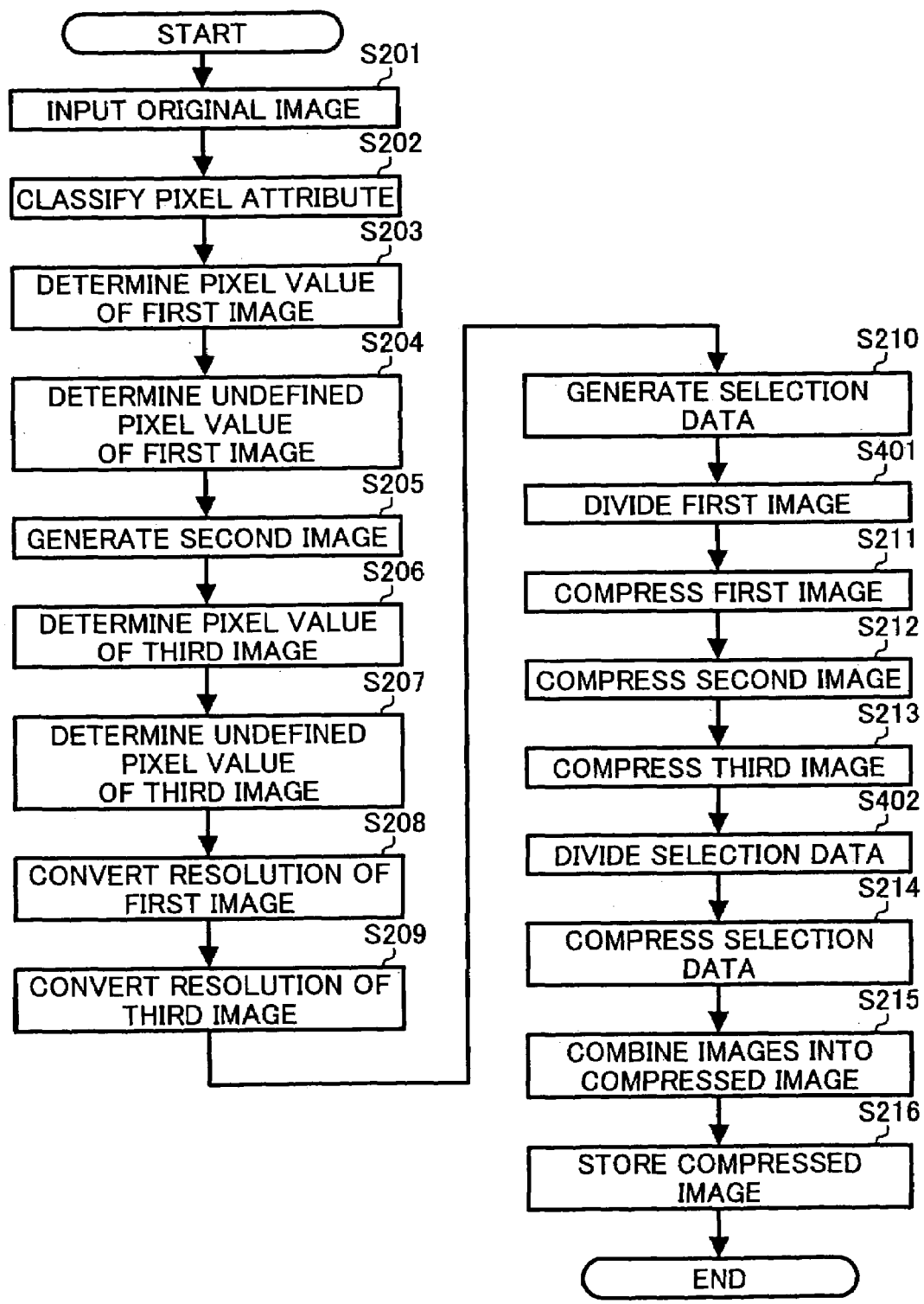
FIG. 35 is a flowchart illustrating operation of compressing a multivalue image, performed by the image compressing apparatus shown in FIG. 34, according to an exemplary embodiment of the present invention.

Referring now to FIG. 35, operation of compressing a multivalue image, performed by the image compressing apparatus of FIG. 34, is explained according to an exemplary embodiment of the present invention. The operation illustrated in FIG. 35 is substantially similar to the operation illustrated in FIG. 22. The differences include the addition of Step S401 and Step S402.

Figure 36:
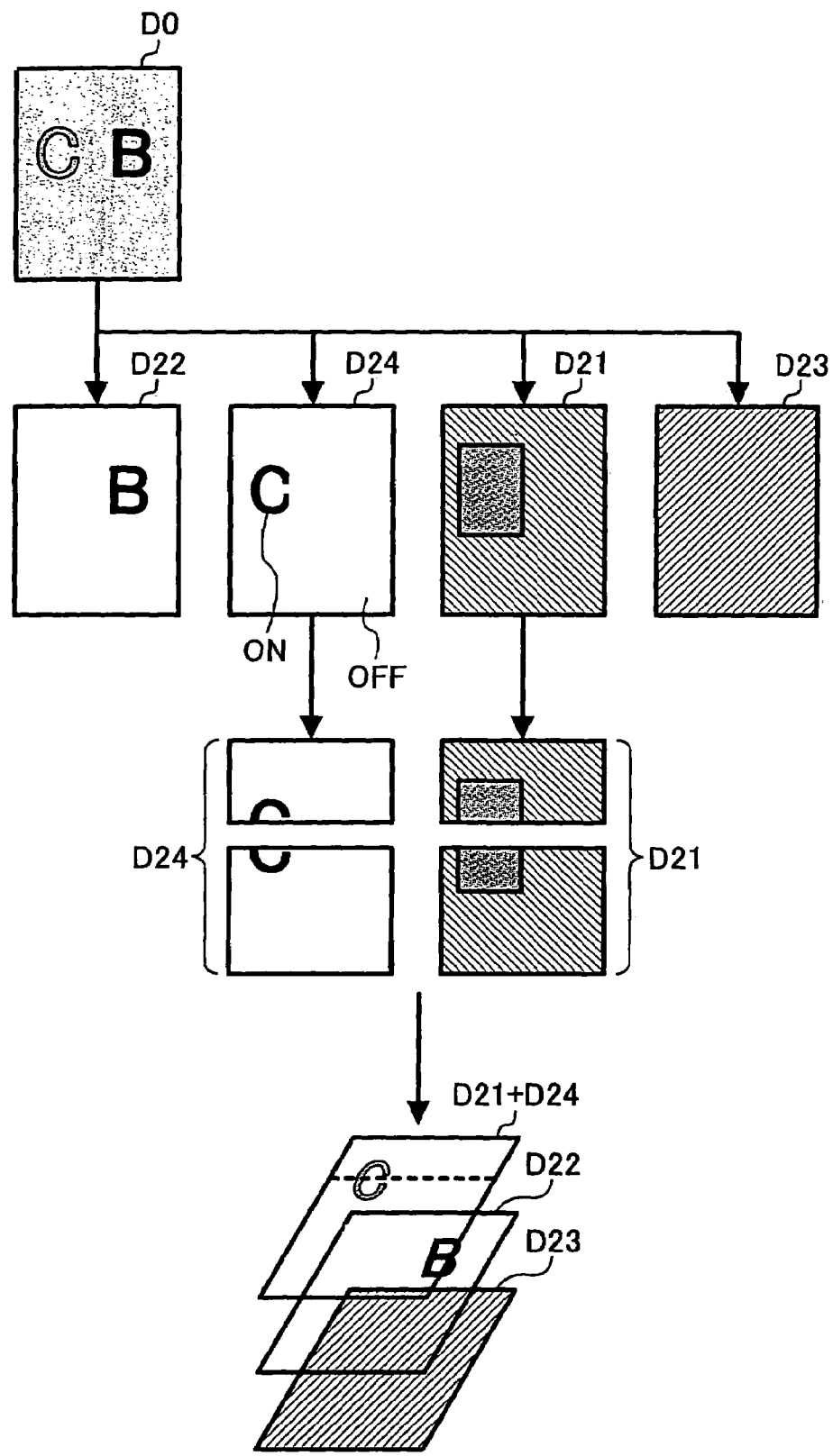
FIG. 36 is an illustration for explaining the operation shown in FIG. 35.

In Step S401, the first image divider 401 divides the first image into a plurality of sections. For example, as illustrated in FIG. 36, the first image D21 may be divided into two sections. The first image D21 may be divided in various ways, for example, according to the layout of the first image. Further, the divided sections may be combined back to one image when they are expanded, as illustrated in FIG. 36.

In Step S402, the selection data divider 402 divides the selection data into a plurality of sections. For example, as illustrated in FIG. 36, the selection data D24 may be divided into two sections. The selection data D24 may be divided in various ways, for example, according to the layout of the selection data. Further, the divided sections may be combined back to one image when they are expanded, as illustrated in FIG. 36.

The image compressing apparatus 400 of FIG. 34 may be implemented in various other ways. For example, any combination of the first image, the second image, the third image, and the selection data may be divided into a plurality of sections.

Further, the components of the image processing apparatus 400 may be combined with each other, or each of the components may be further broken down into smaller components.

Furthermore, the image compressing apparatus 400 may be provided with any other component, device, or apparatus. In one example, the image compressing apparatus 400 may be provided with a pixel value adjusting device. In another example, the image compressing apparatus 400 may be provided with an image expanding apparatus, such as an image expanding apparatus 430 illustrated in FIG. 39.

Figure 37:
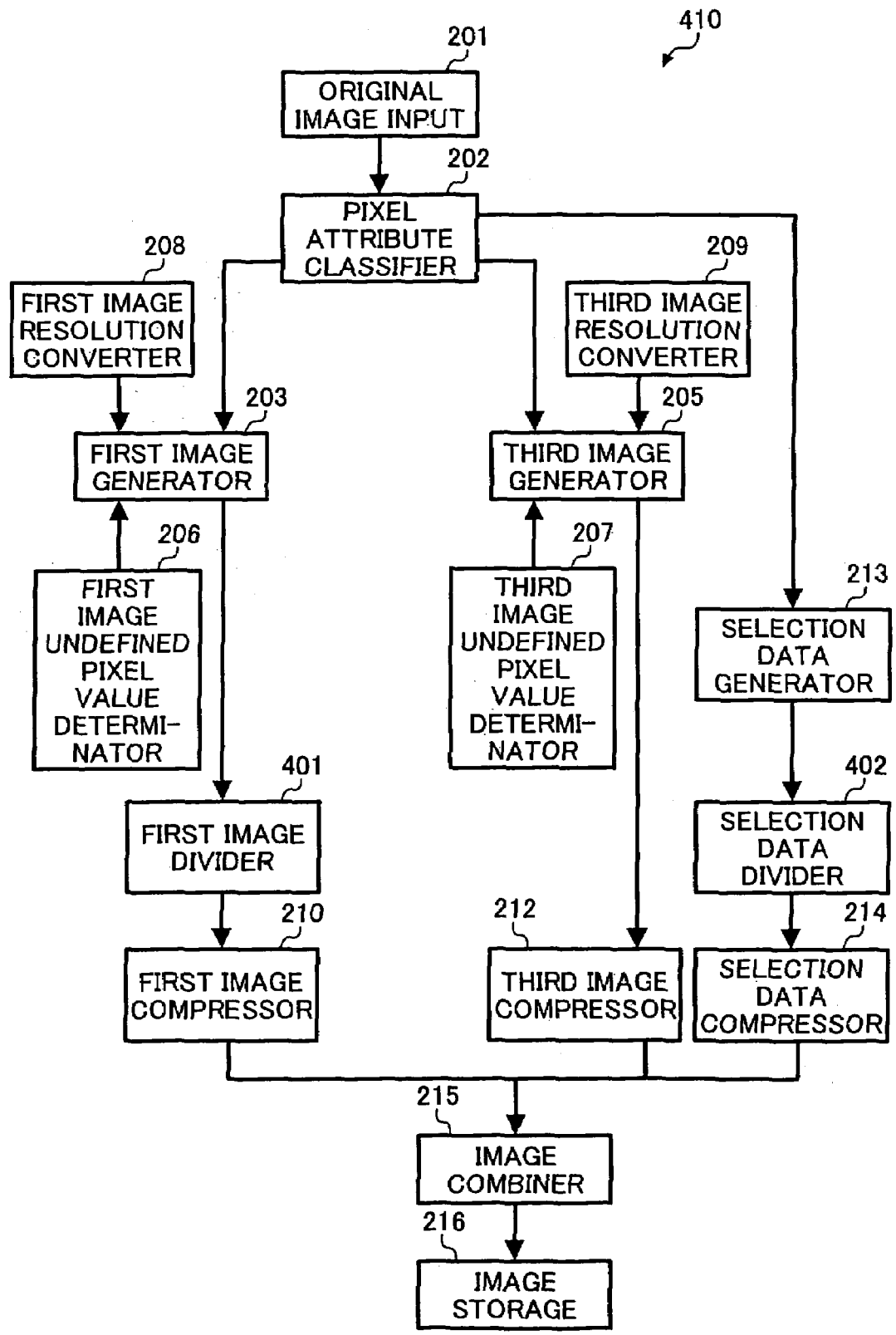
FIG. 37 is a schematic block diagram illustrating the functional structure of an image compressing apparatus according to an exemplary embodiment of the present invention.

Referring now to FIG. 37, an image compressing apparatus 410 is explained according to an exemplary embodiment of the present invention. The image compressing apparatus 410 of FIG. 37 is substantially similar in structure to the image compressing apparatus 400 of FIG. 34. The differences include deletion of the second image generator 204 and the second image compressor 211. Further, in this example, the pixel attribute classifier 201 classifies the pixel attribute of the original multivalue image into the first pixel attribute class and the third pixel attribute class.

Figure 38:
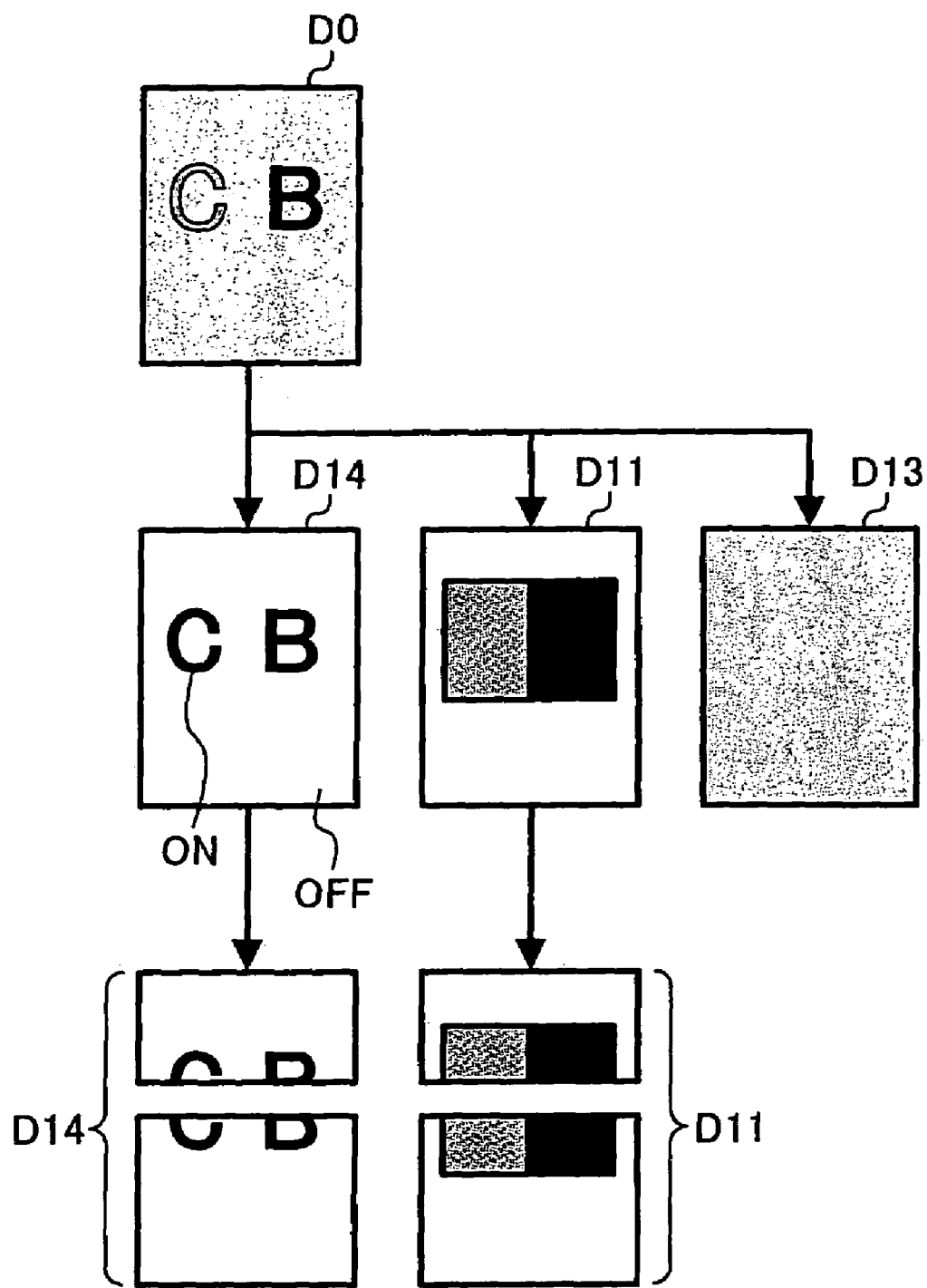
FIG. 38 is an illustration for explaining operation performed by the image compressing apparatus shown in FIG. 37.

Referring to FIG. 38, operation of compressing a multivalue image, performed by the image compressing apparatus 410, is briefly explained.

First, the original image input 201 inputs an original multivalue image to be processed, such as the original multivalue image D0 illustrated in FIG. 38.

Second, the pixel attribute classifier 202 classifies a pixel attribute of the original multivalue image D0 into a first pixel attribute class representing the foreground section of the original multivalue image D0, and a third pixel attribute class representing the background section of the original multivalue image D0.

Based on the classification result, the first image D14 and the second image D13 are generated. As illustrated in FIG. 38, the first image D14 represents the foreground section, while the third image D13 represents the background section. Further, the selection data D14 is generated, which indicates whether a target pixel in the compressed image has a pixel value corresponding to the first pixel attribute class or the third pixel attribute class. As shown in FIG. 38, the selection data D14 may be generated as a binary image having a plurality of "ON" pixels corresponding to the first pixel attribute class and a plurality of "OFF" pixels corresponding to the third pixel attribute class.

The first image divider 401 divides the first image D11 into a plurality of sections. The selection data divider 402 divides the selection data D14 into a plurality of sections.

The image compressing apparatus 410 of FIG. 37 may be implemented in various other ways. For example, any combination of the first image, the second image, the third image, and the selection data may be divided into a plurality of sections.

Further, the components of the image processing apparatus 410 may be combined with each other, or each of the components may be further broken down into smaller components.

Furthermore, the image compressing apparatus 410 may be provided with any other component, device, or apparatus. In one example, the image compressing apparatus 410 may be provided with a pixel value adjusting device. In another example, the image compressing apparatus 410 may be provided with an image expanding apparatus, such as an image expanding apparatus 440 illustrated in FIG. 40.

Figure 39:
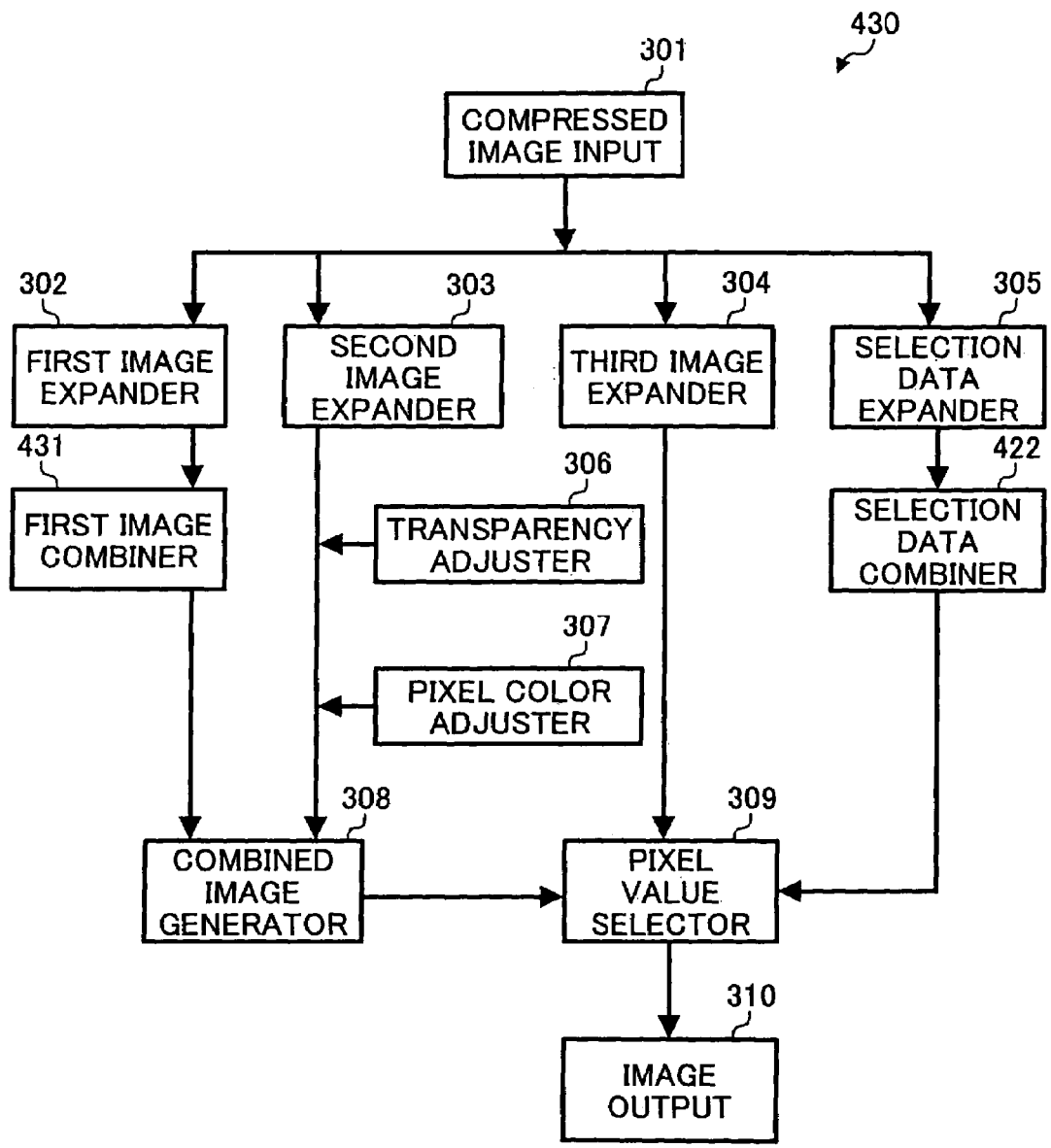
FIG. 39 is a schematic block diagram illustrating the functional structure of an image expanding apparatus according to an exemplary embodiment of the present invention.

Referring now to FIG. 39, the image expanding apparatus 430 is explained according to an exemplary embodiment of the present invention. The image expanding apparatus 430 expands a compressed image into an expanded image, and outputs the expanded image. The image expanding apparatus 430 may be provided in combination with the image compressing apparatus 400, or may be provided alone, as long as the image expandsing apparatus 430 processes a compressed image generated by the image compressing apparatus 400.

Further, the image expanding apparatus 430 of FIG. 39 is substantially similar in structure to the image expanding apparatus 300 of FIG. 27. The differences include the addition of a third image combiner 431 and a selection data combiner 422.

Referring to FIG. 39, example operation of expanding a compressed image, performed by the image expanding apparatus 430, is briefly explained.

The compressed image input 301 inputs a compressed image, which has been generated by the image compressing apparatus 400 of FIG. 34. As described above referring to FIG. 36, the compressed image includes the first compressed image divided into two sections, the second compressed image, the third compressed image, and the selection data divided into two sections.

The first image expander 302 expands sections of the first compressed image. The first image combiner 431 combines the expanded sections into one image to generate the first image. The second image expander 303 expands the second compressed image into the second image. The third image expander 304 expands the third compressed image into the third image. The selection data expander 305 expands sections of the compressed selection data. The selection data combiner 422 combines the expanded sections into one image to generate the selection data.

The function or operation performed by any one of the transparency adjuster 306, the pixel color adjuster 307, the combined image generator 308, the pixel value selector 309, and the image output 310 is substantially similar to the function or operation performed by the image expanding apparatus 300 of FIG. 27.

The image expanding apparatus 430 may be implemented in various other ways. For example, the first image combiner 431 may be replaced with a third image combiner capable of combining a plurality of sections of a third image, when the third image is divided by the plurality of sections.

Figure 40:
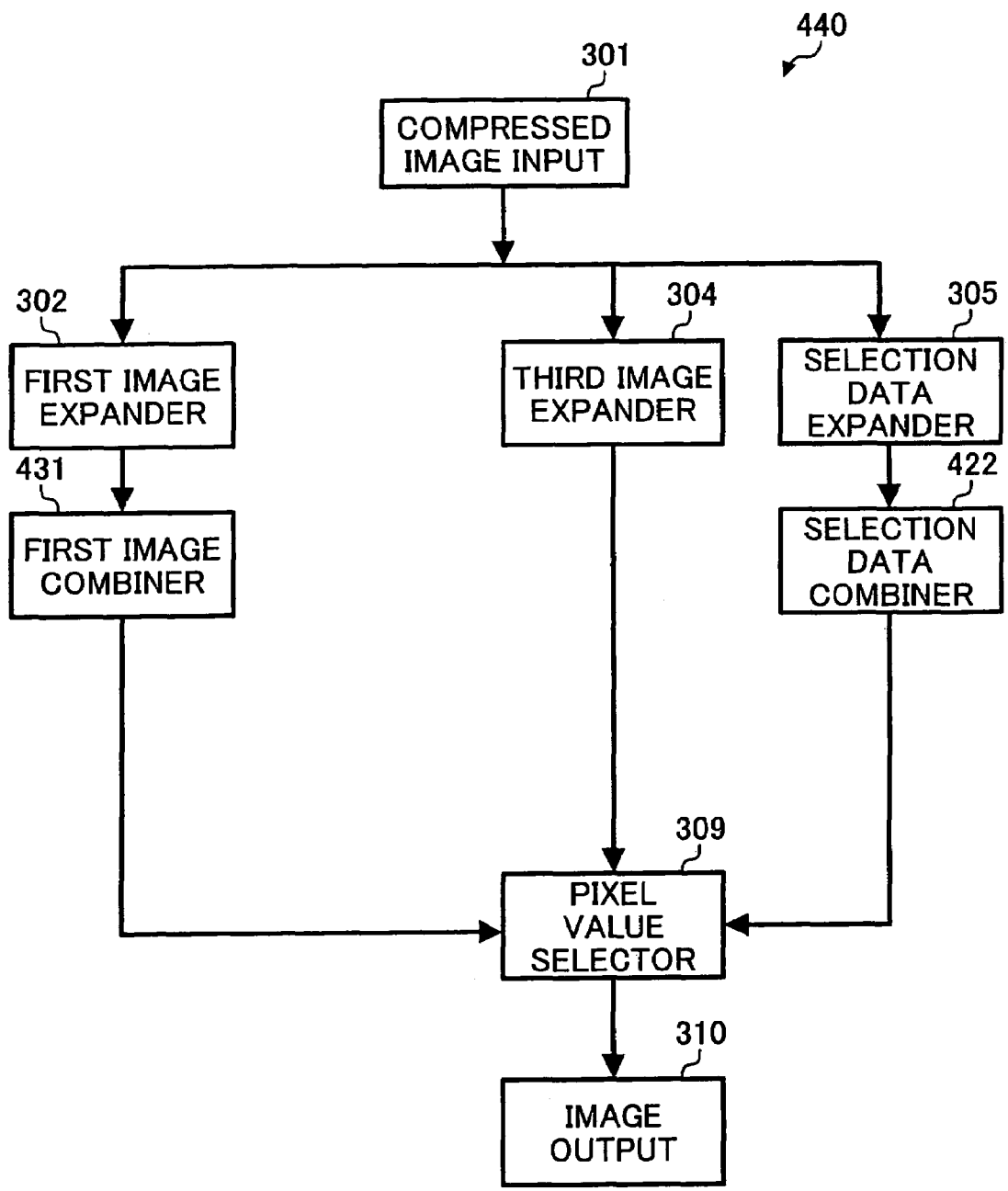
FIG. 40 is a schematic block diagram illustrating the functional structure of an image expanding apparatus according to an exemplary embodiment of the present invention.

Referring now to FIG. 40, the image expanding apparatus 440 is explained according to an exemplary embodiment of the present invention. The image expanding apparatus 440 expands a compressed image into an expanded image, and outputs the expanded image. The image expanding apparatus 430 expands a compressed image into an expanded image, and outputs the expanded image. The image expanding apparatus 430 may be provided in combination with the image compressing apparatus 410, or may be provided alone, as long as the image expanding apparatus 430 processes a compressed image generated by the image compressing apparatus 410.

Further, the image expanding apparatus 440 of FIG. 40 is substantially similar in structure to the image expanding apparatus 430 of FIG. 39. The differences include the deletion of the second image expander 303, the transparency adjuster 306, the pixel color adjuster 307, and the combined image generator 308.

Figure 41:
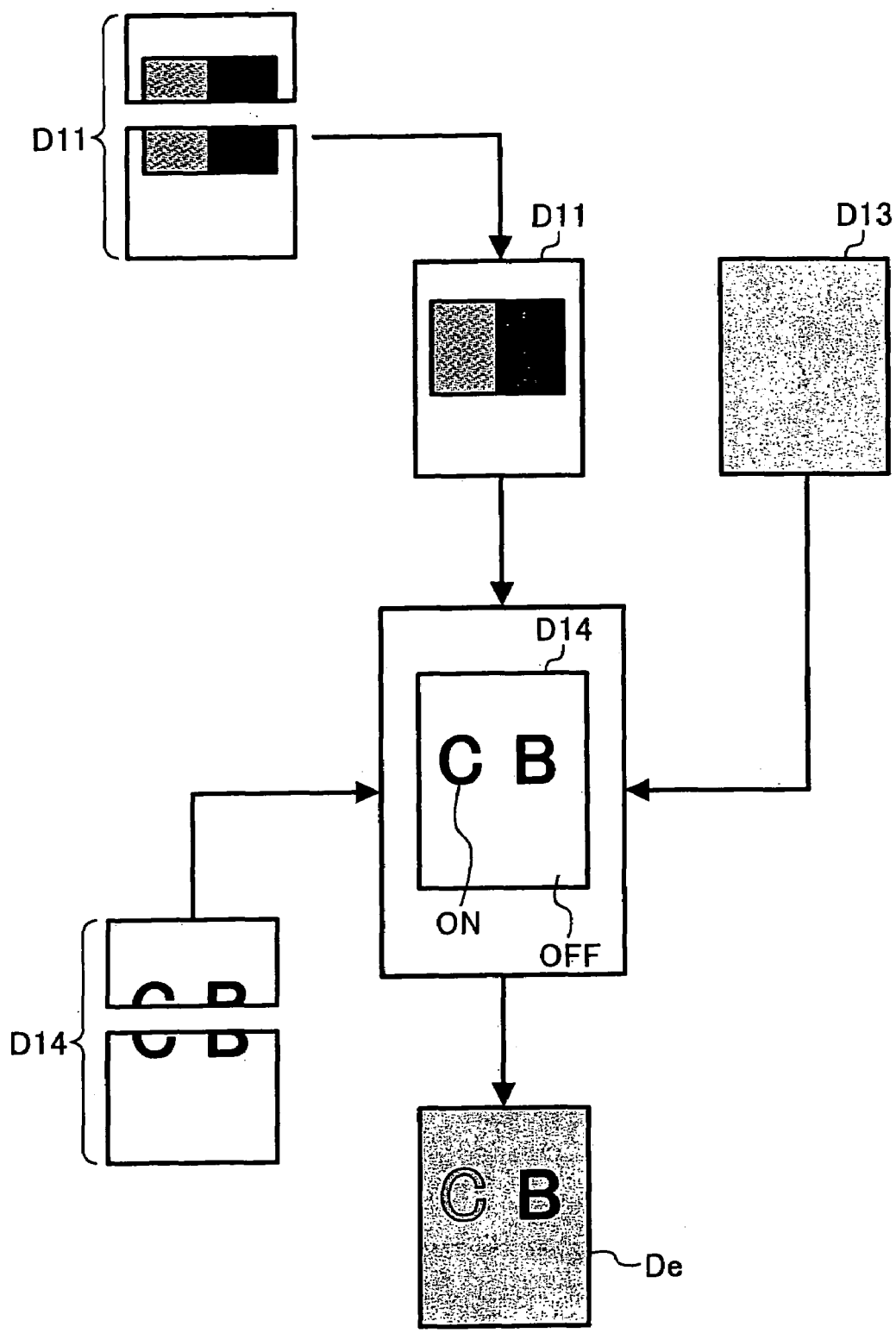
FIG. 41 is an illustration for explaining operation performed by the image expanding apparatus shown in FIG. 40.

Referring to FIGS. 40 and 41, example operation of expanding a compressed image, performed by the image expanding apparatus 440, is briefly explained.

The compressed image input 301 inputs a compressed image, which has been generated by the image compressing apparatus 410 of FIG. 37. As described above referring to FIG. 38, the compressed image includes the first compressed image divided into two sections, the third compressed image, and the selection data divided into two sections.

The first image expander 302 expands sections of the first compressed image. The first image combiner 431 combines the expanded sections into one image to generate the first image, for example, the first image D11 as illustrated in FIG. 41. The third image expander 304 expands the third compressed image into the third image, such as the third image D13 illustrated in FIG. 41. The selection data expander 305 expands sections of the compressed selection data. The selection data combiner 422 combines the expanded sections into one image to generate the selection data, such as the selection data D14 illustrated in FIG. 41.

The pixel value selector 309 determines a pixel value of the expanded image De using the selection data D14, based on a pixel value extracted from either one of the first image D11 and the third image D13. For example, the pixel value selector 309 may determine the pixel value of the expanded image, in a substantially similar manner as described referring to FIG. 28, for example.

The image expanding apparatus 440 may be implemented in various other ways. For example, the first image combiner 431 may be replaced with a third image combiner capable of combining a plurality of sections of a third image, when the third image is divided by the plurality of sections.

Numerous additional modifications and variations are possible in light of the above teachings. It is therefore to be understood that within the scope of the appended claims, the disclosure of this patent specification may be practiced in ways other than those specifically described herein.

For example, elements and/or features of different illustrative embodiments may be combined with each other and/or substituted for each other within the scope of this disclosure and appended claims.

Furthermore, any portion or any one of the above-described and other methods of the present invention may be embodied in the form of a computer program stored in any kind of storage device or medium to create an image processing system.

Figure 42:
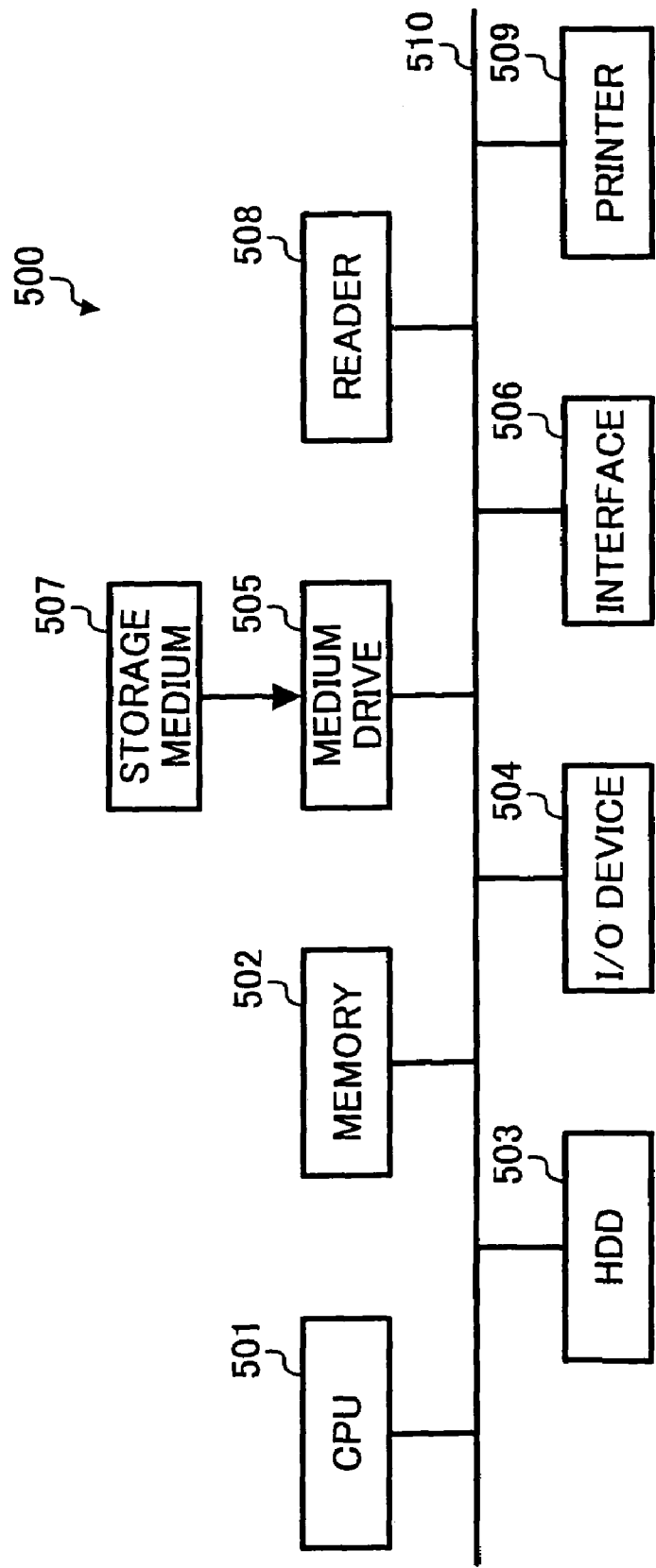
FIG. 42 is a schematic block diagram illustrating the structure of an image processing apparatus according to an exemplary embodiment of the present invention.

In one example, the image processing system may be implemented as a multifunctional apparatus (MFP) having the structure shown in FIG. 42. In another example, the image processing system may be implemented as a personal computer (PC) having the structure shown in FIG. 43.

As shown in FIG. 42, the MFP 500 includes a central processing unit (CPU) 501, a memory 502, a hard disk drive (HDD) 503, an input/display device 504, a medium drive 505, an interface 506, a storage medium 507, a reader 508, and a printer 509, which are connected via a bus 510.

The CPU 501 includes any kind of processor capable of controlling operation of the MFP 500. The memory 502 includes any kind of involatile or volatile memory, which may be used by the CPU 501. The HDD 503 includes any kind of device capable of storing various data.

The I/O device 504 includes any kind of device capable of inputting data or outputting data, such as an operation panel including a display or a keyboard, for example. The interface 506 includes any kind of device capable of connecting the MFP 500 to a network, such as the Internet, for example.

The medium drive 505 includes any kind of device capable of reading data from the storage medium 507. Examples of the storage medium 507 include, but not limited to, optical discs such as CD-ROM, CD-R, CD-RW, DVD-ROM, DVD-RAM, DVD-R, DVD+R, DVD-RW and DVD+RW, magneto optical discs, memory cards, and flexible disks.

The reader 508 includes any kind of device capable of reading a document image into electronic data, such as a scanner, for example. The printer 509 includes any kind of device capable of printing electronic data as a document image, such as a printer, for example.

In one example, the image processing program of the present invention may be installed on the HDD 503 from the storage medium 507 storing the image processing program. The image processing program may be further loaded onto the memory 502 upon activation of the CPU 501.

In another example, the image processing program may be downloaded from any other device or apparatus via the network, through the interface 506. Further, the image processing program may be uploaded from the MFP 500 to any other device or apparatus through the network.

Figure 43:
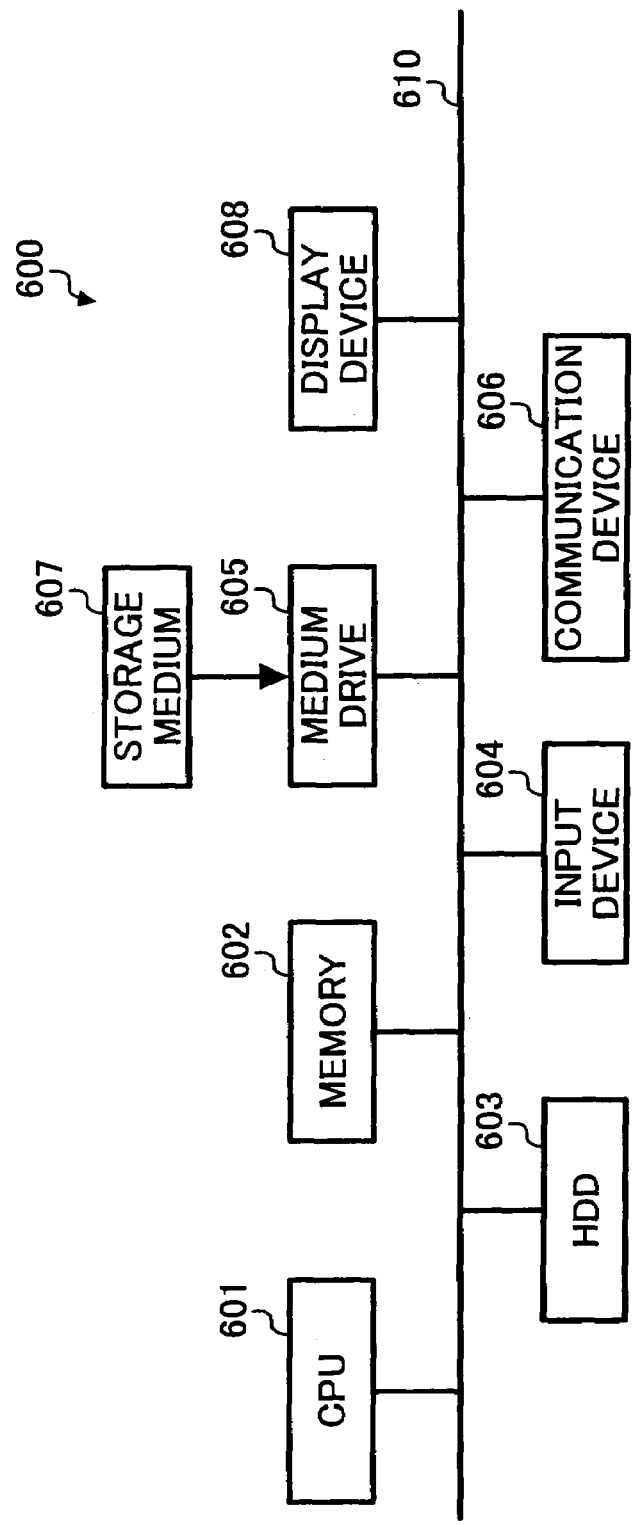
FIG. 43 is a schematic block diagram illustrating the structure of an image processing apparatus according to an exemplary embodiment of the present invention.

Referring to FIG. 43, the PC 600 includes a central processing unit (CPU) 601, a memory 602, a hard disk drive (HDD) 603, an input device 604, a medium drive 605, a communication device 606, a storage medium 607, and a display device 608, which are connected via a bus 610.

The CPU 601 includes any kind of processor capable of controlling operation of the PC 600. The memory 602 includes any kind of involatile or volatile memory, which may be used by the CPU 601. The HDD 603 includes any kind of device capable of storing various data.

The input device 604 includes any kind of device capable of inputting data, such as a keyboard or a mouse, for example. The display device 608 includes any kind of device capable of displaying, such as a liquid crystal display (LCD), for example. The communication device 606 includes any kind of device capable of connecting the PC 600 to a network, such as the LAN or the Internet, for example.

The medium drive 605 includes any kind of device capable of reading data from the storage medium 607. Examples of the storage medium 607 include, but not limited to, optical discs such as CD-ROM, CD-R, CD-RW, DVD-ROM, DVD-RAM, DVD-R, DVD+R, DVD-RW and DVD+RW, magneto optical discs, memory cards, and flexible disks.

Alternatively, any one of the above-described and other methods of the present invention may be implemented by ASIC, prepared by interconnecting an appropriate network of conventional component circuits or by a combination thereof with one or more conventional general purpose microprocessors and/or signal processors programmed accordingly.

This patent application is based on and claims priority to Japanese patent application Nos. 2004-358532 filed on Dec. 10, 2004 3005-024188 field on Jan. 31, 2005, and 2005-

160025 filed on May 31, 2005, in the Japanese Patent Office, the entire contents of which are incorporated by reference herein.

The invention claimed is:

1. An image processing apparatus, comprising:
   means for inputting an original multivalue image to be processed;
   means for classifying a pixel attribute of the original multivalue image into a plurality of pixel attribute classes comprising a first pixel attribute class and a third pixel attribute class;
   means for generating a fourth layer image comprising a first type pixel having a pixel attribute corresponding to one of the first pixel attribute class and the third pixel attribute class;
   means for generating a first layer image comprising a plurality of first pixels, pixels of which having a pixel attribute belonging to the first pixel attribute class, the plurality of first pixels comprising a set of first defined pixels and a set of first undefined pixels; and
   means for generating a third layer image comprising a plurality of third pixels, pixels of which having a pixel attribute belonging to the third pixel attribute class, the plurality of third pixels comprising a set of third defined pixels and a set of third undefined pixels.

2. The apparatus of claim 1, wherein the plurality of pixel attribute classes further comprises a second pixel attribute class.

3. The apparatus of claim 2, further comprising:
   means for generating a second layer image comprising a third type pixel having a pixel attribute corresponding to the second pixel attribute class, and the second layer image further comprises a fourth type pixel having a pixel attribute corresponding to the first pixel attribute class or the third pixel attribute class.

4. The apparatus of claim 3, wherein the first type pixel of the fourth layer image has a pixel attribute corresponding to the first pixel attribute class, and
   wherein the fourth layer image further comprises a second type pixel having a pixel attribute corresponding to the second pixel attribute class or the third pixel attribute class.

5. The apparatus of claim 3, wherein the first type pixel of the fourth layer image has a pixel attribute corresponding to the third pixel attribute class, and
   wherein the fourth layer image further comprises a second type pixel having a pixel attribute corresponding to the first pixel attribute class or the second pixel attribute class.

6. The apparatus of claim 3, wherein at least one of the first undefined pixel and the third undefined pixel is made into a transparent pixel.

7. The apparatus of claim 3, further comprising:
   means for compressing the first layer image into a first compressed layer image;
   means for compressing the second layer image into a second compressed layer image;
   means for compressing the third layer image into a third compressed layer image;
   means for compressing the fourth layer image into a fourth compressed layer image; and
   means for combining the first compressed layer image, the second compressed layer image, the third compressed layer image, and the fourth compressed layer image into a compressed image,
   wherein the first, second, third, and fourth compressed layer images are superimposed one above the other according to a sequence number assigned by the combining means.

8. The apparatus of claim 1, further comprising:
   means for dividing at least one of the first layer image, the third layer image, and the fourth layer image into a plurality of sections.

9. The apparatus of claim 1, wherein the plurality of pixel attribute classes further comprises a second pixel attribute class, and the apparatus further comprises:
   means for generating a second layer image comprising a third type pixel having a pixel attribute corresponding to the second pixel attribute class, and
   means for dividing at least one of the first layer image, the second layer image, the third layer image, and the fourth layer image into a plurality of sections.

10. The apparatus of claim 1, wherein a pixel value of the first defined pixel is calculated based on a pixel value of the first defined pixel located in a vicinity of the first undefined pixel, and a pixel value of the third undefined pixel is calculated based on a pixel value of the third defined pixel located in the vicinity of a third undefined pixel.

11. The apparatus of claim 10, further comprising:
    means for classifying the first defined pixels in the original multivalue image into a set of boundary first defined pixels and a set of non-boundary first defined pixels;
    means for determining whether the boundary first defined pixel belongs to an edge portion of the original multivalue image to generate a detection result; and
    means for adjusting the pixel value of the boundary first defined pixel using the pixel value of the non-boundary first defined pixel located in a vicinity of the boundary first defined pixel based on the detection result.

12. The apparatus of claim 10, further comprising:
    means for classifying the third defined pixels in a subsequent multivalue image into a set of boundary third defined pixels and a set of non-boundary third defined pixels;
    means for determining whether the boundary third defined pixel belongs to an edge portion of the subsequent multivalue image to generate a detection result; and means for adjusting the pixel value of the boundary third defined pixel using the pixel value of the non-boundary third defined pixel located in the vicinity of the boundary third defined pixel based on the detection result.

13. The apparatus of claim 10, comprising:
    means for classifying the first defined pixels in the original multivalue image into a set of boundary first defined pixels and a set of non-boundary first defined pixels; and
    means for adjusting the pixel value of the boundary first defined pixel using the pixel value of the non-boundary first defined pixel located in a vicinity of the boundary first defined pixel.

14. The apparatus of claim 10, further comprising:
    means for classifying the third defined pixels in the subsequent multivalue image into a set of boundary third defined pixels and a set of non-boundary third defined pixels; and
    means for adjusting the pixel value of the boundary third defined pixel using the pixel value of the non-boundary third defined pixel located in a vicinity of the boundary third defined pixel.

15. The apparatus of claim 10, further comprising:
   means for compressing the first layer image into a first compressed layer image;
   means for compressing the third layer image into a third compressed layer image; and
   means for compressing the fourth layer image into a fourth compressed layer image.

16. The apparatus of claim 1, wherein the means for generating a first layer comprises:
   first determining means for determining a pixel value of the first defined pixel based on a pixel value extracted from the original multivalue image; and
   second determining means for determining a pixel value of the first undefined pixel based on the pixel value of the first defined pixel located in a vicinity of the first undefined pixel,
   and wherein the means for generating a third layer image comprises:
   third determining means for determining a pixel value of the third defined pixel based on a pixel value extracted from the original multivalue image; and
   fourth determining means for determining a pixel value of the third undefined pixel based on the pixel value of the third defined pixel located in a vicinity of the third undefined pixel.

17. The apparatus of claim 16, wherein at least one of the second determining means and the fourth determining means comprises:
   means for determining a size of a processed block in any one of the first layer image and the third layer image, the size comprising an initial size and a reference size; and
   means for analyzing any one of the plurality of first pixels and the plurality of third pixels contained in the processed block to generate an analyzing result,
   wherein the analyzing result is used for determining the pixel value of either one of the first undefined pixel and the third undefined pixel.

18. An image processing system, comprising:
   a processor;
   a storage device configured to store a plurality of instructions which, when activated by the processor, cause the processor to perform an image processing operation; and
   said processor is configured to input an original multivalue image to be processed,
   to classify a pixel attribute of the original multivalue image into a plurality of pixel attribute classes comprising a first pixel attribute class and a third pixel attribute class,
   to generate a fourth layer image comprising a first type pixel having a pixel attribute corresponding to one of the first pixel attribute class and the third pixel attribute class,
   to generate a first layer image comprising a plurality of first pixels having a pixel attribute belonging to the first pixel attribute class, the plurality of first pixels comprising a set of first defined pixels and a set of first undefined pixels, and
   to generate a third layer image comprising a plurality of third pixels having a pixel attribute belonging to the third pixel attribute class, the plurality of third pixels comprising a set of third defined pixels and a set of third undefined pixels,
   wherein a pixel value of the first defined pixel is calculated based on a pixel value of the first defined pixel located in a vicinity of the first undefined pixel, and a pixel value of the third undefined pixel is calculated based on a pixel value of the third defined pixel located in a vicinity of the third undefined pixel.

19. A computer readable medium storing computer instructions for performing an image processing operation comprising:
   inputting an original multivalue image to be processed;
   classifying a pixel attribute of the original multivalue image into a plurality of pixel attribute classes comprising a first pixel attribute class and a third pixel attribute class;
   generating a fourth layer image comprising a first type pixel having a pixel attribute corresponding to one of the first pixel attribute class and the third pixel attribute class;
   generating a first layer image comprising a plurality of first pixels, pixels of which having a pixel attribute belonging to the first pixel attribute class, the plurality of first pixels comprising a set of first defined pixels and a set of first undefined pixels; and
   generating a third layer image comprising a plurality of third pixels, pixels of which having a pixel attribute belonging to the third pixel attribute class, the plurality of third pixels comprising a set of third defined pixels and a set of third undefined pixels,
   wherein a pixel value of the first defined pixel is calculated based on a pixel value of the first defined pixel located in a vicinity of the first undefined pixel, and a pixel value of the third undefined pixel is calculated based on a pixel value of the third defined pixel located in a vicinity of the third undefined pixel.

20. A method for segmenting a multivalue image for compression, comprising:
   classifying a pixel attribute of the multivalue image into a plurality of pixel attribute classes comprising a first pixel attribute class and a third pixel attribute class;
   generating a fourth layer image comprising a first type pixel having a pixel attribute corresponding to one of the first pixel attribute class and the third pixel attribute class;
   generating a first layer image comprising a plurality of first pixels, pixels of which having a pixel attribute belonging to the first pixel attribute class, the plurality of first pixels comprising a set of first defined pixels and a set of first undefined pixels; and
   generating a third layer image comprising a plurality of third pixels, pixels of which having a pixel attribute belonging to the third pixel attribute class, the plurality of third pixels comprising a set of third defined pixels and a set of third undefined pixels,
   wherein a pixel value of the first defined pixel is calculated based on a pixel value of the first defined pixel located in a vicinity of the first undefined pixel, and a pixel value of the third undefined pixel is calculated based on a pixel value of the third defined pixel located in a vicinity of the third undefined pixel. ,

* * * * *